(12) United States Patent
Kopardekar

(10) Patent No.: US 10,332,405 B2
(45) Date of Patent: Jun. 25, 2019

(54) UNMANNED AIRCRAFT SYSTEMS TRAFFIC MANAGEMENT

(71) Applicant: The United States of America, as represented by the Administrator of the National Aeronautics & Space Administration (NASA), Washington, DC (US)

(72) Inventor: Parimal Kopardekar, Cupertino, CA (US)

(73) Assignee: The United States of America as Represented by the Administrator of NASA, Washington, DC (US)

(*) Notice: Subject to any disclaimer, the term of this patent is extended or adjusted under 35 U.S.C. 154(b) by 517 days.

(21) Appl. No.: 14/577,272

(22) Filed: Dec. 19, 2014

(65) Prior Publication Data
US 2016/0275801 A1 Sep. 22, 2016

Related U.S. Application Data

(60) Provisional application No. 61/918,170, filed on Dec. 19, 2013.

(51) Int. Cl.
*G08G 5/00* (2006.01)

(52) U.S. Cl.
CPC .......... *G08G 5/0043* (2013.01); *G08G 5/006* (2013.01); *G08G 5/0013* (2013.01); *G08G 5/0026* (2013.01); *G08G 5/0069* (2013.01); *G08G 5/0082* (2013.01); *G08G 5/0091* (2013.01)

(58) Field of Classification Search
CPC .. G08G 5/0043; G08G 5/0082; G08G 5/0026; G08G 5/0013; G08G 5/0069; G08G 5/0091; G08G 5/006
See application file for complete search history.

(56) References Cited

U.S. PATENT DOCUMENTS

| | | | |
|---|---|---|---|
| 6,262,679 B1 | 7/2001 | Tran | |
| 7,269,513 B2 | 9/2007 | Herwitz | |
| 7,493,196 B2 * | 2/2009 | Caillaud | G01C 23/00 244/1 R |
| 8,358,677 B2 | 1/2013 | Collette et al. | |

(Continued)

FOREIGN PATENT DOCUMENTS

CN 202694592 U 1/2013

OTHER PUBLICATIONS

Circular 328 AN/190, Unmanned Aircraft Systems (UAS), International Civil Aviation Organization (ICAO), 2011, , Montreal, Quebec, Canada.

(Continued)

*Primary Examiner* — Mussa A Shaawat
(74) *Attorney, Agent, or Firm* — Rhys W. Cheung; Robert M. Padilla; Mark P. Dvorscak

(57) ABSTRACT

The present invention provides a traffic management system for managing unmanned aerial systems (UASs) operating at low-altitude. The system includes surveillance for locating and tracking UASs in uncontrolled airspace, for example, in airspace below 10,000 feet MSL. The system also includes flight rules for safe operation of UASs in uncontrolled airspace. The system further includes computers for processing said surveillance and for applying the flight rules to UASs. The traffic management system may be portable, persistent, or a hybrid thereof.

16 Claims, 47 Drawing Sheets

(56) References Cited

U.S. PATENT DOCUMENTS

| | | |
|---|---|---|
| 8,386,175 B2 | 2/2013 | Limbaugh et al. |
| 8,543,265 B2 | 9/2013 | Ekhaguere et al. |
| 8,626,361 B2 | 1/2014 | Gerlock |
| 8,744,738 B2 | 6/2014 | Bushnell |
| 8,781,650 B2 | 7/2014 | Downs |
| 8,818,696 B2 | 8/2014 | Klooster et al. |
| 9,104,201 B1* | 8/2015 | Pillai ..................... B64C 39/024 |
| 2008/0033604 A1 | 2/2008 | Margolin |
| 2011/0049290 A1* | 3/2011 | Seydoux ................ A63H 27/12 244/17.13 |
| 2011/0245997 A1* | 10/2011 | Marty .................. G05D 1/0022 701/2 |
| 2011/0257813 A1* | 10/2011 | Coulmeau ............ G08G 5/0013 701/2 |
| 2012/0191331 A1* | 7/2012 | Torres .................. G08G 5/0039 701/120 |
| 2014/0018979 A1* | 1/2014 | Goossen .............. G08G 5/0034 701/3 |
| 2014/0156109 A1* | 6/2014 | Estkowski ............. G05D 1/101 701/2 |
| 2014/0163852 A1 | 6/2014 | Borri et al. |
| 2017/0261846 A1* | 9/2017 | Maes .................. G03B 21/2086 |

OTHER PUBLICATIONS

Degarmo, et al., Prospective Unmanned Aerial Vehicle Operations in the Future National Airspace System, American Institute of Aeronautics and Astronautics, Sep. 2004.

Kenny, Unmanned Aircraft System (UAS) Delegation of Separation in NextGen Airspace, Master's Theses, Paper 4284, San Jose State University Scholar Works, 2013, http://scholarworks.sjsu.edu/etd_theses.

Care Innovative Action Preliminary Study on Integration of Unmanned Aerial Vehicles into Future Air Traffic Management, Industrieanlagen-Betriebsgesellschaft mbH, Department of Airborne Air Defence, Dec. 7, 2001.

* cited by examiner

TITLE 14—Aeronautics and Space

CHAPTER I—FEDERAL AVIATION ADMINISTRATION, DEPARTMENT OF TRANSPORTATION (CONTINUED)

SUBCHAPTER D—AIRMEN

| Part | Table of Contents | Headings |
|---|---|---|
| 60 | 60.1 to 60.37 | FLIGHT SIMULATION TRAINING DEVICE INITIAL AND CONTINUING QUALIFICATION AND USE |
| 62 | TBD | FLIGHT SIMULATION TRAINING DEVICE INITIAL AND CONTINUING QUALIFICATION AND USE FOR UAS FLIGHT CONTROL SOFTWARE PROGRAMERS |
| 61 | 61.1 to 61.429 | CERTIFICATION: PILOTS, FLIGHT INSTRUCTORS, AND GROUND INSTRUCTORS |
| 63 | 63.1 to 63.61 | CERTIFICATION: FLIGHT CREWMEMBERS OTHER THAN PILOTS |
| 65 | 65.1 to 65.133 | CERTIFICATION: AIRMEN OTHER THAN FLIGHT CREWMEMBERS |
| 66 | TBD | CERTIFICATION: UAS SOFTWARE PROGRAMMERS |
| 67 | 67.1 to 67.415 | MEDICAL STANDARDS AND CERTIFICATION |

SUBCHAPTER E—AIRSPACE

| Part | Table of Contents | Headings |
|---|---|---|
| 71 | 71.1 to 71.901 | DESIGNATION OF CLASS A, B, C, D, AND E AIRSPACE AREAS; AIR TRAFFIC SERVICE ROUTES; AND REPORTING POINTS |
| 72 | TBD | DESIGNATION OF AIRSPACE FOR OPERATING AIRCRAFT IN ADS-B NON-MANDATED AIRSPACE |
| 73 | 73.1 to 73.85 | SPECIAL USE AIRSPACE |
| 75 | | [RESERVED] |
| 77 | 77.1 to 77.41 | SAFE, EFFICIENT USE, AND PRESERVATION OF THE NAVIGABLE AIRSPACE |

FIG. 7A

TITLE 14—Aeronautics and Space

CHAPTER I—FEDERAL AVIATION ADMINISTRATION, DEPARTMENT OF TRANSPORTATION (CONTINUED)

SUBCHAPTER F—AIR TRAFFIC AND GENERAL OPERATING RULES

PART 91—GENERAL OPERATING AND FLIGHT RULES

Appendices (Redacted)

Subpart A—GENERAL
§91.1 Applicability.
§91.3 Responsibility and authority of the pilot in command.
§91.2 Responsibility and authority of the software programmer in command of a UAS.
§91.5 Pilot in command of aircraft requiring more than one required pilot.
§91.7 Civil aircraft airworthiness.
§91.8 UAS airworthiness and NU-STAR testing/designation.
§91.9 Civil aircraft flight manual, marking, and placard requirements.
§91.11 Prohibition on interference with crewmembers.
§91.13 Careless or reckless operation.
§91.15 Dropping objects.
§91.17 Alcohol or drugs.
§91.19 Carriage of narcotic drugs, marihuana, and depressant or stimulant drugs or substances.
§91.21 Portable electronic devices.
§91.23 Truth-in-leasing clause requirement in leases and conditional sales contracts.
§91.25 Aviation Safety Reporting Program: Prohibition against use of reports for enforcement purposes.
§§91.27-91.99 [Reserved]

Subpart B—FLIGHT RULES

GENERAL

§91.101 Applicability.
§91.103 Preflight action.
§91.105 Flight crewmembers at stations.
§91.107 Use of safety belts, shoulder harnesses, and child restraint systems.
§91.109 Flight instruction; Simulated instrument flight and certain flight tests.
§91.111 Operating near other aircraft: Limits based on NU-STAR and altitude.
§91.113 Right-of-way rules: Except water operations.
§91.115 Right-of-way rules: Water operations.

FIG. 7B

§91.117 Aircraft speed: Limits based on NU-STAR and altitude.
§91.119 Minimum safe altitudes: General, Avoidance of surface and spatial obstacles.
§91.121 Altimeter settings and use of GPS
§91.123 Compliance with ATC clearances and instructions.
§91.125 ATC light signals and text signals.
§91.126 Operating on or in the vicinity of an airport in Class G airspace.
§91.127 Operating on or in the vicinity of an airport in Class E airspace.
§91.129 Operations in Class D airspace.
§91.130 Operations in Class C airspace.
§91.131 Operations in Class B airspace.
§91.133 Restricted and prohibited areas.
§91.135 Operations in Class A airspace.
§91.137 Temporary flight restrictions in the vicinity of disaster/hazard areas; Geo-fencing.
§91.138 Temporary flight restrictions in national disaster areas in the State of Hawaii.
§91.139 Emergency air traffic rules: Based on NU-STAR.
§91.141 Flight restrictions in the proximity of the Presidential and other parties; Geo-fencing.
§91.143 Flight limitation in the proximity of space flight operations; Geo-fencing.
§91.144 Temporary restriction on flight operations during abnormally high barometric pressure conditions; Geo-fencing.
§91.145 Management of aircraft operations in the vicinity of aerial demonstrations and major sporting events; Geo-fencing.
§91.146 Passenger-carrying flights for the benefit of a charitable, nonprofit, or community event.
§91.147 Passenger carrying flights for compensation or hire.
§§91.148-91.149 [Reserved]

VISUAL/VIRTUAL FLIGHT RULES (V/VFR OR V2FR)

§91.151 Fuel requirements for flight in V2FR conditions.
§91.153 V2FR flight plan: Information required; NU-STAR designation.
§91.155 Basic V2FR weather minimums; NU-STAR designation.
§91.157 Special V2FR weather minimums; NU-STAR designation.
§91.159 V2FR cruising altitude or flight level; NU-STAR designation.
§91.161 Special awareness training required for pilots flying under visual/virtual flight rules within a 60-nautical mile radius of the Washington, DC VOR/DME.
§§91.162-91.165 [Reserved]

INSTRUMENT/INTEGRATED FLIGHT RULES (I/IFR OR I2FR)

§91.167 Fuel requirements for flight in I2FR conditions.
§91.169 I2FR flight plan: Information required; NU-STAR designation.
§91.171 VOR equipment check for I2FR operations; NU-STAR designation.

FIG. 7C

§91.173 ATC clearance and flight plan required; NU-STAR designation.
§91.175 Takeoff and landing under I2FR; NU-STAR designation.
§91.177 Minimum altitudes for I2FR operations; NU-STAR designation.
§91.179 I2FR cruising altitude or flight level; NU-STAR designation.
§91.180 Operations within airspace designated as Reduced Vertical Separation Minimum airspace.
§91.181 Course to be flown; NU-STAR designation.
§91.183 I2FR communications; NU-STAR designation.
§91.185 I2FR operations: Two-way radio communications failure; NU-STAR designation.
§91.187 Operation under I2FR in controlled airspace: Malfunction reports; NU-STAR designation.
§91.189 Category II and III operations: General operating rules.
§91.191 Category II and Category III manual.
§91.193 Certificate of authorization for certain Category II operations.
§§91.195-91.199 [Reserved]

Subpart C—EQUIPMENT, INSTRUMENT, AND CERTIFICATE REQUIREMENTS

§91.201 [Reserved]
§91.203 Civil aircraft: Certifications required.
§91.204 Unmanned aerial systems (UAS): Certifications required; NU-STAR required.
§91.205 Powered civil aircraft with standard category U.S. airworthiness certificates: Instrument and equipment requirements.
§91.207 Emergency locator transmitters.
§91.209 Aircraft lights.
§91.211 Supplemental oxygen.
§91.213 Inoperative instruments and equipment: Effect on NU-STAR capability reporting.
§91.215 ATC transponder and altitude reporting equipment and use.
§91.203 Autonomous Situational Awareness Platform (ASAP): Requirements and use.
§91.217 Data correspondence between automatically reported pressure altitude data and the pilot's altitude reference.
§91.219 Altitude alerting system or device: Turbojet-powered civil airplanes.
§91.221 Traffic alert and collision avoidance system equipment and use: ASAP requirements.
§91.223 Terrain awareness and warning system.
§91.203 Surface obstacle and spatial obstacle database system: ASAP requirements.
§91.225 Automatic Dependent Surveillance-Broadcast (ADSB) Out equipment and use.
§91.227 Automatic Dependent Surveillance-Broadcast (ADSB) Out equipment performance requirements.
§§91.228-91.299 [Reserved]

Subpart D—SPECIAL FLIGHT OPERATIONS

§91.301 [Reserved]

FIG. 7D

§91.303 Aerobatic flight: Geo-fencing or ASAP requirement.
§91.305 Flight test areas: Geo-fencing or ASAP requirement.
§91.307 Parachutes and parachuting: Geo-fencing or ASAP requirement.
§91.309 Towing: Gliders and unpowered ultralight vehicles: Geo-fencing or ASAP requirement.
§91.311 Towing: Other than under §91.309.
§91.313 Restricted category civil aircraft: Operating limitations.
§91.315 Limited category civil aircraft: Operating limitations.
§91.317 Provisionally certificated civil aircraft: Operating limitations.
§91.319 Aircraft having experimental certificates: Operating limitations.
§91.321 Carriage of candidates in elections: NU-STAR capability number.
§91.323 Increased maximum certificated weights for certain airplanes operated in Alaska.
§91.325 Primary category aircraft: Operating limitations.
§91.327 Aircraft having a special airworthiness certificate in the light-sport category: Operating limitations; Geo-fencing or ASAP requirement.
§§91.328-91.399 [Reserved]

Subpart E—MAINTENANCE, PREVENTIVE MAINTENANCE, AND ALTERATIONS

§91.401 Applicability.
§91.403 General.
§91.405 Maintenance required.
§91.407 Operation after maintenance, preventive maintenance, rebuilding, or alteration.
§91.409 Inspections.
§91.410 [Reserved]
§91.411 Altimeter system and altitude reporting equipment tests and inspections.
§91.413 ATC transponder tests and inspections.
§91.414 Autonomous Situational Awareness Platform (ASAP) tests and inspections.
§91.415 Changes to aircraft inspection programs.
§91.417 Maintenance records.
§91.419 Transfer of maintenance records.
§91.421 Rebuilt engine maintenance records.
§§91.423-91.499 [Reserved]

Subpart F—LARGE AND TURBINE-POWERED MULTIENGINE
AIRPLANES AND FRACTIONAL OWNERSHIP PROGRAM AIRCRAFT (Redacted)

Subpart G—ADDITIONAL EQUIPMENT AND OPERATING
REQUIREMENTS FOR LARGE AND TRANSPORT CATEGORY
AIRCRAFT (Redacted)

FIG. 7E

Subpart H—FOREIGN AIRCRAFT OPERATIONS AND OPERATIONS OF U.S.-REGISTERED CIVIL AIRCRAFT OUTSIDE OF THE UNITED STATES; AND RULES GOVERNING PERSONS ON BOARD SUCH AIRCRAFT (Redacted)

Subpart I—OPERATING NOISE LIMITS

§91.801 Applicability: Relation to part 36.
§91.803 Part 125 operators: Designation of applicable regulations.

§91.805 Final compliance: Subsonic airplanes.
§§91.807-91.813 [Reserved]
§91.815 Agricultural and firefighting airplanes: Noise operating limitations.
§91.817 Civil aircraft sonic boom.
§91.819 Civil supersonic airplanes that do not comply with part 36.
§91.821 Civil supersonic airplanes: Noise limits.
<u>§91.822 Aircraft operating under 2,500 feet AGL: Noise limits.</u>
§§91.823-91.849 [Reserved]
§91.851 Definitions.
§91.853 Final compliance: Civil subsonic airplanes.
§91.855 Entry and nonaddition rule.
§91.857 Stage 2 operations outside of the 48 contiguous United States.
§91.858 Special flight authorizations for non-revenue Stage 2 operations.
§91.859 Modification to meet Stage 3 or Stage 4 noise levels.
§91.861 Base level.
§91.863 Transfers of Stage 2 airplanes with base level.
§91.865 Phased compliance for operators with base level.
§91.867 Phased compliance for new entrants.
§91.869 Carry-forward compliance.
§91.871 Waivers from interim compliance requirements.
§91.873 Waivers from final compliance.
§91.875 Annual progress reports.
§91.877 Annual reporting of Hawaiian operations.
§§91.879-91.880 [Reserved]
§91.881 Final compliance: Civil subsonic jet airplanes weighing 75,000 pounds or less.
§91.883 Special flight authorizations for jet airplanes weighing 75,000 pounds or less.
§§91.884-91.899 [Reserved]

Subpart J—WAIVERS (Redacted)

FIG. 7F

Subpart K—FRACTIONAL OWNERSHIP OPERATIONS (Redacted)

Subpart L—CONTINUED AIRWORTHINESS AND SAFETY IMPROVEMENTS (Redacted)

Subpart M—SPECIAL FEDERAL AVIATION REGULATIONS (Redacted)

TITLE 14—Aeronautics and Space

CHAPTER I—FEDERAL AVIATION ADMINISTRATION, DEPARTMENT OF TRANSPORTATION (CONTINUED)

SUBCHAPTER F—AIR TRAFFIC AND GENERAL OPERATING RULES

PART 99—SECURITY CONTROL OF AIR TRAFFIC

Subpart A—GENERAL

§99.1 Applicability.
§99.3 Definitions.
§99.5 Emergency situations.
§99.6 Updating NU-STAR Number during emergency situations.
§99.7 Special security instructions.
§99.9 Radio requirements.
§99.10 Two-way data link requirements.
§99.11 ADIZ flight plan requirements.
§99.12 [Reserved]
§99.13 Transponder-on requirements.
§99.14 Autonomous Situational Awareness Platform (ASAP)-on requirements.
§99.15 Position reports; ASAP initiated.
§99.17 Deviation from flight plans and ATC clearances and instructions.
§§99.19-99.31 [Reserved]

Subpart B—DESIGNATED AIR DEFENSE IDENTIFICATION ZONES (Redacted)

FIG. 7G

TITLE 14—Aeronautics and Space

CHAPTER I—FEDERAL AVIATION ADMINISTRATION, DEPARTMENT OF TRANSPORTATION (CONTINUED)

SUBCHAPTER F—AIR TRAFFIC AND GENERAL OPERATING RULES

PART 101—MOORED BALLOONS, KITES, AMATEUR ROCKETS AND UNMANNED FREE BALLOONS

Subpart A—GENERAL

§101.1 Applicability.
§101.3 Waivers.
§101.5 Operations in prohibited or restricted areas.
§101.7 Hazardous operations.

Subpart B—MOORED BALLOONS AND KITES

§101.11 Applicability.
§101.13 Operating limitations.
§101.15 Notice requirements.
§101.17 Lighting and marking requirements.
§101.19 Rapid deflation device.
§101.20 Geo-fencing or ASAP requirements.

Subpart C— AMATEUR ROCKETS

§101.21 Applicability.
§101.22 Definitions.
§101.23 General operating limitations.
§101.25 Operating limitations for Class 2-High Power Rockets and Class 3-Advanced High Power Rockets.
§101.27 ATC notification for all launches; Geo-fencing requirements.
§101.29 Information requirements.

Subpart D—UNMANNED FREE BALLOONS
§101.31 Applicability.
§101.33 Operating limitations.
§101.35 Equipment and marking requirements.
§101.37 Notice requirements.
§101.39 Balloon position reports.
§101.40 Geo-fencing or ASAP requirements.

FIG. 7H

TITLE 14—Aeronautics and Space

CHAPTER I—FEDERAL AVIATION ADMINISTRATION, DEPARTMENT OF TRANSPORTATION (CONTINUED)

SUBCHAPTER F—AIR TRAFFIC AND GENERAL OPERATING RULES

PART 103—ULTRALIGHT VEHICLES

Subpart A—GENERAL

§103.1 Applicability.
§103.3 Inspection requirements.
§103.5 Waivers.
§103.7 Certification and registration.

Subpart B—OPERATING RULES

§103.9 Hazardous operations.
§103.11 Daylight operations.
<u>§103.13 Operation near aircraft; right-of-way rules; ASAP and NU-STAR requirements.</u>
<u>§103.15 Operations over congested areas; ASAP and NU-STAR requirements.</u>
§103.17 Operations in certain airspace.
§103.19 Operations in prohibited or restricted areas.
§103.20 Flight restrictions in the proximity of certain areas designated by notice to airmen.
§103.21 Visual reference with the surface.

TITLE 14—Aeronautics and Space

CHAPTER I—FEDERAL AVIATION ADMINISTRATION, DEPARTMENT OF TRANSPORTATION (CONTINUED)

SUBCHAPTER F—AIR TRAFFIC AND GENERAL OPERATING RULES

PART 105—PARACHUTE OPERATIONS

§105.1 Applicability.
§105.3 Definitions.
§105.5 General.
§105.7 Use of alcohol and drugs.
§105.9 Inspections.

FIG. 7I

Subpart B—OPERATING RULES

§105.13 Radio equipment and use requirements; Geo-fencing or ASAP and NU-STAR requirements.
§105.15 Information required and notice of cancellation or postponement of a parachute operation.
§105.17 Flight visibility and clearance from cloud requirements.
§105.19 Parachute operations between sunset and sunrise.
§105.21 Parachute operations over or into a congested area or an open-air assembly of persons.
§105.23 Parachute operations over or onto airports.
§105.25 Parachute operations in designated airspace; Geo-fencing requirements.

Subpart C—PARACHUTE EQUIPMENT AND PACKING

§105.41 Applicability.
§105.43 Use of single-harness, dual-parachute systems.
§105.45 Use of tandem parachute systems.
§105.47 Use of static lines.
§105.49 Foreign parachutists and equipment.

FIG. 7J

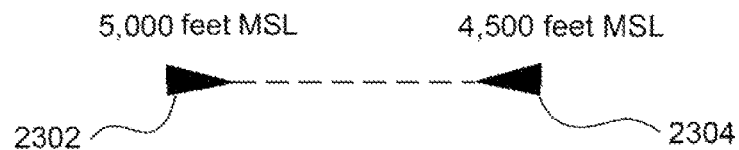
FIG. 23A
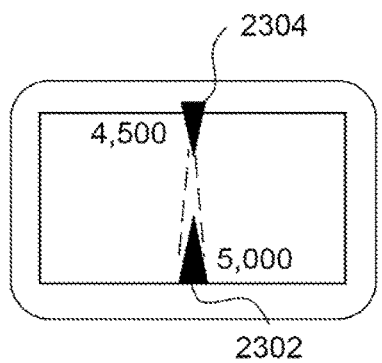 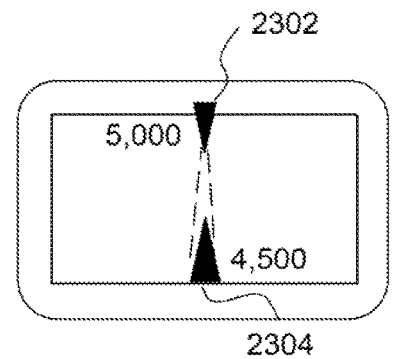
FIG. 23B          FIG. 23C

UNMANNED AIRCRAFT SYSTEMS TRAFFIC MANAGEMENT

CROSS-REFERENCE TO RELATED APPLICATION

This application claims the benefit of U.S. Provisional Application No. 61/918,170, filed Dec. 19, 2013. The above-identified U.S. provisional patent application is hereby incorporated by reference in its entirety.

ORIGIN OF THE INVENTION

The invention described herein was made by one or more employees of the United States Government and may be manufactured and used by or for the Government of the United States of America for governmental purposes without the payment of any royalties thereon or therefore.

FIELD OF THE INVENTION

The present invention relates to a traffic management system for unmanned aircraft (or aerial) systems (UASs). More specifically, the invention provides a system for the safe and efficient operation of UASs at low-altitude (generally under 10,000 feet MSL).

BACKGROUND OF THE INVENTION

In the early years of commercial air transport, the National Airspace System, used by commercial airlines, comprised of controlled and uncontrolled airspace. Aircrews would typically begin a flight on an instrument flight regulations (IFR) route directed by Air Traffic Control. At a downstream waypoint in the flight, aircrews would enter uncontrolled airspace or visual flight regulations (VFR) airspace which was not supervised by Air Traffic Control. In uncontrolled airspace, aircrews were responsible for visually identifying and avoiding other aircraft. In 1956, two commercial airlines collided over the Grand Canyon while operating in uncontrolled VFR airspace. All crew and passengers perished in the collision. As a result of this tragedy, sweeping changes to the National Airspace System were developed and implemented for safer commercial flight operations. Today, the National Airspace System at an altitude above 10,000 feet (higher or lower depending on the geographic location) is all controlled airspace managed by Air Traffic Control of the Federal Aviation Administration. No aerospace vehicle may operate in FAA controlled airspace without first meeting stringent requirements for vehicle flight airworthiness, on-board communications and avionics equipment, air traffic patterns and routes, and many other safety related aspects. In uncontrolled airspace at altitudes below 10,000 feet, aviation operations include model/experimental aircraft, general aviation aircraft, helicopters, gliders, and skydiving operations. These activities are subject to separate but less stringent FAA regulations.

As a general overview, FIG. 1 is a representation of the current National Airspace System (NAS). Generally, the NAS includes classes of airspace: Class A, B, C, D, E, and G. Each class is governed by laws and regulations regarding operation of aircraft type, aircraft equipment required, and how an aircraft may operate with the class. Class A airspace extends from 18,000 feet MSL to FL 600 (or 60,000 feet MSL). Unless otherwise authorized, all aircraft must be operated under Instrument Flight Regulations (IFR). Class B airspace extends from the surface to 10,000 feet MSL surrounding the nation's busiest airports. Class C airspace extends from the surface to 4,000 feet above the airport elevation surrounding those airports that have an operation control tower, are serviced by a radar approach control, and that have a certain number of IFR operations. Class D airspace extends from the surface to 2,500 feet above the airport elevation surrounding those airports that have an operation control tower. Class E airspace is controlled airspace that is not Class A, B, C, or D. Class G airspace is uncontrolled airspace that is not designated as Class A, B, C, D, or E. FIG. 1 illustrates more Class E airspace than Class G airspace. However, generally, Class G airspace (uncontrolled) is most abundant, away from large cities.

While the first 100 years of aviation history have been focused on manned aircraft operating in the National Airspace System, there has recently been a surge of interest in unmanned aerial systems (UASs). For example, in the past 10+ years, the Department of Defense has placed great emphasis on acquisitioning and employing UASs in support of combat operations. In the Iraq War (Operation Iraqi Freedom) and the War in Afghanistan (Operation Enduring Freedom), several types of high-altitude and low-altitude UASs have been utilized. However, interest in UASs is not limited to military operations. A number of civilian UASs have been designed for commercial purposes. The rapidly increasing interest and employment of civilian UASs for commercial gain raises many safety concerns, given the current, limited regulations at lower altitudes. Our current National Airspace System generally is limited to controlling airspace above 10,000 feet (higher or lower in some areas). A civilian UAS operating over 10,000 feet would need to comply with all FAA rules and regulations regarding aircraft airworthiness, equipment requirements, following ATC instructions and routes, etc. However, civilian UASs operating at low-altitude, below 10,000 feet, are not subject to such regulations. As such, low-altitude UASs operations are very limited. Yet, the potential benefit of low-altitude UASs operations is becoming increasingly apparent. For example, low-altitude UASs may be utilized for delivery of goods and services in urban and rural areas, imaging and surveillance for agricultural, infrastructure and utility management, and medical product/service delivery.

The Federal Aviation Administration (FAA) is working on a system to enhance safety and efficiency in the National Airspace System above 10,000 feet MSL by employing the Automatic Dependent Surveillance-Broadcast (ADS-B) system. FIG. 2 illustrates where ADS-B will be implemented in the NAS, while FIG. 3 shows an implementation model of ADS-B. ADS-B is an environmentally friendly technology that enhances safety and efficiency, and directly benefits pilots, controllers, airports, airlines, and the public. It forms the foundation for Next Generation Air Transportation System or NextGen by moving from ground radar and navigational aids to precise tracking using satellite signals. With ADS-B, pilots for the first time see what controllers see: displays showing other aircraft in the sky. Cockpit displays also pinpoint hazardous weather and terrain, and give pilots important flight information, such as temporary flight restrictions.

ADS-B reduces the risk of runway incursions with cockpit and controller displays that show the location of aircraft and equipped ground vehicles on airport surfaces—even at night or during heavy rainfall. ADS-B applications being developed now will give pilots indications or alerts of potential collisions. ADS-B also provides greater coverage since ground stations are so much easier to place than radar.

Remote areas without radar coverage, like the Gulf of Mexico and parts of Alaska, now have surveillance with ADS-B.

Relying on satellites instead of ground navigational aids also means aircraft will be able to fly more directly from Point A to B, saving time and money, and reducing fuel burn and emissions. The improved accuracy, integrity and reliability of satellite signals over radar means controllers eventually will be able to safely reduce the minimum separation distance between aircraft and increase capacity in the nation's skies.

Only ADS-B Out is mandated, and only within certain airspace. Title 14 CFR § 91.225 defines the airspace within which these requirements apply. On Jan. 1, 2020, when operating in the airspace designated in 14 CFR § 91.225 one must be equipped with ADS-B Out avionics that meet the performance requirements of 14 CFR § 91.227. Aircraft not complying with the requirements may be denied access to this airspace. Under the rule, ADS-B Out performance will be required to operate in: 1) Class A, B, and C airspace; 2) Class E airspace within the 48 contiguous states and the District of Columbia at and above 10,000 feet MSL, excluding the airspace at and below 2,500 feet above the surface; 3) Class E airspace at and above 3,000 feet MSL over the Gulf of Mexico from the coastline of the United States out to 12 nautical miles; and 4) Around those airports identified in 14 CFR part 91, Appendix D.

ADS-B Out is the ability to transmit a properly formatted ADS-B message from the aircraft to ground stations and to ADS-B-In-equipped aircraft. ADS-B In is the ability of an aircraft to receive information transmitted from ADS-B ground stations and from other aircraft. ADS-B In is not mandated by the ADS-B Out rule. If an operator chooses to voluntarily equip an aircraft with ADS-B In avionics, a compatible display is also necessary to see the information.

While the FAA's ADS-B system appears promising for enhancing air traffic capabilities for large aircraft (for example, commercial airliners) above 10,000 feet MSL, it may not be feasible to implement the system with small UASs and general aviation aircraft operating under 10,000 feet MSL.

Referring now to FIG. 4, another traffic management system being implemented in the U.S. is the Automatic Identification System (AIS) for automatically tracking ships and other nautical vessels. Managed by the U.S. Coast Guard, AIS is a maritime navigation safety communications system standardized by the International Telecommunication Union (ITU) and adopted by the International Maritime Organization (IMO) that provides vessel information, including the vessel's identity, type, position, course, speed, navigational status and other safety-related information automatically to appropriately equipped shore stations, other ships, and aircraft; receives automatically such information from similarly fitted ships; monitors and tracks ships; and exchanges data with shore-based facilities.

The AIS is a shipboard broadcast system that acts like a transponder, operating in the VHF maritime band, that is capable of handling well over 4,500 reports per minute and updates as often as every two seconds. It uses Self-Organizing Time Division Multiple Access (SOTDMA) technology to meet this high broadcast rate and ensure reliable ship-to-ship operation. Each AIS system consists of one VHF transmitter, two VHF TDMA receivers, one VHF DSC receiver, and standard marine electronic communications links (IEC 61162/NMEA 0183) to shipboard display and sensor systems. Position and timing information is normally derived from an integral or external global navigation satellite system (e.g. GPS) receiver, including a medium frequency differential GNSS receiver for precise position in coastal and inland waters. Other information broadcast by the AIS, if available, is electronically obtained from shipboard equipment through standard marine data connections. Heading information and course and speed over ground would normally be provided by all AIS-equipped ships. Other information, such as rate of turn, angle of heel, pitch and roll, and destination and ETA could also be provided.

AIS normally works in an autonomous and continuous mode, regardless of whether it is operating in the open seas or coastal or inland areas. Transmissions use 9.6 kb GMSK FM modulation over 25 or 12.5 kHz channels using HDLC packet protocols. Although only one radio channel is necessary, each station transmits and receives over two radio channels to avoid interference problems, and to allow channels to be shifted without communications loss from other ships. The system provides for automatic contention resolution between itself and other stations, and communications integrity is maintained even in overload situations.

Each station determines its own transmission schedule (slot), based upon data link traffic history and knowledge of future actions by other stations. A position report from one AIS station fits into one of 2250 time slots established every 60 seconds. AIS stations continuously synchronize themselves to each other, to avoid overlap of slot transmissions. Slot selection by an AIS station is randomized within a defined interval, and tagged with a random timeout of between 0 and 8 frames. When a station changes its slot assignment, it pre-announces both the new location and the timeout for that location. In this way new stations, including those stations which suddenly come within radio range close to other vessels, will always be received by those vessels. The required ship reporting capacity according to the IMO performance standard amounts to a minimum of 2000 time slots per minute, though the system provides 4500 time slots per minute. The SOTDMA broadcast mode allows the system to be overloaded by 400 to 500 percent through sharing of slots, and still provide nearly 100 percent throughput for ships closer than 8 to 10 NM to each other in a ship to ship mode. In the event of system overload, only targets further away will be subject to drop-out, in order to give preference to nearer targets that are a primary concern to ship operators. In practice, the capacity of the system is nearly unlimited, allowing for a great number of ships to be accommodated at the same time.

The system coverage range is similar to other VHF applications, essentially depending on the height of the antenna. Its propagation is slightly better than that of radar, due to the longer wavelength, so it's possible to "see" around bends and behind islands if the land masses are not too high. A typical value to be expected at sea is nominally 20 nautical miles. With the help of repeater stations, the coverage for both ship and VTS stations can be improved considerably.

The U.S. Coast Guard has developed rules applicable to both U.S. and foreign-flag vessels that require owners and operators of most commercial vessels to install and use the AIS. The AIS rule is part of a domestic and international effort to increase the security and safety of maritime transportation. Current AIS regulations, 33 CFR § 164.46, became effective on Nov. 21, 2003, and, require that all vessels denoted 33 CFR § 164.46(a) be outfitted with an USCG 'type-approved' and 'properly installed' AIS no later than Dec. 31, 2004.

Shipboard AIS units autonomously broadcast two different AIS messages: a 'position report' which includes the vessels dynamic data (e.g. latitude, longitude, position accuracy, time, course, speed, navigation status); and, a 'static and voyage related report' which includes data particular to the vessel (e.g. name, dimensions, type) and regarding its voyage (e.g. static draft, destination, and ETA). Position reports are broadcasted very frequently (between 2-10 seconds—depending on the vessels speed—or every 3 minutes if at anchor), while static and voyage related reports are sent every six minutes; thus it is common and likely that an AIS user will receive numerous position reports from a vessel prior to receipt of the vessels' name and type, etc.

AIS users are required to operate their unit with a valid MMSI, unfortunately, some users neglect to do so (for example, use: 111111111, 123456789, 00000001, their U.S. documentation number, etc.). A valid MMSI will start with a digit from 2 to 7, a U.S. assigned MMSI will start with either 338, 366, 367, 368, or 369. AIS users whom encounter a vessel using MMSI: 1193046 or named: NAUT should notify the user that their AIS unit is broadcasting improper data. All AIS users should check the accuracy of their AIS data prior to each voyage, and, particularly units that have been shutdown for any period of time.

While the U.S. Coast Guard's Automatic Identification System appears promising for enhancing traffic capabilities for nautical vessels, it is not directly transferable to aviation applications, as AIS is two-dimensional (i.e., tracks vessels on the surface of the earth), and AIS requires a human (a navigator of a vessel) to view a display and make course corrections based on AIS information and other marine navigation equipment.

Several efforts to integrate civilian UASs into the National Airspace System have been proposed. However, none of these have addressed civilian low-altitude applications, and thus economic development is being stifled. Some people have recognized this dilemma and have proposed various ways to increase UASs flight safety. For example, U.S. Pat. No. 7,269,513 to Herwitz (funded by NASA under a Cooperative Agreement) describes a ground-based sense-and-avoid display system (SAVDS) for unmanned aerial vehicles. SAVDS integrates airborne target position data from ground-based radar with unmanned aerial vehicle (UAV) position data from the UAV ground control station (GCS). The UAV GCS receives the UAV position data from a global positioning system (GPS) element in the flight management autopilot system in the UAV. Using a high-resolution display, the SAVDS shows the GPS position of the UAV in relation to other radar-detected airborne targets operating in the same airspace. With the SAVDS co-located adjacent to the GCS computer controlling the UAV, the SAVDS instructs the UAV operator to change the heading and/or elevation of the UAV until any potential midair aircraft conflict is abated. The radar-detected airborne target data and the UAV GPS data are integrated and displayed with geo-referenced background base maps that provide a visual method for tracking the UAV and for performing collision avoidance. (Abstract).

Another UASs safety-related invention is U.S. Pat. No. 8,358,677 to Collette et al. This patent describes a system and method for transmitting UAV position data to a central flight control center transmits UAV position data using a virtual transponder. A ground control station for controlling the UAV receives data from the UAV, including UAV position data. The UAV may provide GPS data, or corrected position data based on readings from an inertial navigation system. The ground control station transmits the UAV position data to a flight control center. (Abstract).

Furthermore, U.S. Pat. No. 8,386,175 to Limbaugh et al. (funded by the U.S. Air Force under contract) describes a UAS position reporting system. Implementations may include an air traffic control reporting system (ATC-RS) coupled with a ground control station (GCS) of an unmanned aerial system where the ATC-RS includes an automatic dependent surveillance broadcast (ADS-B) and a traffic information services broadcast (TIS-B) transceiver and one or more telecommunications modems. The ATC-RS may be adapted to receive position data of the UAS in an airspace from the GCS and communicate the position of the UAS in the airspace to a civilian air traffic control center (ATC) or to a military command and control (C2) communication center through an ADS-B signal or through a TIS-B signal through the ADS-B and TIS-B transceiver. The ATC-RS may also be adapted to display the position of the UAS in the airspace on one or more display screens coupled with the ATC-RS. (Abstract).

Finally, U.S. Patent Application Publication No. 2008/0033604 to Margolin describes a system and method for safely flying an unmanned aerial vehicle (UAV), unmanned combat aerial vehicle (UCAV), or remotely piloted vehicle (RPV) in civilian airspace that uses a remotely located pilot to control the aircraft using a synthetic vision system during at least selected phases of the flight such as during take-offs and landings. (Abstract).

These and other inventions seek to improve flight operations safety for UASs. However, past ideas for using UASs commercially have only focused on individual safety aspects of UASs operations, not the entire system. For example, for our road transportation system, there are traffic regulations, traffic signs, and traffic signals. For Visual Flight Rules (VFR) and Instrument Flight Rules (IFR) flight operation systems, there are rules, regulations, flight procedures, and an FAA air traffic management system providing control and support. However, none of the rules and regulations of our current ground transportation safety systems or current national airspace safety systems apply to the traffic management of UASs operating at low-altitude. There is a gap in our nation's transportation safety regulation systems and a lack of infrastructure to support low-altitude UASs operations. Moreover, there have been restrictions on use of UASs operations inside the National Airspace System, particularly in Class A, B, C, and D airspace.

What is needed, and what the present invention provides, is an overall UASs traffic management system (UTM) for low-altitude UASs operations, for example, in Class G airspace. UTM fills the gap between our nation's ground transportation system and National Airspace System. While the NAS is rigidly controlled by the FAA, UTM is more automated and requires very little or no Air Traffic Control oversight. It is recognized, however, that there could be some overlap or touch points where NAS operations may use similar altitudes during transition phases of flights for UASs. For these touch points, UTM accounts for airspace design, automation for scheduling and de-confliction, or a combination of the two, to seamlessly integrate UTM airspace and NAS airspace.

The characteristics of UTM, including the integration of hardware, software, automation, and flight procedures, are essential for preventing mid-air collisions in uncontrolled airspace, like the devastating accident over the Grand Canyon in 1956, and equally important, preventing mid-air collisions for UASs over highly populated areas. Furthermore, the next 100+ years of aviation history will likely be dominated by unmanned vehicles, and possibly personal, manned aircraft. Using the lessons learned from today's Air Traffic Management system, UTM is essential to enable the accelerated growth of commercial and personal UASs applications. UTM enables civilian applications of micro, small, and medium size UASs to generate more economic value from airspace operations particularly at lower altitude and largely underutilized airspace, for example Class G airspace, and other non-FAA controlled airspace.

SUMMARY OF THE INVENTION

The present invention provides a UAS Traffic Management (UTM) system to allow safe and efficient UASs operations in low-altitude airspace where air vehicles, such as general aviation aircraft, gliders, balloons, blimps, helicopters, and other small aerospace vehicles currently operate. Furthermore, UTM provides airspace integration for UASs needing to operate in or through higher altitude ATC controlled airspace. UTM supports all types of UASs operations ranging from disposable UASs with minimal avionics capabilities to highly capable UASs with sophisticated avionics and communications equipment.

UTM supports safe and efficient low-altitude UASs operations by providing airspace design and rules where, for example, altitudes are assigned based on direction of flight; geo-fencing design and updates based on need to avoid sensitive areas (e.g., noise sensitive areas or high value assets); surveillance of vehicles; weather and wind prediction and integration with route and flow management; avoidance of hazardous winds, wake, and weather (W3); congestion management; constraint and obstacle management (e.g., terrain, tall natural and man-made structures); demand and capacity imbalance management for crossing points, arrival and departure phases; route planning and re-routing; separation assurance, sequencing and spacing; collision avoidance and recovery; emergency landing site selection and landing, if needed; non-normal procedures such as lost link, engine/power outage, and ditching without interference with other aerial traffic or population areas; and minimum requirements for UASs to operate at lower altitudes as related to communication, sensors, navigation, collision avoidance; classification of UASs based on their performance characteristics in terms of weight, wake, ability to operate with certain types of wind and weather.

To ensure safe and efficient UASs operations at low-altitude, UTM integrates numerous aviation principles and tools, such as traffic flow management, separation assurance, collision avoidance, weather/wind integration, emergency landing planner, rescheduling and re-planning algorithms for traffic flow management, trajectory generation and updates to trajectories, Dynamic Weather Routes, traffic aware strategic aircrew requests, 4D flight management system, autonomous cueing for control envelope prediction, surface movement operations automation, advanced caution and warning systems, diagnostic and prognostic decision making, tele-operations, waypoint planning, robust and optimal controls, constraint-based planning, human automation interaction; human performance measures, human performance modeling, function allocation, and automatic kill-safe (for UAS Grand Challenge, for example).

The UASs traffic management system of the present invention includes, but is not limited to, the following objectives:

Provides concept of operations and functional design of UASs traffic management flight regulations to accommodate low-altitude civilian UASs applications such as goods and services delivery;

Provides requirements, integration, and separation considerations for UASs with current low-altitude flying vehicles, such as helicopters and general aviation aircraft;

Provides functional requirements that support sense and avoid obstacle avoidance; hazardous winds, wake, and weather avoidance; airspace congestion prediction and management; and airspace management and design (e.g., arrivals and departures management). Additionally, requirements related to separation management (which includes collision avoidance as well as separation maintenance) based on communication, navigation, and surveillance;

Provides identification of use cases where UTM would support low-altitude operations. These use cases include, but are not limited to: emergency response to events such as earthquakes, accidents, etc.; grocery and food delivery; medical equipment delivery. Business options such as, but not limited to, rent on-demand UASs, personal UASs, and retailer owned UASs;

Provides functional requirements to enable mobility and access for small and medium UASs to operate in low-altitudes, including but not limited to Class G airspace;

Provides identification of the type and altitude at which each UAS would need to be supported by UTM;

Provides requirements for UTM as related to automation/decision support functions as well as the role of humans in UTM;

Provides requirements for UASs capabilities so that they will seamlessly operate and communicate with UTM;

Provides identification of the trade space related to functional allocation between UASs and UTM. Such functions include conflict detection, collision avoidance, route planning and rerouting, congestion detection, prediction, and management, severe weather, wind, wake detection and prediction, communication, navigation, and surveillance;

Provides identification of performance measures such as efficiency, airspace congestion, safety, mobility, environmental impact (e.g., noise) as part of UTM architectural alternatives;

Provides identification of sensors, redundancy, data analytics, machine to machine interactions, machine learning, autonomy, autonomous operations, autonomicity, roles of humans, and automation in managing UTM under all weather and under all nominal and off-nominal scenarios. Furthermore, identification of alternatives related to human and automation roles regarding command and control of UTM. As appropriate, identification of human factors and autonomicity considerations to manage UTM;

Provides identification of the needs for airspace design and flight rules (i.e., UFR) such as flight routes (in the sky), stratification by altitude (and altitude strata), arrival/departure corridors, areas to avoid, or restrictions due to noise, dense areas, etc.;

Provides identification of failure mode scenarios of low-altitude UASs and graceful recovery strategies;

Provides airspace structures in real-time to assign altitude for direction of traffic, generate arrival/departure corridors, reduce crossing locations, determine arrival and departure locations, etc.;

Provides an understanding of wake characteristics of UASs and other general aviation aircraft to consider for minimum safe separation;

Provides assurance of safe separation from general aviation and gliders that operate in the same airspace;

Provides wind/weather conditions that are tolerable to different classes of UASs, i.e., weather and wind classification and developing guidelines as to which type of UASs can operate within each class;

Provides trajectories and updating those trajectories without landing;

Provides a determination of the ideal trajectory/descent profile to the landing site when landing is required;

Provides Real-time changes to trajectories based on winds/weather conditions and forecast in automated manner while ensuring integrity of mission needs;

Provides identification of degraded signal conditions (e.g., communication, lost link, or position accuracy) and development for trajectory management strategy;

Provides human-UTM interaction approaches and interfaces to enable entry of constraints, goals, user preferences, geo-fencing locations, separation management buffers, airspace design and configuration, etc.;

Provides methods for certifying UTM so a commercial/third party vendor/government operator entity can manage UASs traffic and operate UTM;

Provides minimum requirements on UASs for their avionics to interoperate with other UASs (agnostic to vendors and UASs manufacturers);

Provides a determination of when an unsafe condition arises so UASs operations may be safely terminated;

Establishes of search and rescue operations of fallen UASs;

Provides data and interface protocols for UASs operators to connect with UTM;

Provides alternative functional allocation schemes between UTM and UASs vehicle requirements;

Provides architecture alternatives: sensors and fusion, input/outputs, processing, command and control, networking options, communication, navigation, surveillance, redundancies, autonomicity characteristics, and human-computer interaction/interfaces;

Provides technology (or reuse existing technology and algorithms) for airspace design, flow management, trajectory management, geo-fencing, separation assurance (both aircraft and ground-based to cover differing UASs equipage and performance), collision avoidance, arrival and departure trajectories and corridors;

Provides UTM system functionalities including input/output, processing for all functions—airspace design; trajectory planning and re-planning (arrival site, altitude, speed, etc.); weather integration; separation management; collision avoidance; congestion and demand/capacity imbalance management; obstacle avoidance; emergency detection and support; self-configuration, self-optimization, self-protection, self-healing; human-machine interfaces and interactions; and command and control set up;

Provides UTM variations including a portable version to support smaller scale applications, as needed, as well as a real-time, continuous persistent version;

Provides simulations using laboratory as well as real, virtual, and constructive environment to demonstrate the feasibility of UTM to support heterogeneous UASs which vary in their equipage and performance characteristics in the presence of general aviation and gliders;

Provides demonstration of missions in a reserved airspace (airspace has been identified and UTM research team and partners can use this airspace);

Provides demonstration of missions in non-reserved Class G airspace;

Provides demonstration of missions in denser areas leading up to demonstrations and real-time use in urban areas;

Provides alternative business models to operate the low-altitude airspace and UTM. These models may consider delegated airspace to commercial operations (similar to road transportation models) where rules and limits are set and rest of the operations are managed by exception (privatize the low-altitude airspace and keep these UASs out of conflicts with general and commercial aviation by segregating airspace corridors or designing scheduling integration); and Provides requirements for UASs equipment regarding communications (and lost communications), surveillance, collision avoidance, intent broadcasting, flight plan publications, and other avionics. These requirements may vary from region to region based on expected density and complexity of operations in the airspace of interest (e.g., urban areas vs. remote areas) and applications (e.g., mission specific, payload, content of goods).

These and other objectives of UTM are achieved by the confluence of business models. For example, UTM may manage UASs automatically using advanced hardware and software capabilities; UTM may co-manage UASs with ATC control or partial control; UTM may manage UASs in designated zones outside FAA's day-to-day operations; UTM may manage UASs similar to the rules of a road transportation model; UTM may co-manage UASs with one or more commercial businesses; or UTM may use a hybrid of such models. Utilizing one or more of these business models, UTM includes the following characteristics:

Supports the transportation of goods and services to/from designated locations;

Supports micro, small, medium size, and full scale UASs;

Supports communication, navigation, and surveillance below 10,000 feet;

Accommodates different types of UASs capabilities such as highly capable UASs with on-board collision avoidance and reroute planning and disposable UASs that has only flight critical hardware/software on board;

Provides safe airspace operations by following procedures and airspace design that keep UASs separated from other UASs and general aviation aircraft;

Supports departure from and arrival into any location that is deemed safe. These arrival/departure operations include hand held departure, rooftop, garage, drive ways, parking lots, specially assigned locations, helipads, small airports, etc.;

Enables UASs to avoid airports and terminal areas that are used by large commercial aircraft;

Enables UASs to stay within geo-fencing developed for reasons such as noise sensitivity, high value assets, etc.;

Provides redundant architecture for communication, navigation, and surveillance to enable acceptable levels of safety;

Supports UASs emergencies and safeguards other UASs from such emergencies;

Supports operations at remote regions and urban areas;

Provides interactive human-UTM interfaces so that users can define and enter geo-fence areas to avoid noise sensitive areas, high-value or sensitive structures, and airports on an as-needed basis;

Supports on-line, real-time updates related wind/weather, 3D maps, terrain information to support UASs operations;

Generates interface with NAS system where UASs may fly in and out of UTM airspace and ATM airspace (e.g., Class G to Class A/B/C/D/E), and vice-a-versa, via electronic communication between UTM to ATM;

Supports autonomy principles such as self-configure, self-optimize, self-protect and self-heal;

Supports strategic as well as tactical UASs operations;

Authenticates UASs that meet minimal equipage standards;

Detects UASs that are "rogue" and UASs that will not meet minimal equipage standards;

Senses, detects, and tracks moving objects up to 10,000 feet, although most UASs missions for package delivery, wildlife monitoring, fire-fighting, crop dusting, and other applications will operate at an altitude of 500-1000 feet;

Predicts the trajectory of UASs for the next mile within about 1 minute;

Includes secure software/hardware (cannot be hacked);

Protects business confidential trajectories;

Provides persistent communication, navigation, and surveillance coverage under day and night time conditions, including reduced visibility conditions;

Predicts potential collisions between UASs and other objects including but not limited to birds, gliders, helicopters, model aircraft, personal air vehicles, special purpose balloons, jet wind turbines, etc.;

Operates without human intervention for sustainable operations but allows humans to stop the operations should there be an event that needs human intervention (i.e., kill switch);

Dynamically creates and adjusts geo-fencing areas which will need to be avoided due to special needs such as community concerns, security, fires, etc.;

Creates airspace corridors and dynamically adjusts them (e.g., lanes in the sky) with altitude for direction rules for nominal separation (similar to the right altitude for direction rules in the NAS) and efficiencies, for example vertical separation may be in 50 feet increments or less;

Monitors separation among UASs and predict conditions where the crossing or separation minima will be violated, for example horizontal separation minima may be 1 mile or less;

Acquires real-time access and process data about winds and weather conditions and predictions;

Sends changes to UASs trajectories to avoid severe wind and weather conditions;

Maintains updated terrain, maps, tall structures, power lines, etc. database that every UASs trajectory needs to avoid;

Self-configures under poor sensor/surveillance conditions due to reduced accuracy (e.g., sensors reduced accuracy in poor visibility, fog, etc.) where the separation buffers could be increased;

Determines last 10 feet considerations, for example, abort, divert, or go-around;

Supports delivery of cargo safely and at a safe location without impacting any other objects or people in the vicinity; supports a vision system on board or off-board at the pickup/receiving end; supports pickup/delivery confirmation and authentication to ensure the cargo is picked up/delivered to/from the right location;

Supports different business models where UTM could be operated by a third party vendor once the UTM system is certified;

Supports UASs in locating an appropriate and safe landing spot in case of UASs on-board emergencies, such as power outages and cargo mishandling;

Supports congestion prediction and management guidance to UASs so that alternative trajectories, speeds, and altitudes be provided and used;

Provides sequencing and spacing under tight airspace corridors by creating required time of arrivals (schedule based system);

Accommodates UASs that are autonomous as well as non-autonomous which depend on UTM to provide route/trajectory guidance;

Generates nominally conflict-free and efficient trajectories based on arrival and departure locations (latitude/longitude) and any specified time constraints and/or able to accept business trajectories provided by the operator/owner/retailer/renter of the UASs;

Operates on four properties of autonomicity: self-configuration, self-optimization, self-protection, and self-healing. Self-configuration is used to operate under the most efficient or degraded conditions (higher separation minima, dynamic geo-fencing, etc.). Self-optimization is used to generate most efficient trajectories given the demand and optimize overall throughput while maintaining individual vehicle level efficiencies. An extreme example of self-protection is the kill switch where UTM could not provide the necessary support for operations. It involves detecting degraded conditions (e.g., severe weather, impaired synthetic visibility) letting self-configuration decide how it would operate under such degraded conditions. Self-healing gradually moves towards normalcy after an off-nominal event; and Communicates and monitors all UASs to provide all-land-immediately scenarios (e.g., 9/11) to the nearest safe place, ensuring that rouge UASs are identified and appropriate actions are taken to remove rouge UASs "out of the system" should a need arise.

The foregoing objectives and characteristics of UTM provide a novel system that enables a new business paradigm for UASs operations across the nation and internationally. UTM may be operated by government agencies, non-profit organization, and/or commercial entities. For example, commercial businesses may operate UTM on a fee-for-service basis by one or more vendors to provide airspace operations management services for safe UASs flights within local areas, regional zones, or national/international borders.

In accordance with one aspect of the invention, there is provided a traffic management system for managing UASs operating at low-altitude. The system includes surveillance for locating and tracking UASs in uncontrolled airspace, for example, in airspace below 10,000 feet MSL. The system also includes flight rules for safe operation of UASs in uncontrolled airspace. The system further includes computers for processing said surveillance and for applying said flight rules to UASs.

The traffic management system may be portable, persistent, or a hybrid thereof. The surveillance includes at least one of radar, sensors, cell phone coverage, and/or global positioning system, and the surveillance locates and tracks substantially all aerospace vehicles below 10,000 feet MSL in a particular region.

The flight rules include rules for at least one of: severe wind, wake, and weather avoidance; collision avoidance; route planning and rerouting; dynamic weather routing; congestion management; obstacle avoidance; crossing point management; separation assurance; sequencing and spacing; arrival and departure procedures; trajectory management; corridor/airway selection; emergency management; geo-fencing; spatial-fencing; altitude assignment; controlled airspace avoidance (e.g., Class A, B, and C airspace); and vehicle classification, identification, authentication, and equipage.

The computers perform at least one of: severe wind, wake, and weather prediction and avoidance; collision prediction and avoidance; route planning and rerouting; dynamic weather routing; congestion management and resolution; obstacle sensing and avoidance; crossing point management; separation assurance; separation buffer calculations for degraded surveillance conditions and inclement weather; sequencing and spacing; arrival and departure phase management; trajectory generation and management; corridor creation and selection; emergency management; geo-fencing; spatial-fencing; altitude assignment; controlled airspace avoidance (e.g., Class A, B, and C airspace); autonomous cueing for surface movement, takeoff, departure, arrival, and landing; identification and management of degraded signals and lost links; last 10 feet calculations and management for abort, go-around, or divert; all-land-immediately determination and management; and vehicle authentication. The computers include autonomicity functions for self-configuration, self-optimization, self-protection, and self-healing. The computers also include a graphic interface for human interaction, and the graphic interface includes controls for setting constraints, goals, and preferences.

The UASs operating in the traffic management system include bi-directional communication and/or avionics equipment. The equipment calculates and transmits location information to other aircraft and/or to the computer, and the equipment is interoperable with other aviation communications equipment (e.g., aircraft radios, ATC radios, ADS-B). The equipment utilizes at least one of: radio frequency transmitters and receivers, cellular towers, internet, satellite, and station-orbiting aircraft. Additionally, the UASs operating in the traffic management system are at least one of small disposable aviation vehicles and larger highly capable aviation vehicles.

The traffic management system is managed by a commercial business, an academic institution, a government agency, or a combination thereof. The system manages UASs' missions selected from the group of: delivery of goods and services (including delivery in remote areas, delivery between mega-cities, delivery in urban areas, delivery with multiple networks such as hub-and-spoke, point-to-point); search and rescue; humanitarian support; wildfire mapping; agricultural monitoring; disaster management; thermal infrared power line surveys; law enforcement; telecommunications; weather monitoring; aerial imaging and mapping; television news coverage, sporting events, movie making; environmental monitoring; oil and gas exploration; freight transport; medical services delivery; and agricultural crop spraying/surveillance.

The traffic management system includes an aircraft testing and rating system based on aircrafts' performance, specifications, and equipage. The testing and rating system includes a unique identification number.

BRIEF DESCRIPTIONS OF THE DRAWINGS

A more complete understanding of the present invention, and the attendant advantages and features thereof, will be more readily understood by reference to the following detailed description when considered in conjunction with the accompanying drawing wherein:

FIGS. 7A-7J illustrate sample regulations for implementing a UTM system;

FIGS. 23A-23C show a right-of-way scenario in a UTM system between a UAS and a piloted aircraft flying IFR';

DETAILED DESCRIPTION OF THE INVENTION

The present invention is a UASs Traffic Management (UTM) system having system functionalities, airspace rules and design, system requirements, autonomy and autonomicity concepts and technology needs, and human factor considerations and architecture to enable significant growth in UAS applications at low-altitudes. UTM is in smaller scale compared to ATM for NAS but focused on seamless integration and efficient heterogeneous inclusion of small and medium size UASs operations at low-altitudes in urban and rural areas, and connections in between.

Overview UAS Traffic Management provides airspace design implications and rules of the airspace (e.g., stratification of airspace to reduce potential crossing points); separation management; severe weather, wind, wake, and obstacle avoidance strategies; UASs application specific needs; communication, navigation, and surveillance considerations; managing, detecting, and predicting the performance of airspace operations; and UASs degradation and recovery from degradation.

Figure 1:
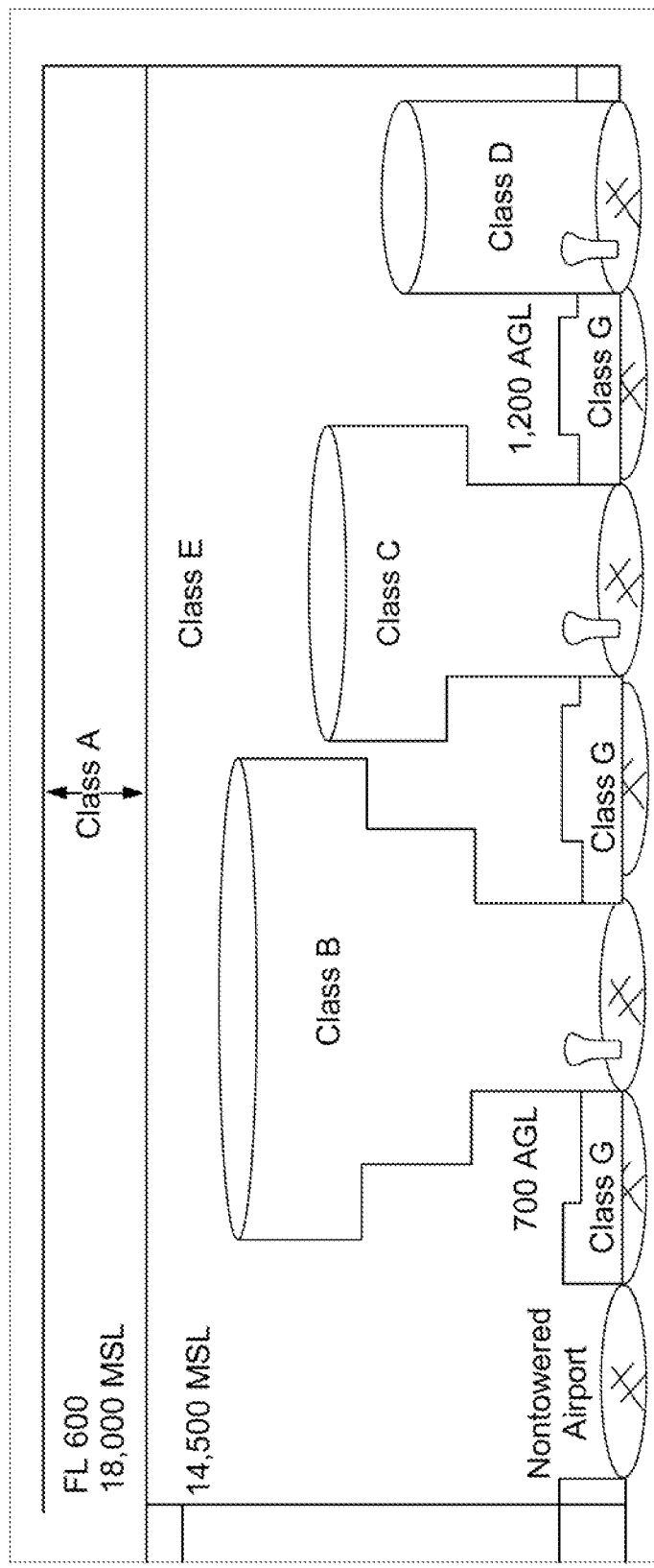
FIG. 1 illustrates the current National Airspace System with various classes of airspace.
Figure 2:
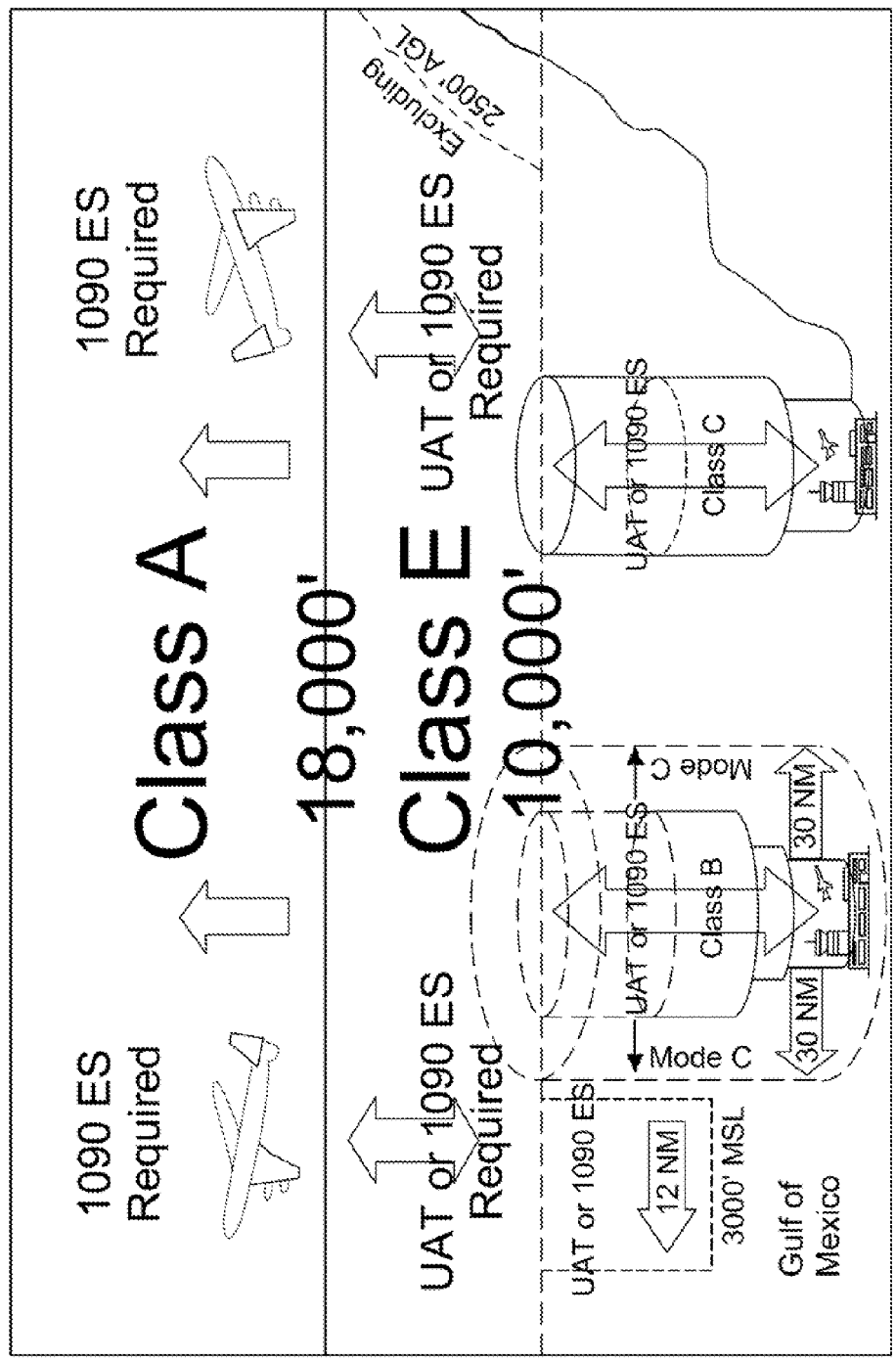
FIG. 2 shows the National Airspace System with the ADS-B mandate by the Federal Aviation Administration.
Figure 3:
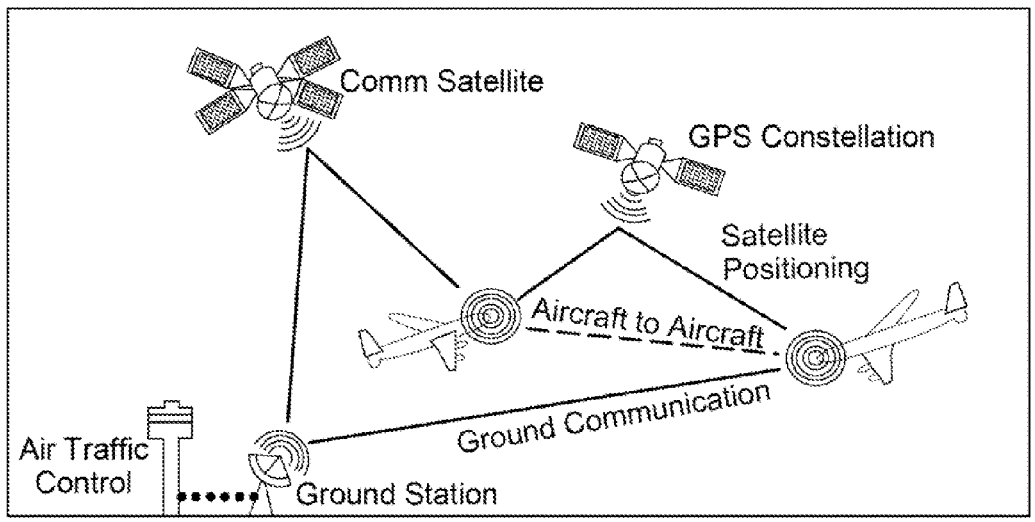
FIG. 3 illustrates an implementation of the ADS-B system in the National Airspace System.
Figure 4:
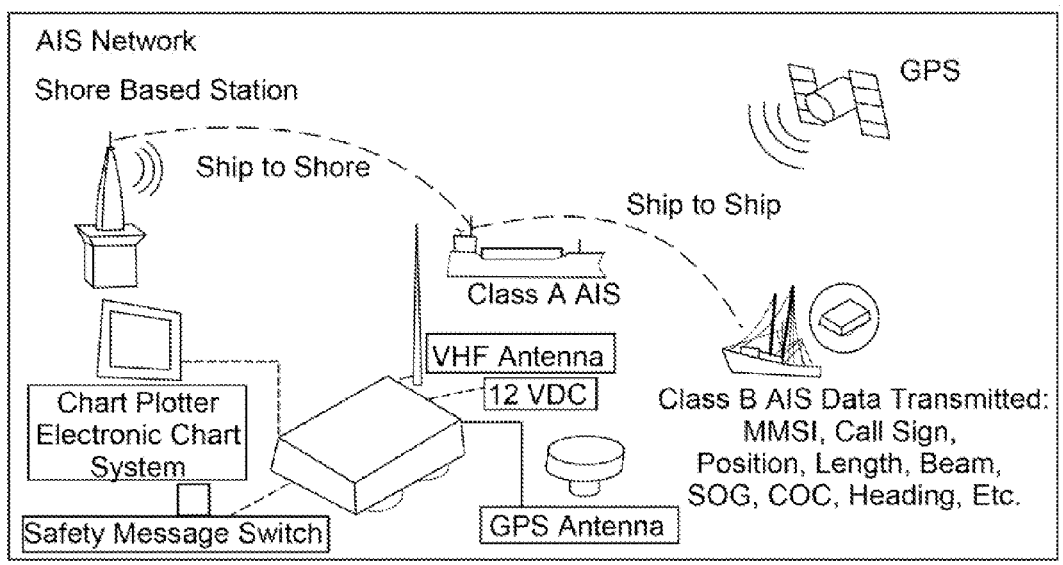
FIG. 4 illustrates an implementation of AIS in the maritime environment.
Figure 5:
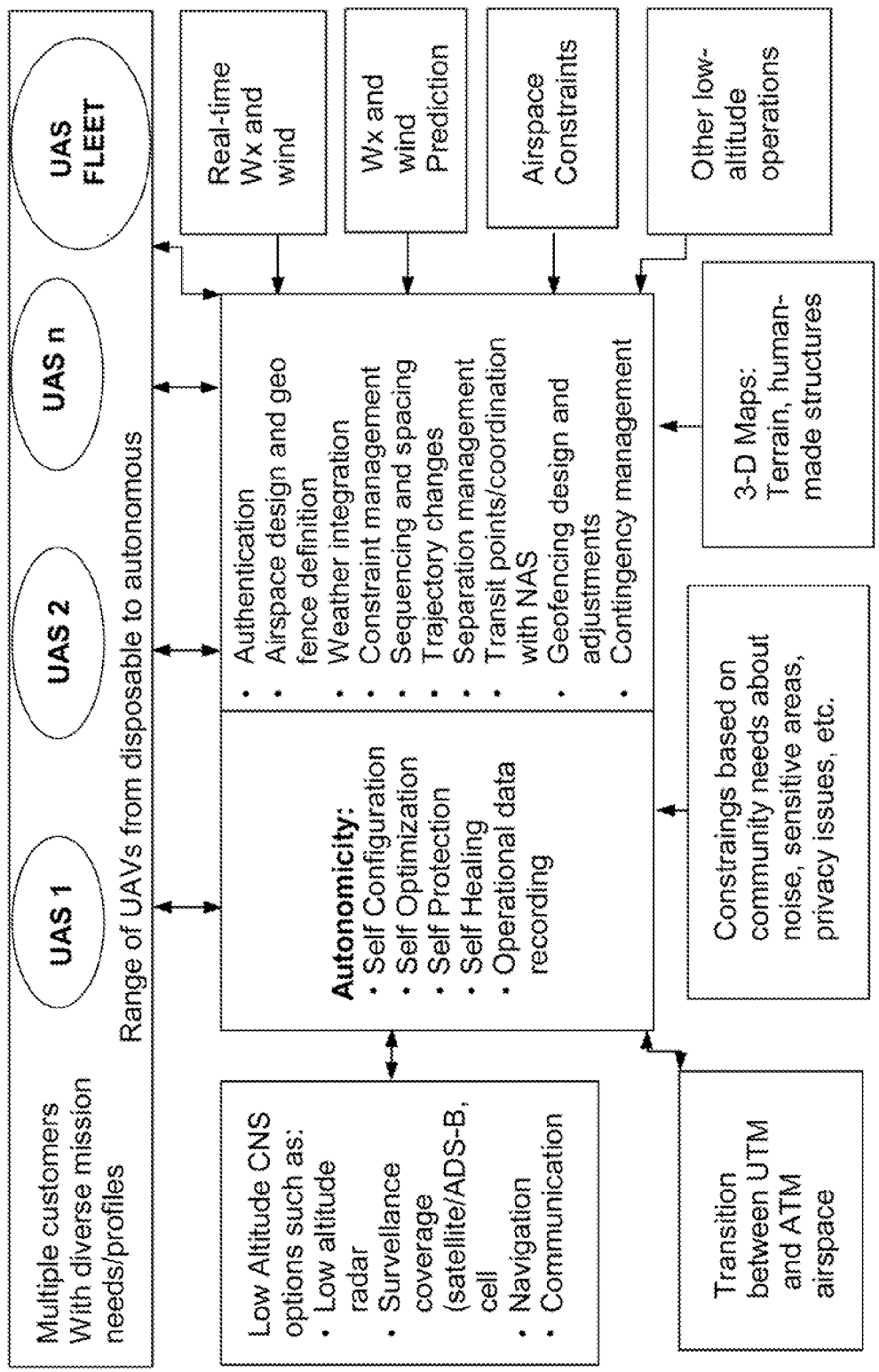
FIG. 5 is a diagram of UAS Traffic Management capabilities and functions.

Referring now to FIG. 5, a general diagram of inputs, outputs, characteristics, and processes of UTM enabling low-altitude civilian UASs applications. Multiple UASs or fleets of UASs (for example, a formation or convoy of UASs) from multiple customers and missions operate in the UTM airspace. UASs may have different capabilities, ranging from a disposable UAS to a fully equipped UAS. Inputs to UTM include, but are not limited to, real-time weather; weather prediction; airspace constraints; 3D maps showing terrain and man-made structures; constraints based on community needs about noise, sensitive areas, and privacy issues; low-altitude radar; surveillance coverage for satellites and cell towers; navigation and communication; etc. UTM processes included, but are not limited to, authentication; airspace design and geo-fencing design and adjustments; weather integration; constraint management; sequencing and spacing; trajectory changes; separation management; and transit points and coordination with NAS. UTM is based on autonomicity, autonomy, and autonomous operations related capabilities, such as self-configuration, self-optimization, self-protection, and self-healing.

UAS Traffic Management includes different formats in its scope, functionalities, and business models. One example is geographically restricted, homogeneous UASs and/or heterogeneous UASs operated by one vendor to operate in a mission, well-defined geo-fenced area of operation, supported by a portable UTM (e.g., crop monitoring and spraying; fire-fighting). Portable UTM can be set up quickly. In another example, UTM supports geographically fenced areas on a continuous basis with heterogeneous UASs operated by more than one vendor with differing mission support needs. These missions could include, but not limited to, books/items/mail delivery, grocery delivery, pharmacy services, etc. These missions operate in the same geo-fenced area by UASs with different performance characteristics and are supported by UTM. UTM may be operated by a commercial vendor (with certification and approvals from respective authorities) or by a governmental operator. This model is similar to cell and Internet services model. This is particularly useful when the communities are spread over larger distances, and UASs offer much more economical means of delivery rather than road transport due to smaller size, quantity, and volume than trucks or where road conditions are unsuitable for road transport. There are many civilian goods and delivery transport examples of this model. A starting example in a remote area is Denali National Park where vastness of land (as large as the State of Massachusetts) and winter conditions limit the transportation to dog sled, which is slow and very restrictive. It takes 5 days to reach from one end of the part to another and human has to accompany the dogs.

In a further example, UTM supports heterogeneous UASs goods and service delivery options connecting mega-cities (e.g., between San Francisco and Los Angeles; New York and Boston) using lower altitudes. UTM could operate by a commercial vendor or a government entity to support these services. Also, UTM supports heterogeneous UASs goods and service delivery options inside mega-cities and may extend beyond mega cities (allowed to cross-over certain geo-fenced areas depending on the application). Again, a commercial vendor or a government entity could operate this. In easily reachable areas to highly sensitive areas to areas inside urban operations, clear geo-fencing is established, operations to conform to geo-fencing are monitored, and the ability to override rogue operations is established.

Additionally, UTM functionalities include, but are not limited to: airspace design where altitudes are assigned based on direction of flight; geo-fencing design and updates based on need to avoid sensitive areas (e.g., noise sensitive areas or high value assets); surveillance of vehicles; weather and wind prediction and integration with route and flow management; congestion management; constraint and obstacle management (e.g., terrain, tall natural and man-made structures); demand and capacity imbalance management for crossing points, arrival and departure phases; separation assurance, collision avoidance and recovery; emergency landing site selection and landing, if needed; minimum requirements on UASs to operate at the low-altitudes as relates to communication, sensors, navigation, collision avoidance; classification of UASs based on their performance characteristics in terms of weight, wake, ability to operate with certain types of wind and weather. Such functionalities would be embodied in flight regulations for UASs.

Furthermore, UTM's broad scope and numerous functionalities allow for a variety of business models to be used for implementation. UTM could be operated by a commercial third-party vendor (service provider with highest possible levels of automation, autonomy, autonomous operations, and autonomicity which are justified in terms of costs) who will provide UTM services (similar to the operation of Internet, phone calls, gas and electricity, or cable service), or by a government organization, particularly in the high value and sensitive areas. There is also the model of privatization of air traffic management services for UTM. Other countries already have government corporations and/or contractors operating air traffic management.

UTM components include, but are not limited to, inputs, outputs, processing, interactions with air traffic controllers in controlled airspace, and UAS specifications and authentication.

Inputs: Real-time surveillance capability to detect the positions of all aircraft, including gliders and other general aviation aircraft, that operate within the same airspace as UASs supported by UTM; real-time wind and weather prediction and current state; real-time 3D mapping that includes man-made or natural structures and terrain; real-time geo-fencing and spatial-fencing data, and optionally low-altitude radar.

Inputs/outputs: Bi-directional communication mechanism with all vehicles that are supported by UTM—via repeaters/relays on cell towers, satellite communication, internet, or other means; communication from UTM of any changes to UASs trajectory; communication from UTM of any UASs emergency status and radar returns, via cell tower/internet/satellite-based system (e.g., ADS), collected to determine exact location of the UAS.

Processing: Weather processor for using up-to-date current and predicted weather information for route planning and rerouting; trajectory generator for each UAS based on the mission needs and keeping strategic de-confliction; airspace designer for assigning altitudes to the direction of traffic, creating arrival/departure corridors, etc.; separation manager to keep UASs separated from minimum safe distance (based on the performance characteristics, communication parameters, etc.)—some UASs will be able to self-separate and others will depend on UTM to provide that service; demand/capacity processor—if a demand at a certain location is expected to be higher than capacity or more than one UAS is expected to be at the same location then scheduling and sequencing methods would be used. This will be particularly important if many UASs use the same crossing point or predicted to arrive at the same location at the same time. Another alternative is to change the landing site slightly, assuming UASs are separated by the minimum separation standard, their trajectories could be modified slightly in speed and location of arrival to keep them separated and manage demand/capacity imbalance.

Interactions with Air Traffic Management (ATM) system of the NAS: Depending on UASs applications, there may be a need to interact with the ATM system of NAS, for example in controlled airspace. UTM creates geographical locations where transition of a vehicle from UTM to ATM may occur and communicate with the ATM system is established. Such communications may be manual. Alternatively, UTM may interconnect with ATM and such interactions will be automatically communicated and if needed negotiated similar to letters of agreements between two en-route facilities or between en-route and TRACON facilities which specific the location and altitude they cross boundaries. It is anticipated that there could be cases where aircraft emergencies related to ATM may need to be accommodated by UTM.

UASs Authorization Authentication: Naturally, there will be concern about unauthorized UASs operations in the airspace. There are many possibilities to restrict such use. One method is to have a clear authentication to operate in the airspace based on pre-approved UASs status. In this scenario, each UAS would have a unique identifier (similar to Vehicle Identification Number or Aircraft numbers or MMSI numbers in the marine industry). These UASs will be pre-registered and pre-approved to operate in the airspace. The pre-approval is based on their performance characteristics, safety features, and minimum equipage requirements. However, if an unauthorized UAS initiates the operation in the airspace, UTM will detect such operation. There are a number of options available at that stage. These may include larger UASs hovering over the "rogue" UAS; large UASs latching the "rogue" UAS and bringing it to a safe location (similar to taking away the illegally parked vehicle); and in very remote case destroying the "rogue" UAS itself. This policing function includes substantive procedures, rules, and technology.

In the business market, there is a sense of urgency for UTM as the UASs industry is maturing, and the range of potential applications that UASs can support is growing. With the various business models available, UTM is the "enabler" that will allow safe operation of UASs at low-altitudes and will allow UASs to safely co-exist with general aviation. This is akin to national infrastructure development where in most cases a government agency has to take the initiative to conduct research and develop to facilitate new infrastructure. Otherwise, our nation's global competitiveness would be limited.

Flight Cruising Altitudes for UTM

The present invention, a new traffic management system for integrating UASs into the National Airspace System, includes, in part, a new aviation navigation system referred hereafter as Autonomous Situational Awareness Platform (ASAP). Because ASAP is a novel approach to aviation navigation that integrates piloted, remotely piloted, and UASs, it is first necessary to describe the current flight rules and the modifications needed to implement ASAP into the National Airspace System.

Current flight rules governed by Title 14 of the Code of Federal Regulations, Part 91 generally include Visual Flight Rules (VFR) and Instrument Flight Rules (IFR). VFR consists of basic weather minimums (i.e., flight visibility and distance from clouds) and standard cruising altitudes and flight levels. It is the responsibility of the pilot to insure that ATC clearance or radio communication requirements are met prior to entry into Class B, Class C, or Class D airspace. The following table represents current VFR cruising altitudes and flight levels.

TABLE 1

VFR Cruising Altitudes and Flight Levels (14 CFR 91.159)

| Magnetic course (ground track): | Flying more than 3,000 feet AGL but below 18,000 feet MSL: | Flying above 18,000 feet MSL: |
| --- | --- | --- |
| 0 deg. to 179 deg. | Odd thousands MSL, plus 500 feet (3,500; 5,500; 7,500; etc.) | FL assigned by ATC |
| 180 deg. to 359 deg. | Even thousands MSL, plus 500 feet (4,500; 6,500; 8,500; etc.) | FL assigned by ATC |

For IFR, Title 14 of the Code of Federal Regulations specifies the pilot and aircraft equipment requirements for IFR flight. In additional to the following table representing altitude and flight level requirements, IFR flight includes a requirement to remain at least 1,000 feet above the highest obstacle within a horizontal distance of 4 nautical miles for the course to be flown.

| Magnetic course (ground track): | Flying below 18,000 feet MSL: | Flying at or above 18,000 feet MSL but below FL 290: | Flying at or above FL 290, fly 4,000 foot intervals: |
|---|---|---|---|
| 0 deg. to 179 deg. | Odd thousands MSL, (3,000; 5,000; 7,000; etc.) | Odd FL, (FL 190; 210; 230; etc.) | Beginning at FL 290, (FL 290; 330; 370; etc.) |
| 180 deg. to 359 deg. | Even thousands MSL, (2,000; 4,000; 6,000; etc.) | Even FL, (FL 180; 200; 220; etc.) | Beginning at FL 310, (FL 310; 350; 390; etc.) |

Table 2—IFR Cruising Altitudes and Flight Levels in Uncontrolled Airspace (14 CFR 179)

Visual and instrument flight rules promulgated by the FAA in Title 14 of the Code of Federal Regulations have provided standardization, predictability, and safety to the aviation community for decades. Over the years, these rules have mandated pilots to comply with specific avionics/communication equipment requirements, minimum separation requirements, safe cruising altitudes, etc. However, today, more and more aircraft are being designed, built, and tested that do not require a pilot. Generally, unmanned aircraft cannot follow visual and instrument flight rules like pilots can. To accommodate the growing interest and quantity of UASs in the National Airspace System, the VFRs and IFRs of Title 14 need to be updated, while maintaining flight safety as the primary objective of such flight rules.

Figure 6:
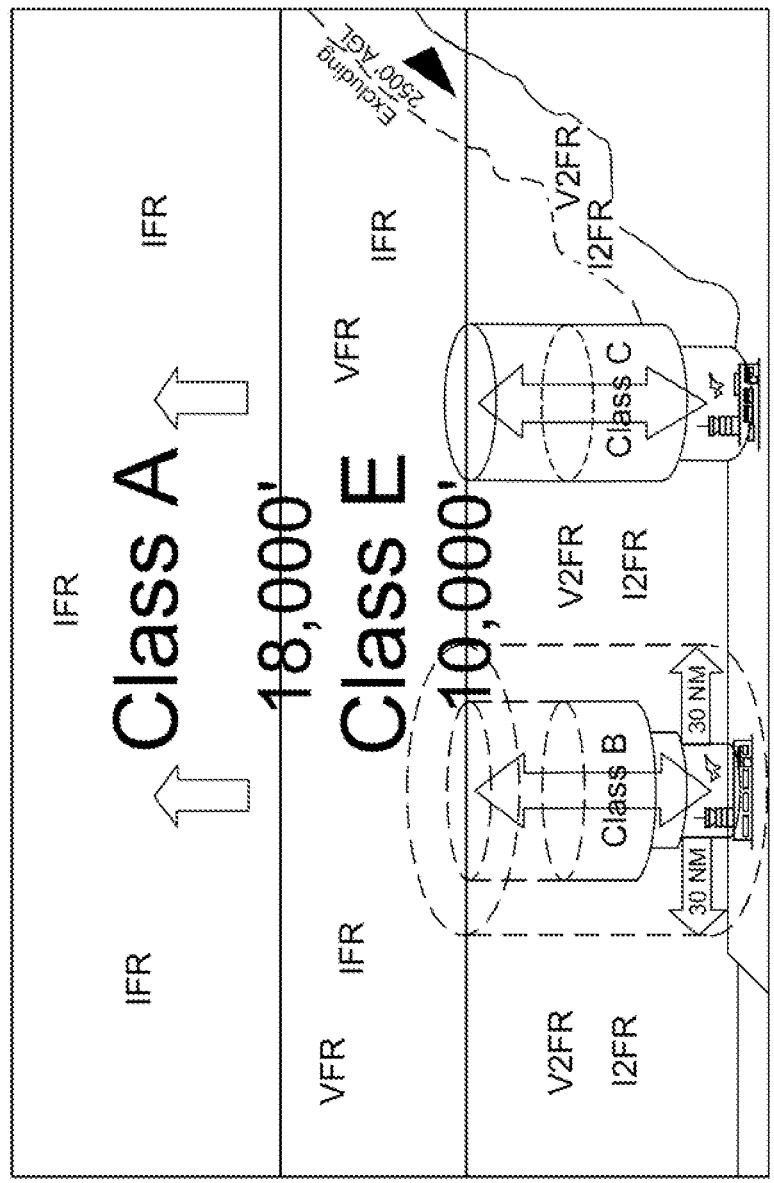
FIG. 6 shows the National Airspace System with new flight rules designated at different altitudes and classes of airspace for the implementation of a UTM system.

Before an example of updated flight rules is presented, it is necessary to review the classes of airspace in the National Airspace System as related to the FAA's new mandate for ADS-B. As previously provided, ADS-B Out is or will be required for aircraft operating above 10,000 feet MSL plus aircraft operating in Class B, C, and D airspace. Excluded from the ADS-B Out mandate is airspace from the surface to 2,500 AGL, except for such airspace within Class B, C, and D airspace and other restricted airspace, like a Military Operating Area. Referring to FIG. 6, the National Airspace System is illustrated showing classes of airspace and applicable flight rules under a UTM system. In Class A airspace, current IFR regulations would continue to be applicable. In Class E airspace between 10,000 feet MSL and 18,000 feet MSL, ADS-B Out is required, and current VFR and IFR regulations would continue to be applicable, except, as previously noted, ADS-B is not required for the aircraft operating between the surface and 2,500 feet AGL. For uncontrolled airspace under 10,000 feet MSL, where ADS-B is not mandated, current VFR and IFR regulations require modification to integrate UASs operations. The following table represents an example of new Visual/Virtual Flight Rules (VNFR or V2FR).

TABLE 3

V2FR Cruising Altitudes below 10,000 feet MSL

| Magnetic course (ground track): | Flying 2,500 feet AGL or lower: | Flying more than 2,500 AGL but below 10,000 feet MSL: |
|---|---|---|
| 0 deg. to 179 deg. | 50 feet AGL; 200 feet AGL; 400 feet AGL; 800 feet AGL; 1,600 feet AGL; 2,400 feet AGL | Odd thousands MSL, plus 500 feet (3,500; 5,500; 7,500 etc.) |
| 180 deg. To 359 deg. | 100 feet AGL; 300 feet AGL; 600 feet AGL; 1,200 feet AGL; 2,000 feet AGL | Even thousands MSL, plus 500 feet (4,500; 6,500; 8,500; etc.) |

Note:
ADS-B not required up to 2,500 feet AGL regardless of MSL.

TABLE 4

V2FR Cruising Altitudes at or above 10,000 feet MSL (ADS-B required)

| Magnetic course (ground track): | Flying at or above 10,000 feet MSL but below 18,000 feet MSL: | Flying above 18,000 feet MSL to FL 290: |
|---|---|---|
| 0 deg. to 179 deg. | Odd thousands MSL, plus 500 feet (11,500; 13,500; 15,500 etc.) | FL assigned by ATC |
| 180 deg. To 359 deg. | Even thousands MSL, plus 500 feet (10,500; 12,500; 14,500; etc.) | FL assigned by ATC |

Note:
ADS-B not required up to 2,500 feet AGL regardless of MSL.

As shown in Table 3, aircraft flying more than 2,500 feet AGL but below 10,000 feet MSL would use odd thousands MSL plus 500 feet, starting at 3,500 feet MSL or above 2,500 feet AGL, whichever is higher. For aircraft flying 2,500 feet AGL or less, which does not require ADS-B regardless of MSL, the cruise altitudes are as follows. For generally eastbound (0-179 deg.) vehicles, the altitudes flown are 2,400 feet AGL; 1,600 feet AGL; 800 feet AGL; 400 feet AGL, 200 feet AGL, and 50 feet AGL. The 2,400 feet AGL level is 100 feet below the ADS-B mandate (2,500 feet AGL when above 10,000 MSL) allowing a buffer zone so a vehicle will not easily stray into ADS-B mandated territory above 2,500 feet AGL. The generally eastbound altitudes may be utilized based on speed of the vehicle such that a vehicle with a fast (but safe) cruising speed would operate at 2,400 and 1,600 feet AGL; a vehicle with a slower cruising speed would operate at 800 and 400 feet AGL, and a vehicle with a slow cruising speed would operate at 200, or 50 feet AGL. It should be understood that the stated altitudes for V2FR are examples only. Any cruising altitudes (eastbound, westbound, northbound, and southbound) with safe vertical separation distances may be utilized based on, for example, mission types of aircraft, performance of aircraft, noise of aircraft, and NU-STAR numbers of aircraft.

For generally westbound (180-359 deg.) vehicles, the altitudes flown are 2,000 feet AGL; 1,200 feet AGL; 600 feet AGL; 300 feet AGL; and 100 feet AGL. These generally westbound altitudes may be utilized based on speed of the vehicle such that a vehicle with a fast (but safe) cruising speed would operate at 2,000 and 1,200 feet AGL; a vehicle with a slower cruising speed would operate at 600 and 300 feet AGL, and a vehicle with a slow cruising speed would operate at 100 feet AGL. It should be understood that the stated altitudes for V2FR are examples only. Any cruising altitudes (eastbound, westbound, northbound, and southbound) with safe vertical separation distances may be utilized based on, for example, mission types of aircraft, performance of aircraft, noise of aircraft, and NU-STAR numbers of aircraft.

Table 4 shows V2FR cruising altitudes for vehicles flying at or above 10,000 feet MSL but below 18,000 feet MSL. The FAA ADS-B mandate would apply to vehicles operating in this airspace, unless the altitude is 2,500 feet AGL or less. Note that the V2FR cruising altitudes in Table 4 are similar to the current VFR regulation: eastbound is odd thousands plus 500 feet while westbound is even thousands plus 500 feet.

Implementing V2FR for vehicles flying under 10,000 feet MSL necessitates a change to current IFR regulations. Under current IFR, pilots must remain at least 1,000 feet (2,000 feet in designated mountainous terrain) above the highest obstacle within the course to be flown. This 1,000 foot AGL minimum would conflict with the new V2FR regulations. Therefore, the current IFR regulations would need to be modified as follows, for example. To accommodate UASs operations in the National Airspace System, the modified IFR regulations may be referred to as Instrument/Integrated Flight Rules (I/IFR or I2FR).

I2FR regulations are substantially similar to the current IFR regulation of 14 CFR 179. However, to avoid interference between vehicles operating I2FR at 1,000 feet AGL and above, as permitted by regulation, and vehicles operating V2FR at 2,500 feet AGL and below, the minimum altitude for I2FR must be raised. Therefore, for generally eastbound (0-179 deg.) I2FR vehicles operating in uncontrolled airspace, the minimum cruising altitude is an odd thousand altitude MSL that is greater than 2,500 feet AGL, while the minimum cruising altitude for a generally westbound (180-359 deg.) I2FR vehicle operating in uncontrolled airspace is an even thousand feet MSL that is greater than 2,500 feet AGL. It should be understood that the stated altitudes for I2FR are examples only and may vary depending on UTM applications.

The flight cruising altitudes previously described are examples that may be used with UTM. Alternatively, where there are no (or few) constraints, for example traffic and weather, the need for designated altitudes is not necessary. That is, no cruising altitudes may be designated in a particular region, or UTM cruising altitudes may be flexibly determined based on, for example, mission types of aircraft, performance of aircraft, noise of aircraft, and NU-STAR numbers of aircraft.

Standardized Vehicle Testing and Rating

Integrating UASs into the National Airspace System also requires a standardized testing and rating system for UASs and other vehicles. Many manufacturers are developing unmanned aircraft systems. However, to date there is no consistent and standardized performance assessment available for these systems. The manufacturer provides specifications and capabilities, which are self-reported, but no independent assessment is available. Similar to automobile specifications/ratings and consumer reports assessments for various products, performance verification and assessment of UASs are needed by prospective UAS purchasers and users, by the FAA or an FAA designated entity for certifying UASs based on standardized tests, by other aircraft (piloted and UASs) to determine the UAS's performance/equipment capabilities or lack thereof, and by manufacturers for enhancing safety, performance, and capabilities of UASs.

The National Unmanned Aircraft System Standardized Performance Testing and Rating (NU-STAR) system provides standardized tests and scenario conditions to assess performance of UASs. NU-STAR creates standardized tests and scenarios that vehicles can be tested against; identifies key performance parameters of all UAS and their standardized measurement strategy; develops standardized performance rating method (e.g., consumer report style) to assist prospective buyers; identify key performance metrics that could be used by judged towards overall safety of the UAS and operations; and if vehicle certification standard is made by a regulatory agency, the performance of individual UASs could be compared against the minimum requirement (e.g., sense and avoid detection time, stopping distance, kinetic energy, etc.). NU-STAR is an independent performance assessment national capability.

The following are examples of performance data that NU-STAR may collect during standardized testing:

TABLE 5

I2FR Cruising Altitudes and Flight Levels in Uncontrolled Airspace

| Magnetic course (track track): | Flying below 18,000 feet MSL: | Flying at or above 18,000 feet MSL but below FL 290: | Flying at or above FL 290, fly 4,000 foot intervals: |
|---|---|---|---|
| 0 deg. to 179 deg. | Odd thousands MSL beginning at 3,000 feet, (3,000; 5,000; 7,000; etc.) but always greater than 2,500 feet AGL | Odd FL, (FL 190; 210; 230; etc.) | Beginning at FL 290, (FL 290; 330; 370; etc.) |
| 180 deg. to 359 deg. | Even thousands MSL beginning at 4,000 feet, (4,000; 6,000; 8,000; etc.) but always greater than 2,500 feet AGL | Even FL, (FL 180; 200; 220; etc.) | Beginning at FL 310, (FL 310; 350; 390; etc.) |

Stopping distance under detection of obstacle under normal and off-nominal conditions (e.g., fog, smoke, moving objects)

Wind susceptibility (at what speeds and type of winds, does a vehicle become uncontrollable)

Kinetic energy when the UAS falls from various altitudes

Battery life under various conditions (pay load, distance, temperature, etc.)

Time to terminate

Ability to maneuver: Collision detection time and distance under various conflict geometries (acute, obtuse, head-on, right-angle, climbing, and descending)

Maximum range

Maximum altitude

Maximum and minimum speeds

Ability to communicate (single or dual) in various situations, for example, in normal flight, under tunnels, narrow corridors, between buildings, etc.

The following are examples of specification data that NU-STAR may collect during standardized testing:

Vehicle manufacturer, model, make, and year

Type of vehicle (e.g., multi-copter: how many copters, fixed wing, or hybrid)

Type of battery

Battery life

Weight

Pay load capacity and type of payloads, for example, human passengers, cargo, etc.

Operations type (e.g., precision agriculture, delivery, search and rescue)

Data collection (e.g., camera, radar, laser, etc.)

Takes off from ground or land on ground

Lost link or inconsistent link operation

The following are examples of scenarios to be used in collection of data during NU-STAR standardized testing and rating:

Narrow corridor operations between two tall walls

Operations with strong head wind, tail wind, etc.

Operations where unexpected pop up moving objects appear at various distances and angles Operations under rain, fog, smog, etc.

First 50 feet ascend and last 50 feet descent under presence of (simulated) moving objects such as people, soccer ball, pets, etc.

While NU-STAR primarily focuses on measuring and rating performance and specifications of UASs, it is contemplated that the same or similar standardized testing and rating system may be used for piloted aircraft and remotely piloted aircraft. By having a standardized NU-STAR capability assessment for all aircraft operating in the National Airspace System, information about aircraft performance and specifications may be shared between pilots-in-command of aircraft, pilots-in-command of remotely piloted aircraft, and flight computers of UASs. As will be seen and described later in the Detailed Description of the Invention, a NU-STAR capability number (NU-STAR number) is useful for the novel aviation navigation system, the Autonomous Situational Awareness Platform (ASAP). Once an aircraft has been assigned a NU-STAR number, the aircraft's ASAP (or the aircraft's ADS-B if equipped) may be programmed with a baseline NU-STAR number. Depending on the type of mission the aircraft is flying or depending on other situational factors, an aircraft's NU-STAR number will be automatically or manually updated, and the aircraft may share the baseline and/or updated NU-STAR number. The following table includes samples of NU-STAR numbers based on various aircraft characteristics and scales. While only four or five aircraft types, characteristics, and specifications are shown in Table 6, it is noted that any of the previously mentioned aircraft performance data, specification data, and mission scenarios may be used to form a NU-STAR number.

TABLE 6

Examples of NU-STAR Numbers

| Type, Characteristic, and Scale: | Examples |
| --- | --- |
| 1 - Limited maneuverability vehicle | Manned balloon: 10111 |
| a. Equipped with 2-way communication (voice or data): 0, 1, 2 | Blimp: 11123 |
| b. Ability to sense obstacles: 0-9 | Skydiver: 10122 |
| c. Ability to maneuver and avoid: 0-9 | |
| d. Survivability in environment (winds, fog, etc.): 0-9 | |
| 2 - Vehicles responding to emergencies | Medical helicopter: 21885 |
| a. Equipped with 2-way communication (voice or data): 0, 1, 2 | UAS ambulance: 20864 |
| b. Ability to sense obstacles: 0-9 | Firefighting aircraft: 22899 |
| c. Ability to maneuver and avoid: 0-9 | |
| d. Survivability in environment (winds, fog, etc.): 0-9 | |
| 3 - Aircraft carrying humans (pilot and/or passengers) | Passenger aircraft: 32887 |
| a. Equipped with 2-way communication (voice or data): 0, 1, 2 | UAS passenger a/c: 32864 |
| b. Ability to sense obstacles: 0-9 | General aviation a/c: 31775 |
| c. Ability to maneuver and avoid: 0-9 | Helicopter: 32895 |
| d. Survivability in environment (winds, fog, etc.): 0-9 | |
| 4 - Autonomous vehicles (no humans) | Predator: 42889 |
| a. Equipped with 2-way communication (voice or data): 0, 1, 2 | UAS cargo: 41765 |
| b. Ability to sense obstacles: 0-9 | UAS delivery: 41642 |
| c. Ability to maneuver and avoid: 0-9 | |
| d. Survivability in environment (winds, fog, etc.): 0-9 | |
| 9 - Vehicle in distress (i.e., pan-pan, mayday-mayday) | Passenger aircraft: 92988 |
| a. Equipped with 2-way communication (voice or data): 0, 1, 2 | Helicopter: 92785 |
| b. Ability to sense obstacles: 0-9 | UAS delivery: 91653 |
| c. Ability to maneuver and avoid: 0-9 | |
| d. Survivability in environment (winds, fog, etc.): 0-9 | |

As shown in Table 6, NU-STAR numbers assigned to a UAS, piloted aircraft, or remotely piloted vehicle provide valuable performance and specification data to prospective aircraft purchasers and users, to the FAA for air traffic control, to other aircraft for determining real-time aircraft performance/equipment capabilities or lack thereof, and to manufacturers for improving aircraft capabilities. A baseline NU-STAR number would be assigned to a vehicle; however, depending on mission type, emergency situations, improper functioning of aircraft systems, the NU-STAR number would be updated real-time to ensure an accurate sharing of aircraft capabilities.

Modified Flight Regulations for UAS Traffic Management

In addition to new flight cruising altitude rules and NU-STAR, modified flight regulations are needed to integrate UASs into the National Airspace System. Referring now to FIGS. 7A-7J, there is shown Table of Content excerpts from Title 14 of the Code of Federal Regulations, Chapter I with additions and modifications that are underlined. These changes to Title 14 are focused on the titles of the various Parts of the regulation. Naturally, the actual content of the regulations would need to be promulgated by the FAA with input from the aviation community. The additions and modifications to Title 14 shown in the figures are consistent with the implementation of the novel NU-STAR capability and new Autonomous Situational Awareness Platform (ASAP). It should be understood that the proposed changes to Title 14 are not inclusive and other additions and modifications may need to be made for the effective implementation of UTM.

Autonomous Situational Awareness Platforms

As provided in the Background of the Invention, the FAA and U.S. Coast Guard are implementing new traffic management systems for U.S. transportation systems. The FAA is mandating the installation and use of ADS-B for all aircraft operating above 10,000 feet MSL and operating in Class A, Class B, Class C, and Class D airspace. Current FAA implementation only requires ADS-B Out for most aircraft. Therefore, aircraft equipped with ADS-B Out will be able to broadcast their position and other flight information but will not be able to receive the positions, tracks, and routes broadcast by other aircraft. The new ADS-B system is, therefore, dependent on ground operations, such as air traffic controllers to direct traffic.

The U.S. Coast Guard's Automatic Information System (AIS) includes both an "out" and "in" data link for water vessels. With AIS, vessels can view nautical vessels on a chart plotter and/or a multifunctional display. As long as water vessels in a particular region have AIS turned on, all vessels will be "seen" by each other, so captains and navigators can make course correction decisions based on the data received by AIS.

Figure 8:
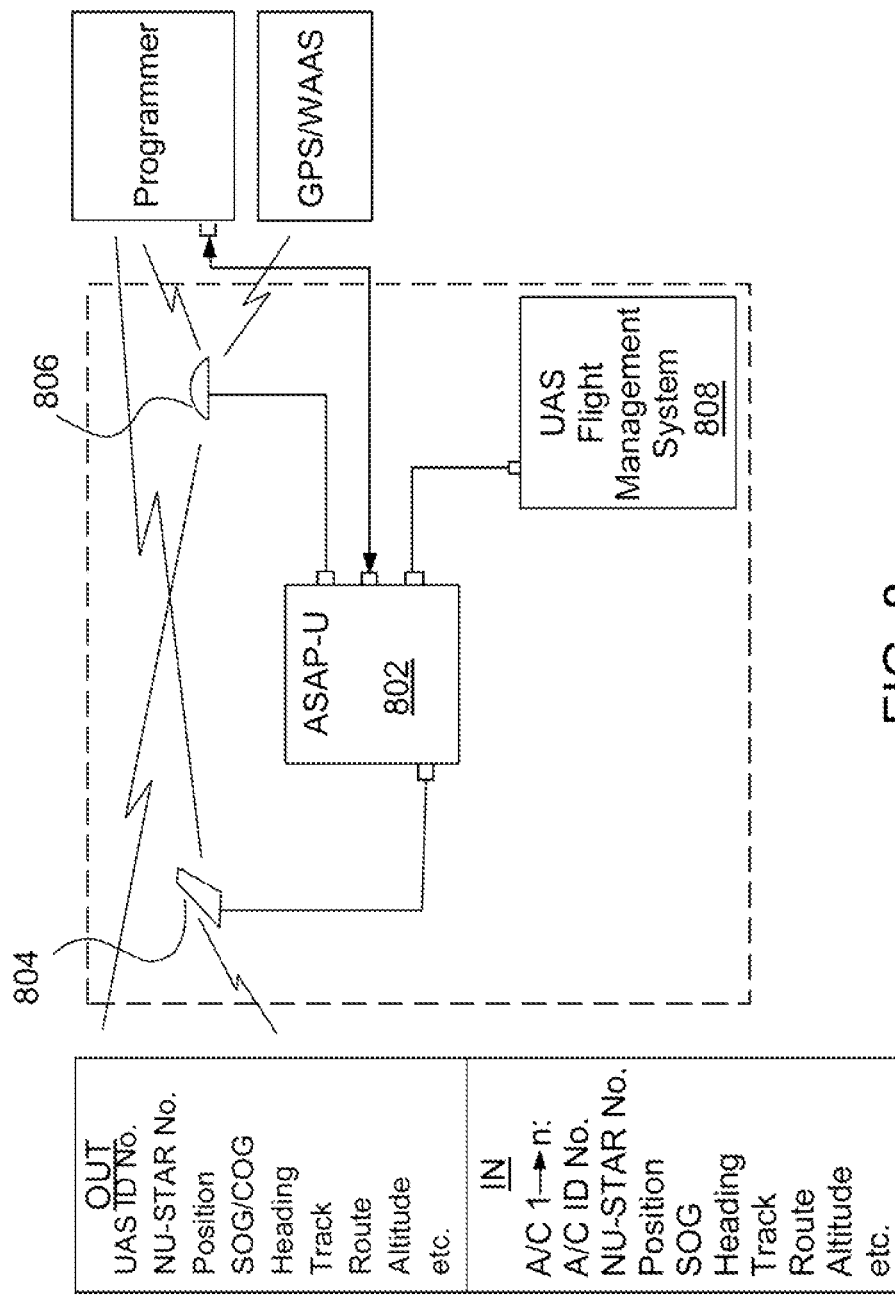
FIG. 8 shows a system diagram for an Autonomous Situational Awareness Platform (ASAP) system for a UAS.

Learning from the FAA's ADS-B and the U.S. Coast Guard's AIS, a traffic management system to incorporate UASs into the National Airspace System is herein described. The system, named the Autonomous Situational Awareness Platform (ASAP), combines existing navigation technology (both aviation and maritime) with new systems and procedures for safely integrating UASs with other aerospace vehicles. FIG. 8 illustrates an example of an ASAP system for a UAS (ASAP-U). The ASAP-U module 802 integrates a transceiver with a positioning system, such as GPS and/or WAAS. The ASAP-U module 802 includes a transmitter, one or more receivers, and links to other UAS systems, like an RF antenna 804, a satellite antenna 806, and a flight management system 808. The satellite antenna 806 acquires GPS coordinates (x, y, and z) and time. When available, the satellite antenna 806 acquires WAAS signals to provide more accurate GPS coordinates. The GPS coordinates and time are fed to the ASAP-U module 802 where the GPS data is fed to the flight management system 808 for UAS navigation. The ASAP-U transmitter autonomously and continuously sends certain UAS information via the RF antenna 804. Examples of ASAP data to be transmitted by the ASAP-U module 802 are: aircraft ID number, baseline and/or updated NU-STAR number, GPS coordinates and time, speed over ground (SOG), course over ground (COG), current heading, past track data, future route data, and other aircraft navigational data. To ensure that RF transmissions from different ASAPs do not overlap, the signals are time multiplexed using Self-Organized Time Division Multiple Access (SOTDMA). Based on the altitude and/or speed of the UAS, the data is transmitted more frequently at higher speeds and lower altitudes. For example, a low flying or fast flying UAS may transmit ASAP data every 1-3 seconds, while a higher flying or slower flying UAS may transmit ASAP data every 5-10 seconds. In addition to transmitting ASAP data to other aircraft, the RF antenna receives ASAP data from other aircraft. Similar ASAP data sent by the UAS may be received by the ASAP-U via the RF antenna. In the event of incoming transmission overload, only the ASAP data from aircraft farthest away from the UAS is dropped out to give preference to closer traffic. It should be noted that ASAP data from other aircraft may be received alternatively or additionally by the GPS antenna when certain aircraft are equipped to send ASAP data via satellite. Additionally, other data to be received by the ASAP-U module via the satellite antenna and/or the RF antenna are, for example, weather data, navigational aid data, terrain data, geo-fencing data, spatial-fencing data, and updates to the UAS flight plan. Such data is fed to the flight management system for safe UAS operations.

Figure 9:
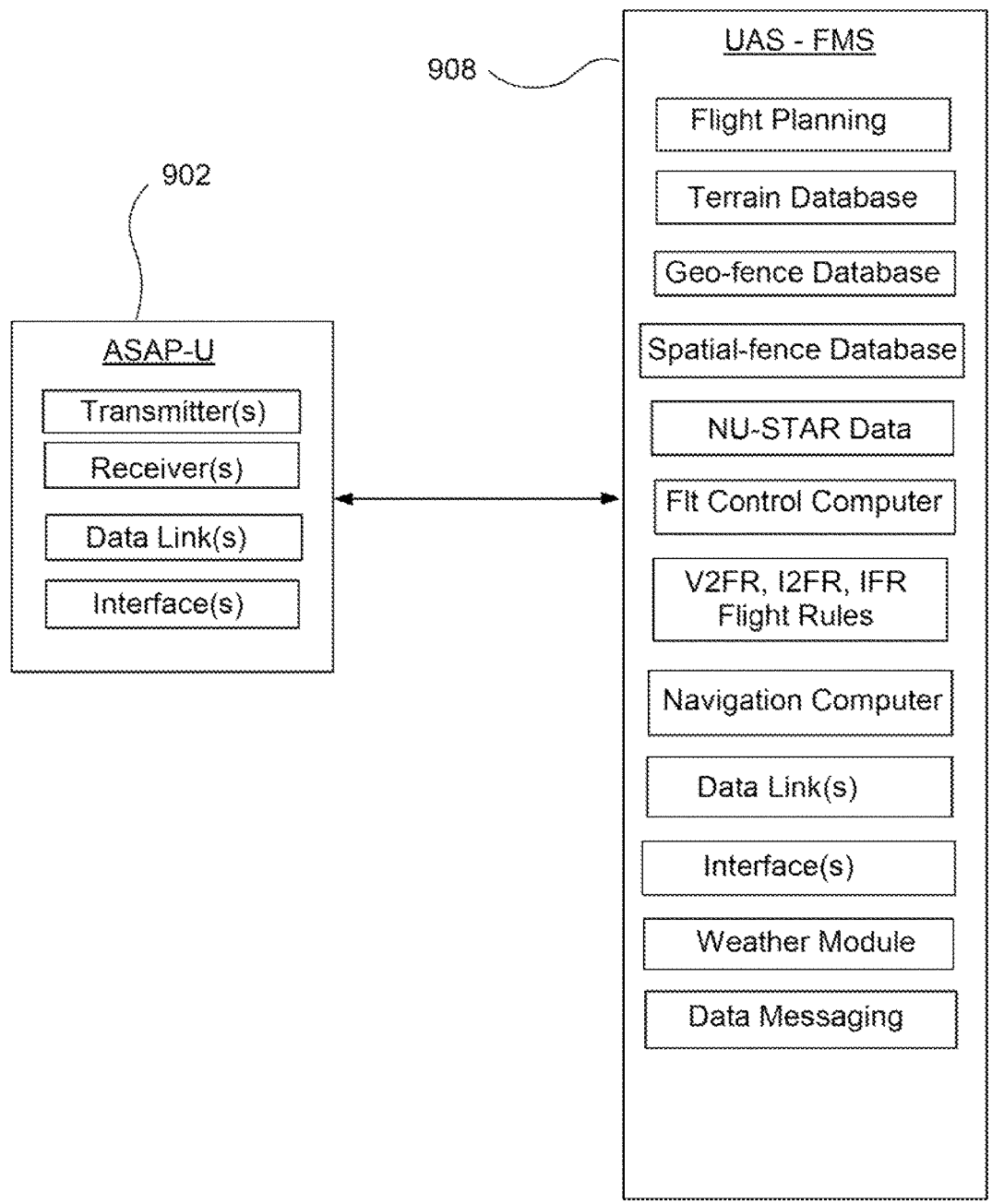
FIG. 9 illustrates the capabilities of an ASAP system for a UAS.

Referring to FIG. 9, the ASAP-U module 902 and flight management system 908 are illustrated. The ASAP-U module 902 collects and relays data to the flight management system 908 where the flight management system 908 includes, for example, a navigation computer, a database of V2FR, I2FR, and IFR regulations, a database of right-of-way and give-way rules, a database of available NU-STAR numbers and their meanings, a terrain database such as Google Earth or NASA's World Wind, a database of geo-fencing, a database of spatial-fencing, a flight planning system, and a flight control system. The navigation computer may include any flight software capable of identifying and virtually displaying the positions and other ASAP data of other aircraft relative to the UAS. Using the databases for flight rules, right-of-way rules, NU-STAR numbers, terrain, and geo-fencing, the navigation computer calculates any required modifications to the UAS's flight plan and feeds the corrections to the flight control computer to avoid conflicts, for example, terrain avoidance, aircraft collision avoidance, and geo- and spatial-fencing avoidance, for example surface geo-fencing (i.e., restricting airspace over sporting events, political events, natural disasters, etc.) and spatial geo-fencing (i.e., restricting airspace for severe weather, turbulence, aerobatic operations, military operations, parachuting, etc.).

Figure 10:
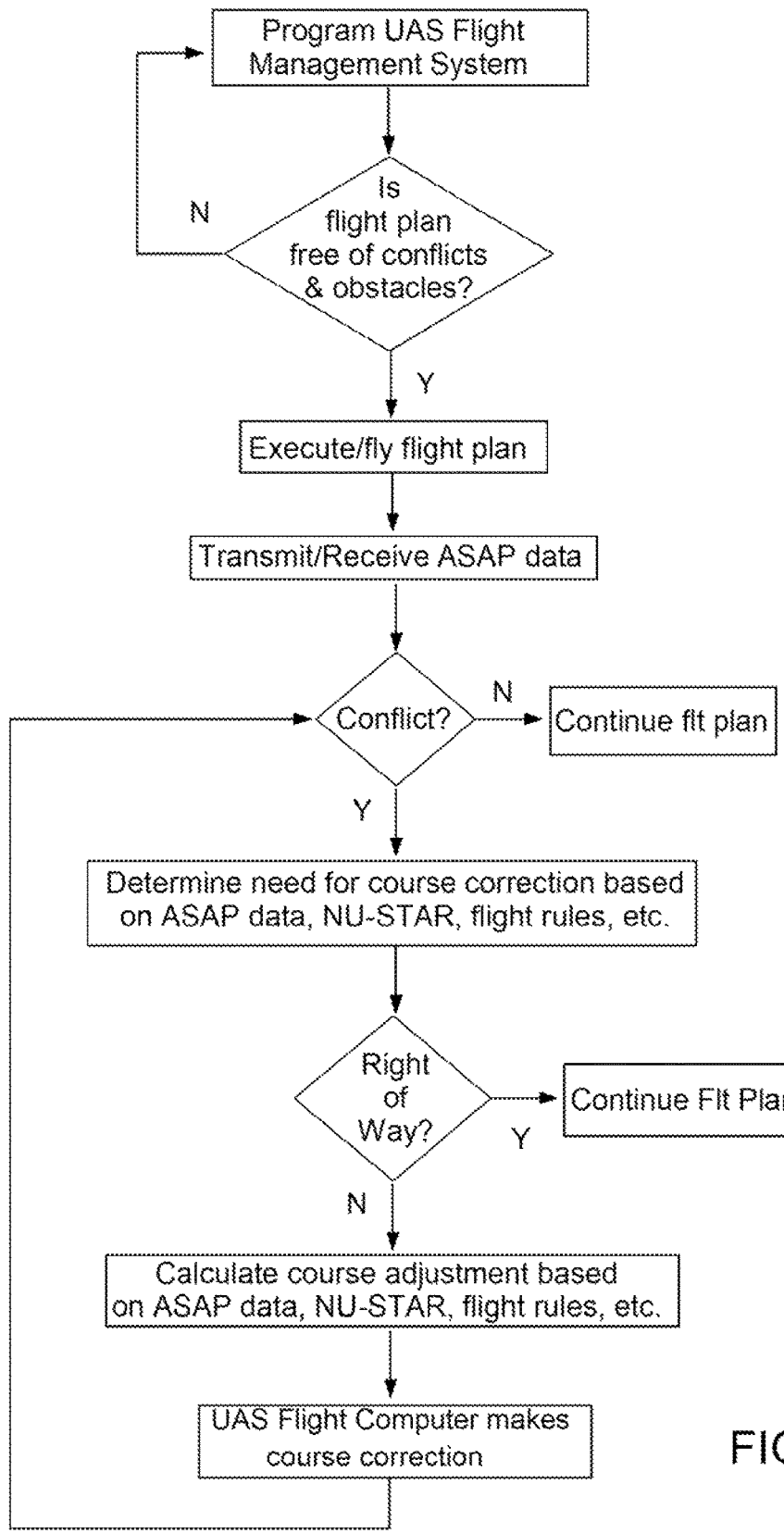
FIG. 10 shows a flow chart of various functions of an ASAP system for a UAS.

An example of an ASAP-U module in operational use is depicted in FIG. 10. Prior to flight, the flight planning unit of the flight management system is programmed by a flight software programmer. Because the programmer is entering a flight route into the UAS's flight computer, the programmer will need to be qualified and/or certified by the FAA, for example, to select the proper altitudes, airspeeds, routes, etc. The flight program is uploadable to the UAS via cable, the RF antenna, the satellite antenna, Wi-Fi, and/or cellular transmission. The uploaded flight plan is tested against for any conflicts that would arise based on information in the terrain database, surface obstacle database, geo-fencing database, and spatial-fencing database. If no conflicts are detected, the flight plan for the UAS is implemented. If one or more conflicts are detected, the flight software programmer is notified by the flight management system so modifications to the flight route can be made prior to flight. Upon implementation of the flight plan, the ASAP-U module begins to receive and transmit data. As previously stated, the data received by the ASAP-U includes GPS and/or WAAS data, ASAP data from other aircraft, weather data, updated terrain data, NAVAIDS data, updated spatial-fencing data, and updated geo-fencing data. Data transmitted by the ASAP-U module includes ASAP data of the UAS, for example aircraft ID number, baseline and/or updated NU-STAR number, GPS coordinates and time, speed over ground (SOG), course over ground (COG), current heading, past track data, future route data, and other aircraft navigational data. Also, using satellites and/or RF antennas, the ASAP-U module will relay ASAP data received from other aircraft, to other aircraft and to ground relay stations located on cell towers, buildings, hills/mountains, aerial relay platforms, and other objects. With data being received and transmitted, the ASAP-U and flight management system continuously and automatically search for conflicts, with other aircraft, terrain, weather, geo-fencing, etc. If a conflict is detected, the UAS flight management system determines the need for a course adjustment based on NU-STAR numbers, flight rules, right-of-way rules, etc. If the flight computer determines no conflict or a conflict but the UAS has right-of-way, the flight control system flies the programmed flight plan. If the flight computer determines a conflict, the flight computer recalculates a course adjustment based on NU-STAR numbers of other aircraft, terrain, weather, geo-fencing, etc. The UAS flight control computer would then make the necessary course corrections for a safe flight route.

Figure 11:
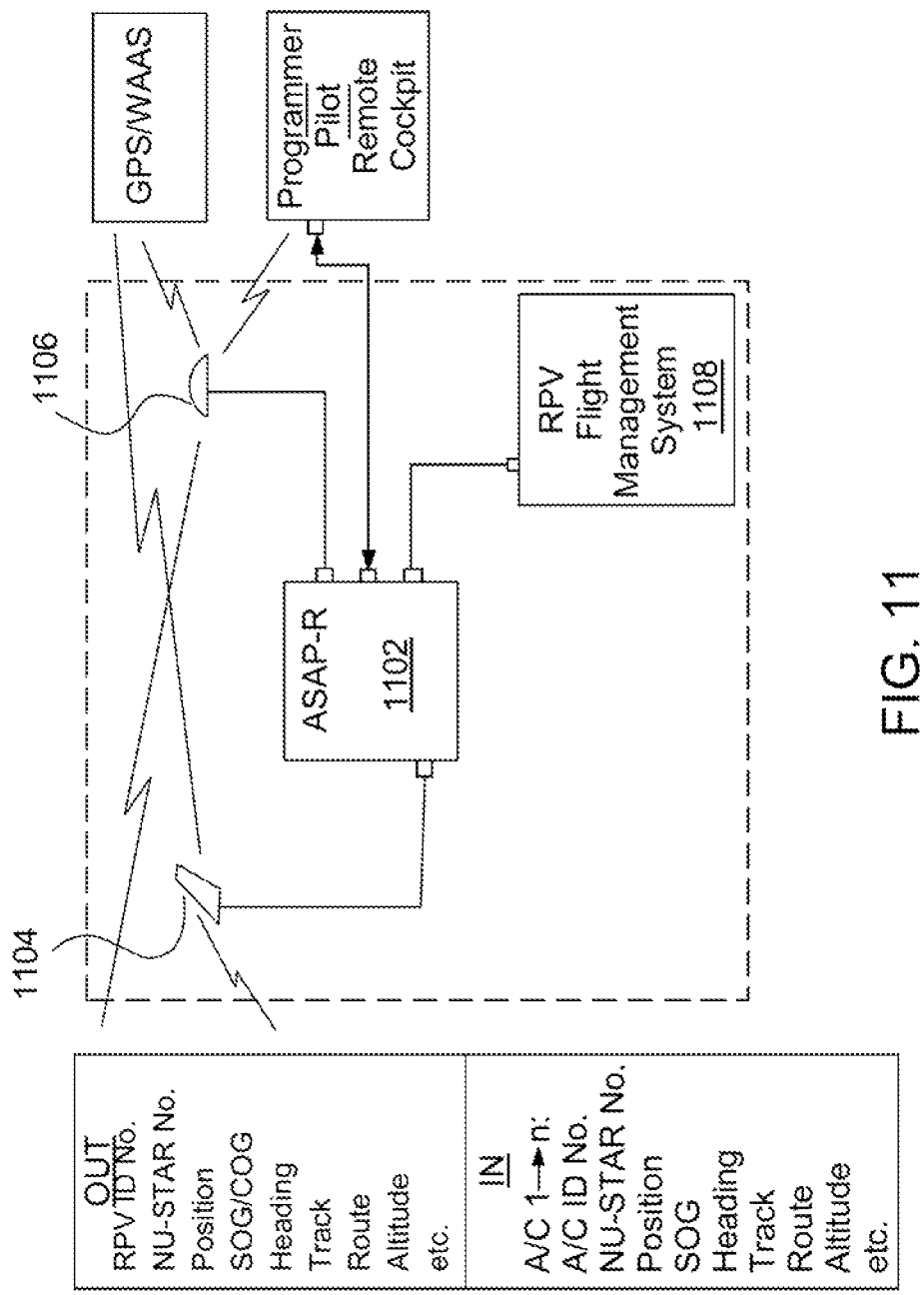
FIG. 11 shows a system diagram for an ASAP system for a remotely piloted vehicle.

Referring to FIG. 11 illustrates an example of an ASAP system for a remotely piloted vehicle (ASAP-R). It should be noted that a remotely piloted vehicle (RPV) may operate in an autonomous mode, like a UAS, or a piloted mode. Therefore, the following description regarding ASAP-R should be read to include the features and functions of ASAP-U when the RPV is in autonomous mode. In remote mode, the ASAP-R module 1102 relies more so on the remote pilot. The ASAP-R module integrates a transceiver with a positioning system, such as GPS and/or WAAS. The ASAP-R module 1102 includes a transmitter, one or more receivers, and links to other RPV systems, like an RF antenna 1104, a satellite antenna 1106, and a flight management system 1108. The satellite antenna 1106 acquires GPS coordinates (x, y, and z) and time. When available, the satellite antenna 1106 acquires WAAS signals to provide more accurate GPS coordinates. The GPS coordinates and time are fed to the ASAP-R module 1102 where the GPS data is fed to the flight management system for RPV navigation. The ASAP-R transmitter autonomously and continuously sends certain RPV information via the RF antenna 1104. Examples of ASAP data to be transmitted by the ASAP-R module are: aircraft ID number, baseline and/or updated NU-STAR number, GPS coordinates and time, speed over ground (SOG), course over ground (COG), current heading, past track data, future route data, and other aircraft navigational data. To ensure that RF transmissions from different ASAPs do not overlap, the signals are time multiplexed using Self-Organized Time Division Multiple Access (SOTDMA). Based on the altitude and/or speed of the UAS, the data is transmitted more frequently at higher speeds and lower altitudes. For example, a low flying or fast flying RPV may transmit ASAP data every 1-3 seconds, while a higher flying or slower flying RPV may transmit ASAP data every 5-10 seconds. In addition to transmitting ASAP data to other aircraft, the RF antenna receives ASAP data from other aircraft. Similar ASAP data sent by the RPV may be received by the ASAP-R via the RF antenna. In the event of incoming transmission overload, only the ASAP data from aircraft farthest away from the RPV is dropped out to give preference to closer traffic. It should be noted that ASAP data from other aircraft may be received alternatively or additionally by the GPS antenna when certain aircraft are equipped to send ASAP data via satellite. Additionally, other data to be received by the ASAP-R module via the satellite antenna and/or the RF antenna are, for example, weather data, navigational aid data, terrain data, geo-fencing data, spatial-fencing data, and updates to the UAS flight plan. Such data is fed to the flight management system for safe RPV operations. When the RPV is operating in remote mode, a data link between the RPV and the remote pilot cockpit is established. In this scenario, ASAP data is transmitted to the remote cockpit where the pilot can view other aircraft, terrain obstacles, geo-fencing, etc. on a chart plotter and/or multifunctional display. Commands may be transmitted from the remote cockpit to the RPV's flight management system via the ASAP-R.

Figure 12:
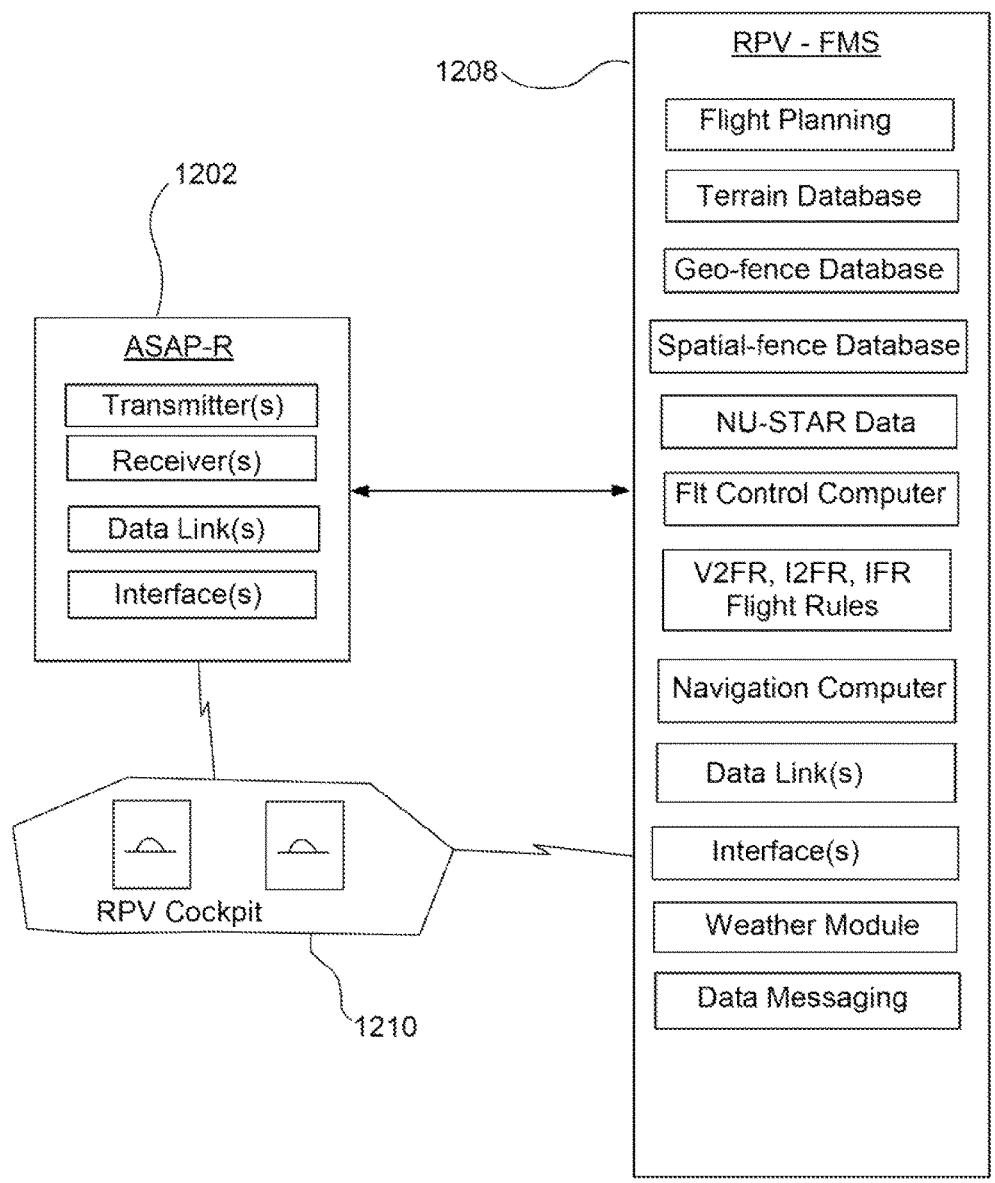
FIG. 12 illustrates the capabilities of an ASAP system for a remotely piloted vehicle.

Referring to FIG. 12, the ASAP-R module 1202 and flight management system 1208 are illustrated. The ASAP-R module 1202 collects and relays data to the flight management system 1208 where the flight management system 1208 includes, for example, a navigation computer, a database of V2FR, I2FR, and IFR regulations, a database of right-of-way and give-way rules, a database of available NU-STAR numbers and their meanings, a terrain database such as Google Earth or NASA's World Wind, a database of geo-fencing, a database of spatial-fencing, a flight planning system, and a flight control system. For RPVs, there may be two or more flight management systems: one onboard the RPV for autonomous operations, and one or more remote cockpits manned by pilots. The navigation computer may include any flight software capable of identifying and virtually displaying the positions and other ASAP data of other aircraft relative to the RPV. Using the databases for flight rules, right-of-way rules, NU-STAR numbers, terrain, spatial-fencing, and geo-fencing, the navigation computer calculates any required modifications to the RPV's flight plan and feeds the corrections to the flight control computer to avoid conflicts, for example, terrain avoidance, aircraft collision avoidance, and geo-fencing avoidance, for example surface geo-fencing (i.e., restricting airspace over sporting events, political events, natural disasters, etc.) and spatial geo-fencing (i.e., restricting airspace for severe weather, turbulence, aerobatic operations, military operations, parachuting, etc.).

Figure 13:
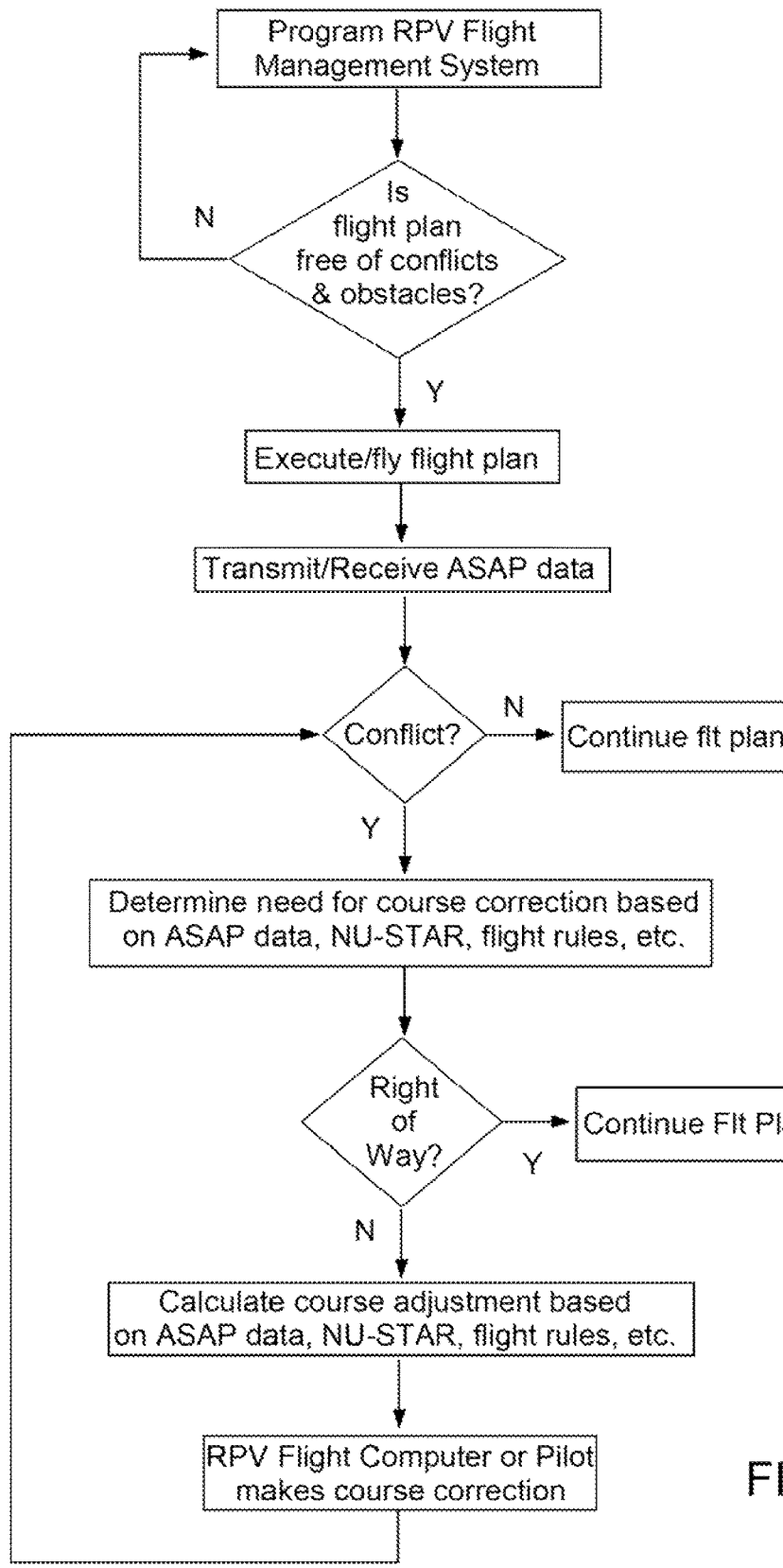
FIG. 13 shows a flow chart of various functions of an ASAP system for a remotely piloted vehicle.

An example of an ASAP-R module in operational use is depicted in FIG. 13. Prior to flight, the flight planning unit of the flight management system is programmed by a qualified, certified remote pilot. The flight program is uploadable to the UAS via a cable, the RF antenna, the satellite antenna, Wi-Fi, and/or cellular transmission. The uploaded flight plan is tested against for any conflicts that would arise based on information in the terrain database, surface obstacle database, geo-fencing database, and spatial-fencing database. If no conflicts are detected, the flight plan for the RPV is implemented. If one or more conflicts are detected, the remote pilot is notified by the flight management system so modifications to the flight route may be made prior to flight. Upon implementation of the flight plan, the ASAP-R module begins to receive and transmit data. As previously stated, the data received by the ASAP-R module includes GPS and/or WAAS data, ASAP data from other aircraft, weather data, updated terrain data, NAVAIDS data, updated geo-fencing data, and updated spatial-fencing data. Data transmitted by the ASAP-R includes ASAP data of the RPV, for example aircraft ID number, baseline and/or updated NU-STAR number, GPS coordinates and time, speed over ground (SOG), course over ground (COG), current heading, past track data, future route data, and other aircraft navigational data. Also, using satellites and/or RF antennas, the ASAP-R module will relay ASAP data received from other aircraft, to other aircraft and to ground relay stations located in the vicinity, for example on cell towers, buildings, hills/mountains, aerial relay platforms, and other objects. With data being received and transmitted, the ASAP-R module and flight management system continuously and automatically searches for conflicts, with other aircraft, terrain, weather, geo-fencing, etc. If a conflict is detected, the UAS flight management system or the remote pilot determines the need for a course adjustment based on NU-STAR numbers, flight rules, right-of-way rules, etc. If the flight computer determines no conflict or if there is a conflict but the RPV has right-of-way, the flight control system or remote pilot flies the programmed flight plan. If the flight computer determines a conflict, the flight computer or remote pilot recalculates a course adjustment based on NU-STAR numbers of other aircraft, terrain, weather, geo-fencing, etc. The RPV flight control computer or remote pilot would then make the necessary course corrections for a safe flight route.

Figure 14:
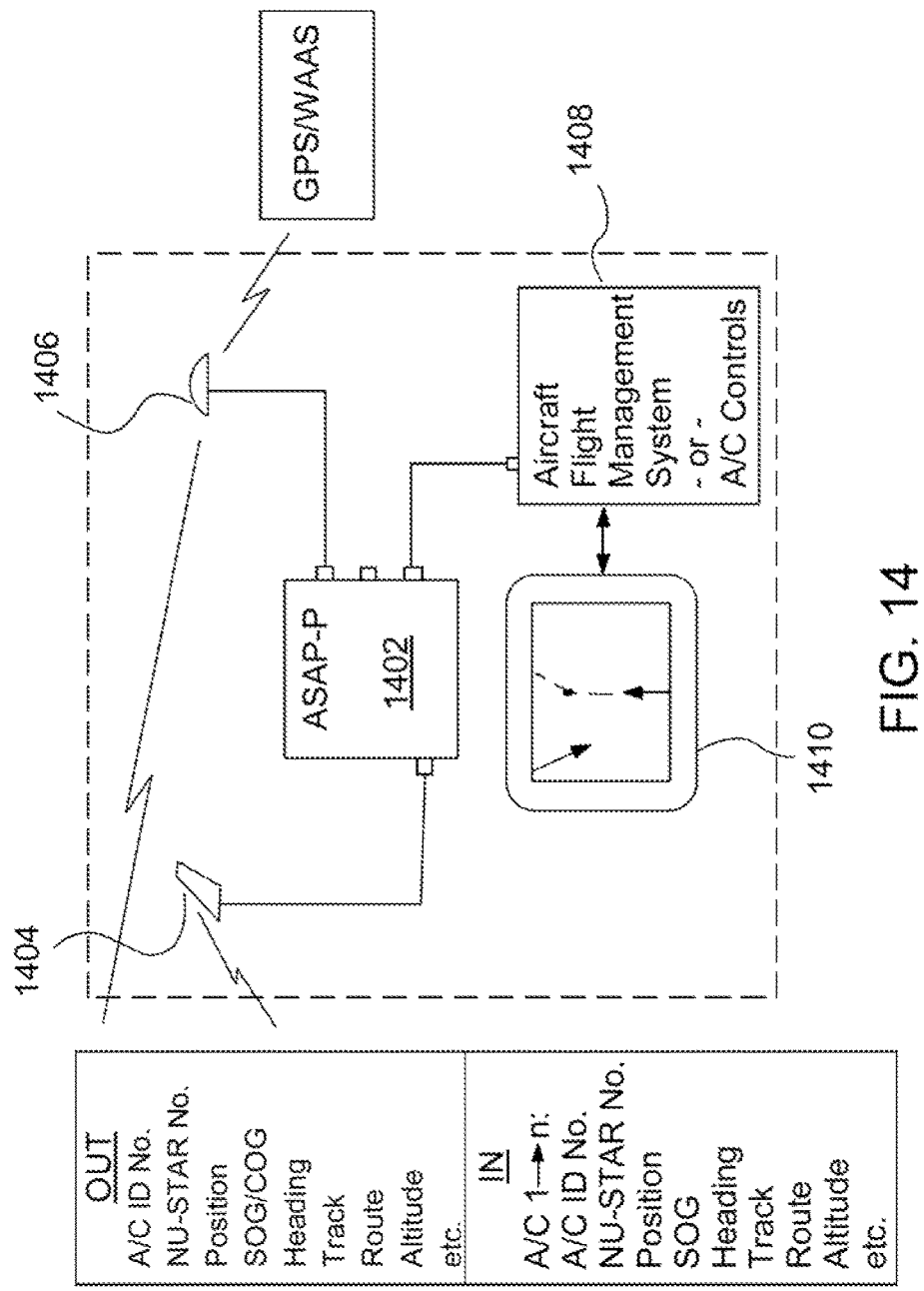
FIG. 14 shows a system diagram for an ASAP system for a piloted aircraft.

Referring to FIG. 14, there is illustrated an example of an ASAP system for a piloted aircraft (ASAP-P). It should be noted that a piloted aircraft may operate in autopilot mode, like a UAS, or a piloted mode. The description of ASAP-U and ASAP-R in autonomous mode would be similar to autopilot mode of a piloted aircraft. Therefore, the following description regarding ASAP-P is focused primarily on piloted mode. The ASAP-P module 1402 integrates a transceiver with a positioning system, such as GPS and/or WAAS. The ASAP-P module 1402 includes a transmitter, one or more receivers, and links to other aircraft systems, like an RF antenna 1404, a satellite antenna 1406, and a flight management system 1408 (if equipped). The satellite antenna 1406 acquires GPS coordinates (x, y, and z) and time. When available, the satellite antenna 1406 acquires WAAS signals to provide more accurate GPS coordinates. The GPS coordinates and time are fed to the ASAP-P module 1402 where the GPS data is fed to the aircraft's chart plotter or multifunctional display 1410 for piloted navigation. The ASAP-P transmitter autonomously and continuously sends certain piloted aircraft information via the RF antenna. Examples of ASAP data to be transmitted by the ASAP-P module are: aircraft ID number, baseline and/or updated NU-STAR number, GPS coordinates and time, speed over ground (SOG), course over ground (COG), current heading, past track data, future route data, and other aircraft navigational data. To ensure that RF transmissions from different ASAPs do not overlap, the signals are time multiplexed using Self-Organized Time Division Multiple Access (SOTDMA). Based on the altitude and/or speed of the piloted aircraft, the data is transmitted more frequently at higher speeds and lower altitudes. For example, a low flying or fast flying piloted vehicle may transmit ASAP data every 1-3 seconds, while a higher flying or slower flying piloted aircraft may transmit ASAP data every 5-10 seconds. In addition to transmitting ASAP data to other aircraft, the RF antenna receives ASAP data from other aircraft. Similar ASAP data sent by the piloted aircraft may be received by the ASAP-P module via the RF antenna. In the event of incoming transmission overload, only the ASAP data from aircraft farthest away from the aircraft is dropped out to give preference to closer traffic. It should be noted that ASAP data from other aircraft may be received alternatively or additionally by the GPS antenna when certain aircraft are equipped to send ASAP data via satellite. Additionally, other data to be received by the ASAP-P module via the satellite antenna and/or the RF antenna are, for example, weather data, navigational aid data, terrain data, geo-fencing data, spatial-fencing data, and updates to the piloted aircraft's flight plan. Such data is fed to the pilot for safe aircraft operations.

Figure 15:
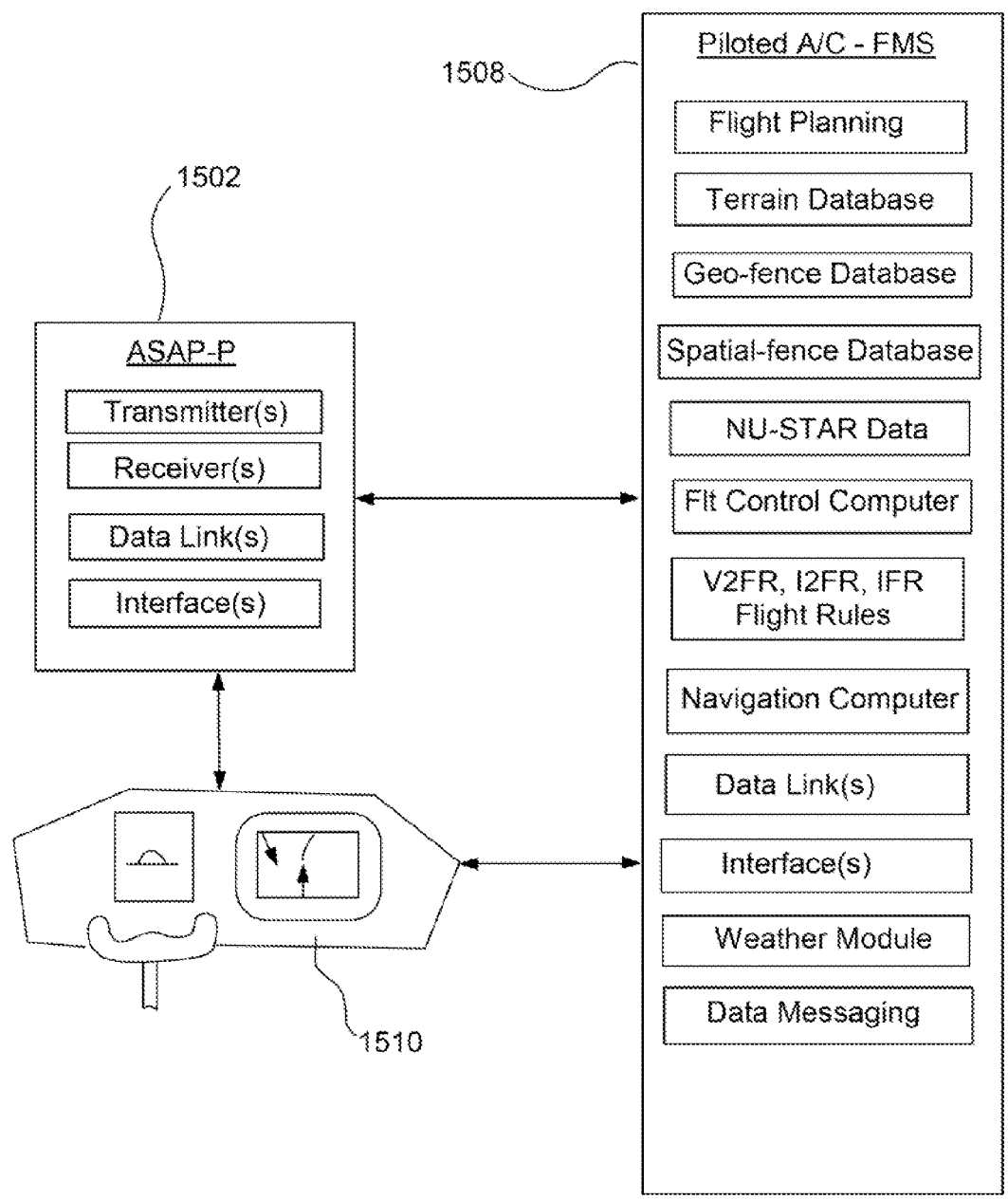
FIG. 15 illustrates the capabilities of an ASAP system for a piloted aircraft.

Referring to FIG. 15, the ASAP-P module 1502, a chart plotter or MFD 1510, and a flight management system 1508 (if equipped) are illustrated. The ASAP-P module 1502 collects and relays data to the chart plotter or MFD 1510 where the pilot can view other aircraft in the vicinity showing their ASAP data, terrain obstacles from the chart plotter or for Google Earth or NASA's World Wind, and applicable geo-fencing and spatial-fencing data. Using the information, the pilot calculates any required modifications to the aircraft's flight path and makes such corrections for safe operation of the piloted aircraft.

Figure 16:
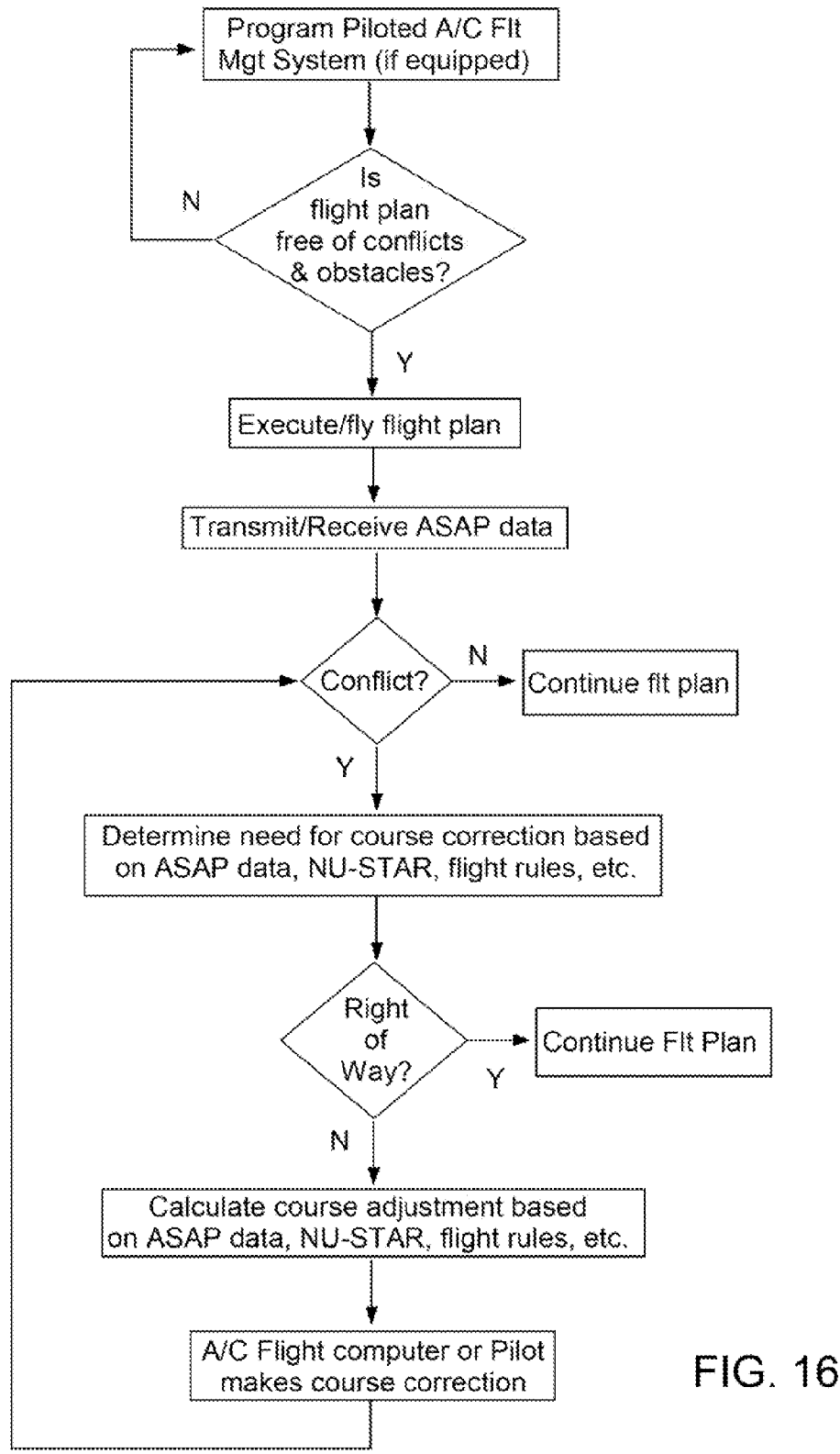
FIG. 16 shows a flow chart of various functions of an ASAP system for a piloted aircraft.

An example of an ASAP-P unit in operational use is depicted in FIG. 16. For piloted aircraft with a flight computer and autopilot, the ASAP-P would function similar to an ASAP-U or ASAP-R in remote mode. For piloted aircraft without autopilot, the pilot initiates a flight plan, and the ASAP-P module begins to receive and transmit data. As previously stated, the data received by the ASAP-P module includes GPS and/or WAAS data, ASAP data from other aircraft, weather data, updated terrain data, NAVAIDS data, updated spatial-fencing data, and updated geo-fencing data. Data transmitted by the ASAP-P module includes ASAP data of the piloted aircraft, for example aircraft ID number, baseline and/or updated NU-STAR number, GPS coordinates and time, speed over ground (SOG), course over ground (COG), current heading, past track data, future route data, and other aircraft navigational data. Also, using satellites and/or RF antennas, the ASAP-P module relays ASAP data received from other aircraft, to other aircraft and to ground relay stations located in the vicinity, for example on cell towers, buildings, hills/mountains, aerial relay platforms, and other objects. With data being received and transmitted, the ASAP-P module continuously and automatically displays ASAP data on the chart plotter or MFD. If the pilot detects a conflict, the pilot makes the necessary course corrections based on NU-STAR numbers of other aircraft, flight rules, right-of-way rules, terrain, weather, geo-fencing, etc. to fly a safe route. If the pilot determines there to be no conflict or if there is a conflict but the piloted aircraft has right-of-way, the pilot would fly the scheduled flight plan.

Figure 17:
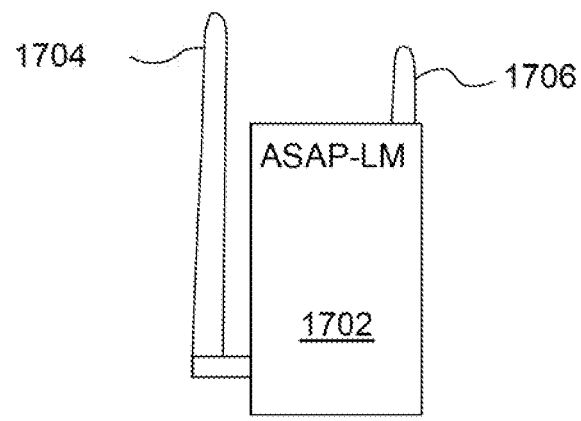
FIG. 17 shows a system diagram for an ASAP system for a limited maneuverability aircraft.

Referring to FIG. 17, there is illustrated an example of an ASAP module for a limited maneuverability aircraft (ASAP-LM), for example manned hot air balloons, paragliders, gliders, blimps, etc. Typically, limited maneuverability aircraft do not include a flight management system, a chart plotter, or an MFD. Therefore, the following description regarding ASAP-LM is focused primarily on non-avionics equipped, slow but piloted aircraft. The ASAP-LM module 1702 integrates a transceiver with a positioning system, such as GPS and/or WAAS. The ASAP-LM module 1702 includes a transmitter, one or more receivers, an RF antenna 1704, and a satellite antenna 1706. The satellite antenna 1706 acquires GPS coordinates (x, y, and z) and time. When available, the satellite antenna 1706 acquires WAAS signals to provide more accurate GPS coordinates. The GPS coordinates and time are fed to the ASAP-LM module 1702. The ASAP-LM transmitter autonomously and continuously sends certain ASAP information via the RF antenna 1704. Examples of ASAP data to be transmitted by the ASAP-LM module are: aircraft ID number, baseline and/or updated NU-STAR number, GPS coordinates and time, speed over ground (SOG), course over ground (COG), current heading, past track data, future route data, and other aircraft navigational data. To ensure that RF transmissions from different ASAPs do not overlap, the signals are time multiplexed using Self-Organized Time Division Multiple Access (SOT-DMA). Generally, limited maneuverability aircraft operate at slow speeds but may operate at low or high altitudes. Based on the altitude and/or speed of the aircraft, the data is transmitted at various rates. For example, a low flying LM vehicle may transmit ASAP data every 1-3 seconds, while a higher flying LM aircraft may transmit ASAP data every 5-10 seconds. In addition to transmitting ASAP data to other aircraft, the RF antenna receives ASAP data from other aircraft. Similar ASAP data sent by the LM aircraft may be received by the ASAP-LM module via the RF antenna. In the event of incoming transmission overload, only the ASAP data from aircraft farthest away from the LM aircraft is dropped out to give preference to closer traffic. It should be noted that ASAP data from other aircraft may be received alternatively or additionally by the GPS antenna when certain aircraft are equipped to send ASAP data via satellite. Additionally, other data to be received by the ASAP-LM module via the satellite antenna and/or the RF antenna are, for example, weather data, navigational aid data, terrain data, geo-fencing data, and updates to the piloted aircraft's flight plan.

Figure 18:
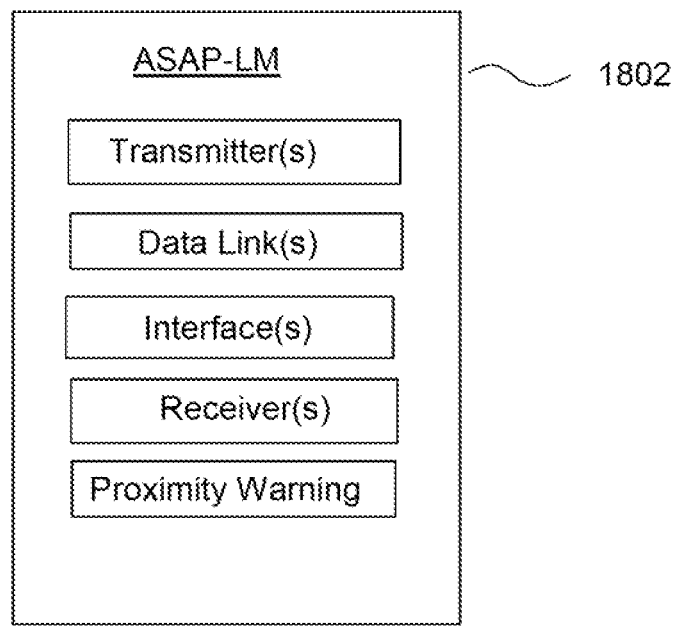
FIG. 18 illustrates the capabilities of an ASAP system for a limited maneuverability aircraft.
Figure 19:
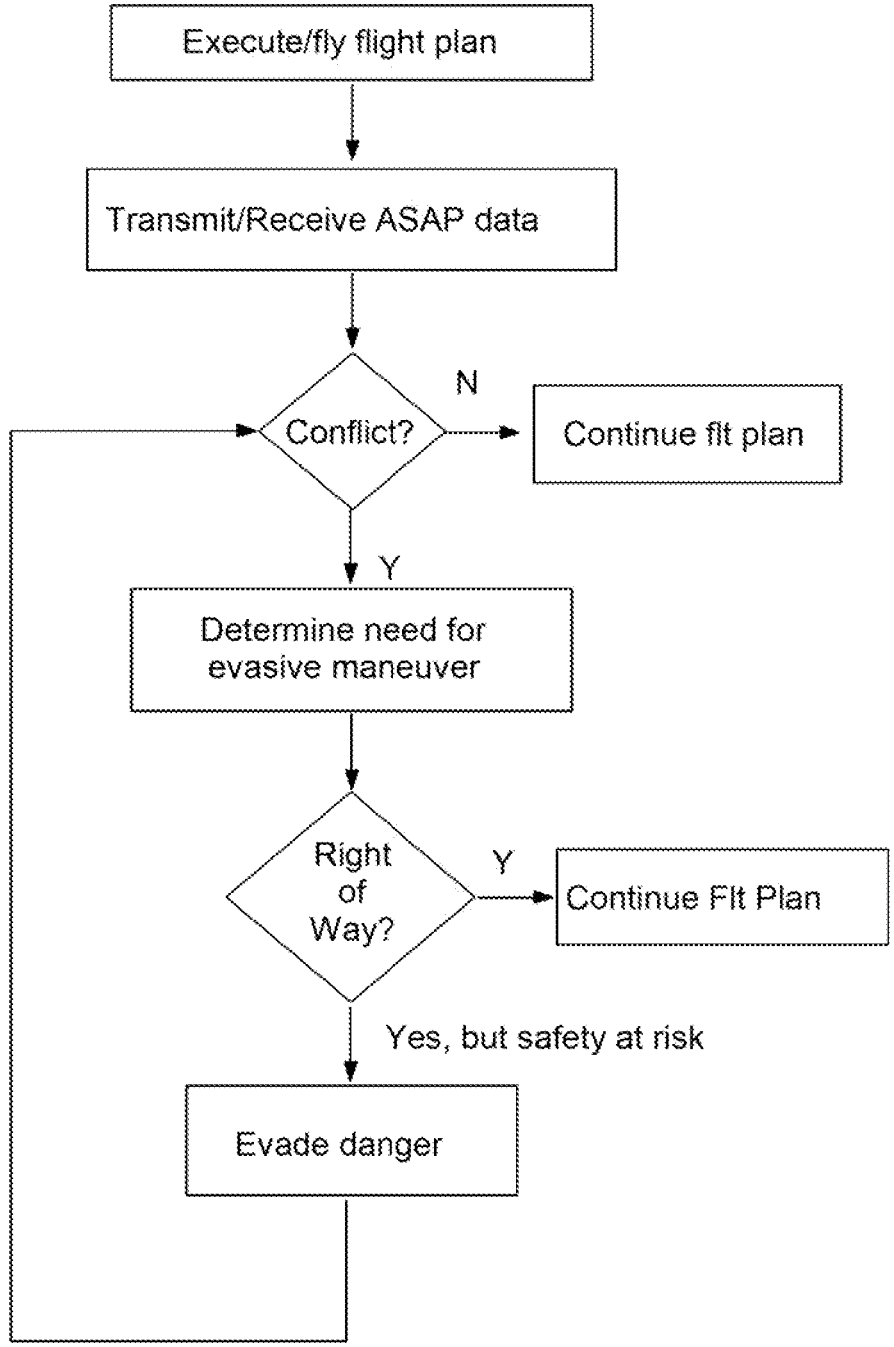
FIG. 19 shows a flow chart of various functions of an ASAP system for a limited maneuverability aircraft.

Referring to FIG. 18, the ASAP-LM module 1802 is illustrated. The ASAP-LM module 1802 collects and relays data to other aircraft in the vicinity. An example of an ASAP-LM module 1802 in operational use is depicted in FIG. 19. As previously stated, the data received by the ASAP-LM module includes GPS and/or WAAS data, ASAP data from other aircraft, weather data, updated terrain data, NAVAIDS data, updated spatial-fencing data, and updated geo-fencing data. Data transmitted by the ASAP-LM module includes ASAP data of the LM aircraft, for example aircraft ID number, baseline and/or updated NU-STAR number, GPS coordinates and time, speed over ground (SOG), course over ground (COG), current heading, past track data, future route data, and other aircraft navigational data. Also, using satellites and/or RF antennas, the ASAP-LM relays ASAP data received from other aircraft to other aircraft and to ground relay stations located in the vicinity, for example on cell towers, buildings, hills/mountains, aerial relay platforms, and other objects. The ASAP-LM module continuously and automatically receives and transmits ASAP data to other aircraft in the area. Because such aircraft generally cannot maneuver well, LM aircraft would generally have right-of-way over other aircraft. If a UAS, an RPV, or a piloted aircraft detects a conflict with a LM aircraft, the UAS, RPV, or piloted aircraft would be responsible for making the necessary course corrections based on NU-STAR numbers of the LM aircraft. The ASAP-LM module also includes a proximity warning feature to notify operators of LM aircraft of potential conflicts.

Data Transmission and Relay of the Autonomous Situational Awareness Platform

As described previously, an ASAP module transmits data about an aircraft's ID number, baseline and/or updated NU-STAR number, GPS coordinates and time, speed over ground (SOG), course over ground (COG), current heading, past track data, future route data, and other aircraft navigational data. The ASAP module also receives similar data from other aircrafts' ASAP modules. Other data to be received and/or transmitted by the ASAP module are, for example, weather data, navigational aid data, terrain data, geo-fencing data, spatial-fencing data, and updates to other aircrafts' flight plans. The range of transmission of an ASAP module depends on the equipment and power. Also, ASAP range of transmission may be automatically determined by the amount of traffic in the vicinity. The more congested an area of airspace, the more precise the ASAP data needs to be, while traffic farther away may be less important. FIGS. 20A-20F illustrate systems and methods to transmit and relay ASAP data. For example, in FIG. 20A, aircraft 2002 and aircraft 2004, both equipped with ASAP, are in the vicinity of each other. Each aircraft can detect the other aircraft because the aircraft are within transmission range of the ASAP modules.

Figure 20A:
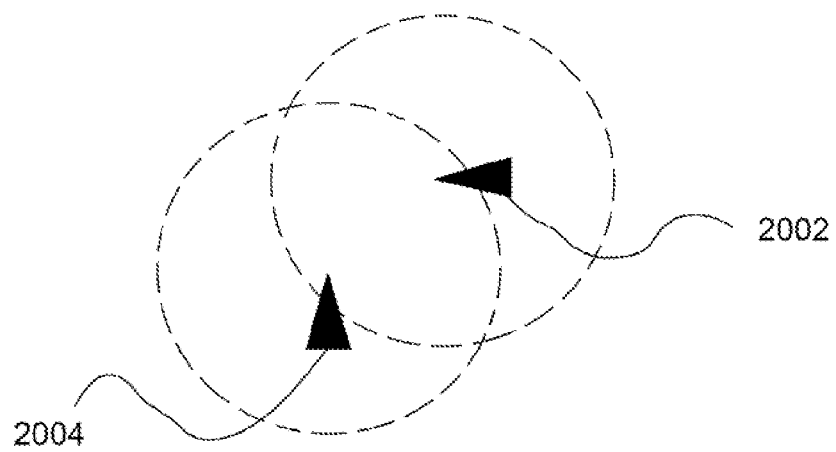
FIGS. 20A-20F illustrate various embodiments of transmission, relay, and receipt of ASAP data between aircraft.
Figure 20B:
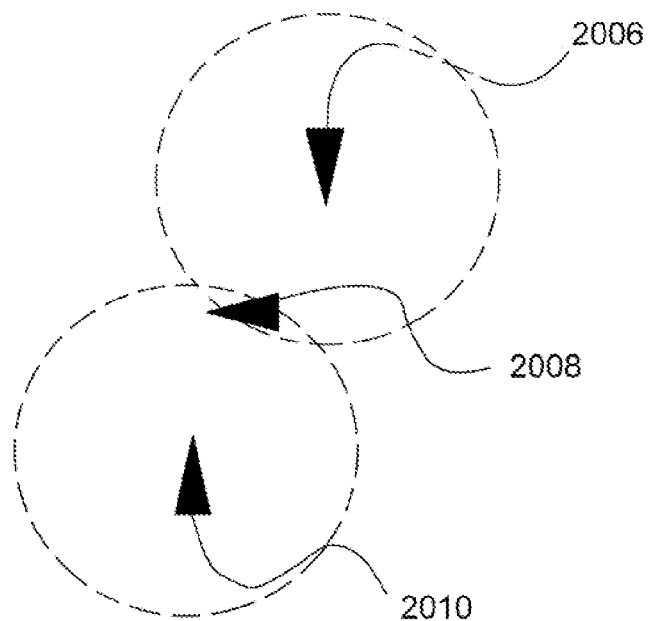

In FIG. 20B, aircraft 2006, 2008 and 2010 are equipped with ASAP. Aircraft 2006 and 2008 are in ASAP transmission range of each other, aircraft 2008 and 2010 are in ASAP transmission range, but aircraft 2006 and 2010 are not in ASAP transmission range. With ASAP, all three aircraft can "see" each other because aircraft 2008 relays aircraft 2006's ASAP data to aircraft 2010, and vice versa. If one or more of the aircraft are piloted or remotely piloted, images of the other aircraft and their ASAP data will visually appear on the chart plotters or MFD. If one or more of the aircraft are UASs, images of the other aircraft and their ASAP data will virtually appear in the UAS's flight management system.

Figure 20C:
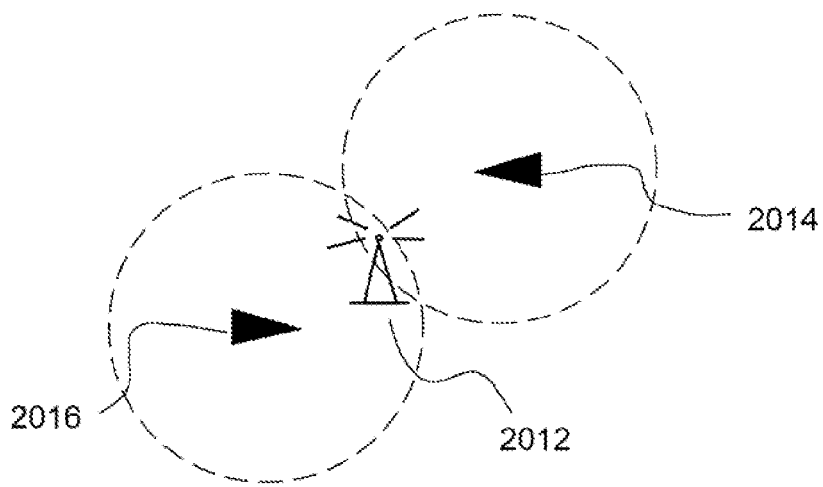
Figure 20D:
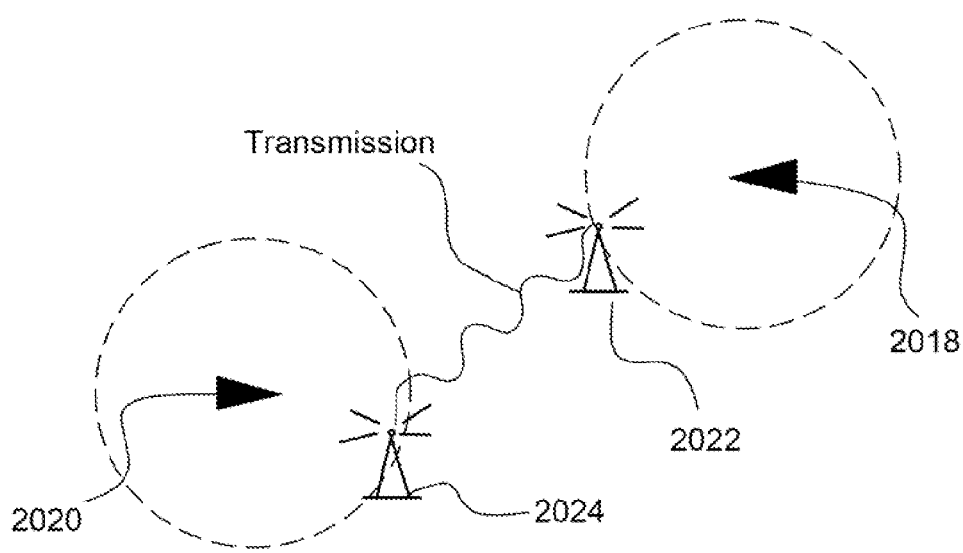
Figure 20E:
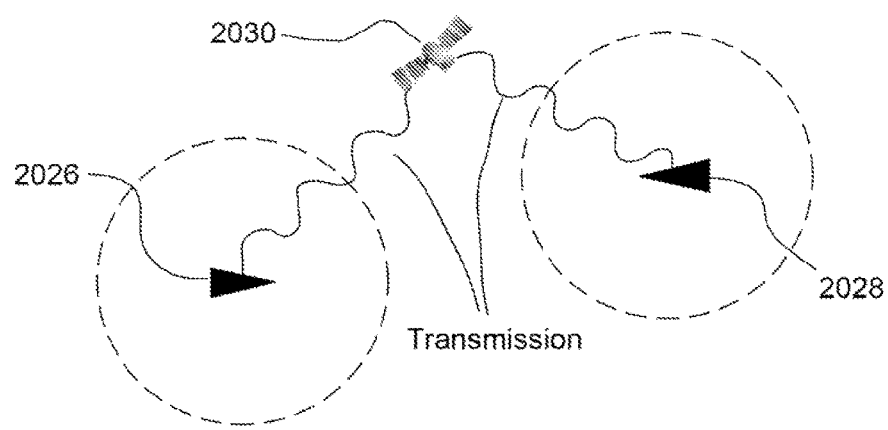

FIG. 20C shows two aircraft 2014 and 2016 not within ASAP data transmission range. However, a repeater or relay station 2012 is within range of both aircraft. The repeater 2012, positioned on a cell tower for example, will relay ASAP data to aircraft 2014 and 2016, and vice versa. In FIG. 20D, two aircraft 2018 and 2020 equipped with ASAP units are able to "see" each other (visually on a chart plotter/MFD or virtually within a flight management system) through multiple repeaters 2022 and 2024 positioned on ground towers. FIG. 20E illustrates the transmission of ASAP data between two aircraft 2026 and 2028 via a satellite 2030, where both aircraft are capable of receiving ASAP data via a satellite receiver.

Figure 20F:
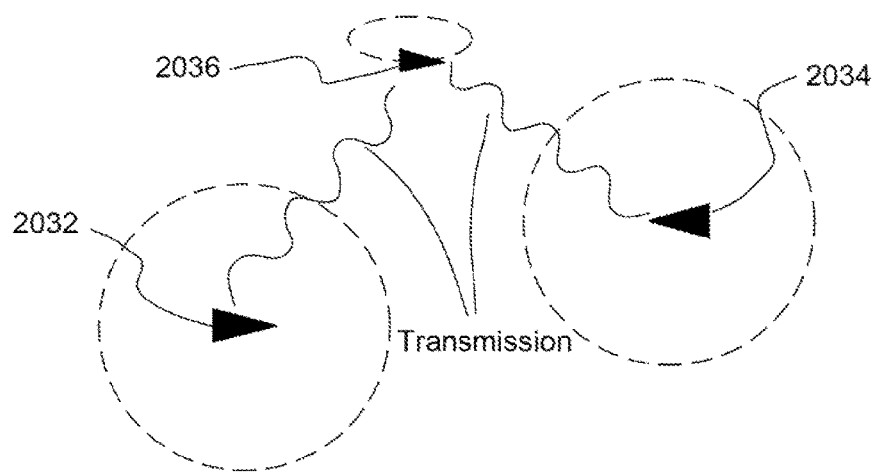

In FIG. 20F, ASAP data is relayed between aircraft 2032 and 2034 via an airborne relay station 2036. The airborne relay station 2036 may be an unmanned balloon, an orbiting UAS, etc. It should be understood the various methods of transmitting and relaying ASAP data between multiple aircraft may be used individually or in any combination thereof. The capability of ASAP modules to transmit an aircraft's ASAP data and to relay other aircrafts' ASAP data to other aircraft, the capability of ASAP equipped aircraft to "see" (visually or virtually) air traffic, and for ASAP equipment aircraft to make course corrections based on NU-STAR numbers, flight rules, and right-of-way rules provides an autonomous traffic management system independent of radar and/or air traffic controllers. It is contemplated, however, that controllers could be beneficial for monitoring the autonomous traffic management system and interjecting in situations where safety of people and property is at an unacceptable level of risk.

V2FR and I2FR Scenario Examples

Figure 21A:
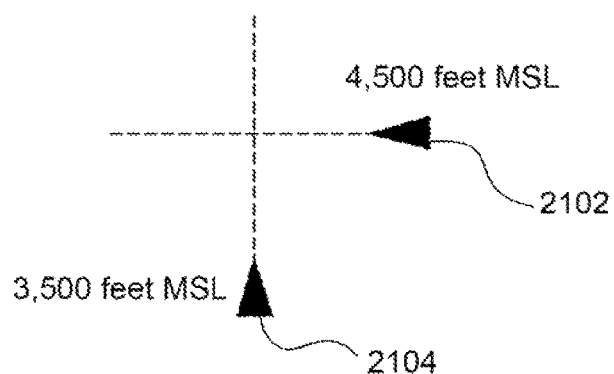
FIGS. 21A-21C show a right-of-way scenario in a UTM system between two UASs.
Figures 21B, 21C:
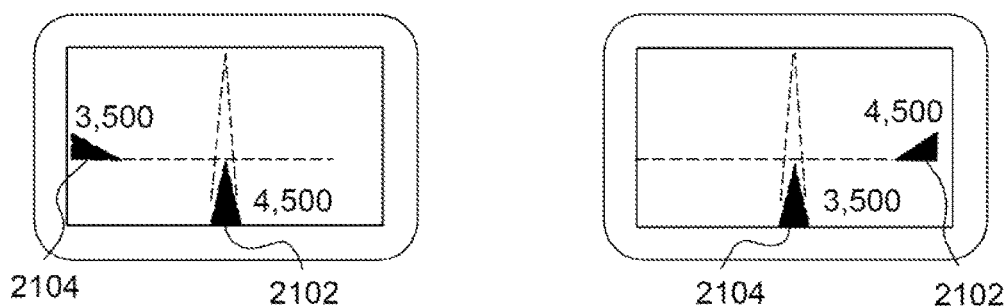

Referring now to FIGS. 21A-21C, there are shown examples of right-of-way scenarios for aircraft equipped with ASAP modules and assigned a NU-STAR number. In FIG. 21A, UAS 2102 is flying west at 4,500 feet MSL, while UAS 2104 is flying north at 3,500 feet MSL. Both UASs are above 2,500 feet AGL. In this scenario, no conflict would arise between the two UASs. Neither UASs would need to take corrective action. FIG. 21B shows a virtual navigation image as seen from UAS 2102, and FIG. 21C shows a virtual image navigation image from UAS 2104. Since both aircraft are unmanned, a visual chart plotter or MFD is not needed. However, the virtual navigation images would be computed and "seen" by the flight management systems of the UASs.

Figure 22A:
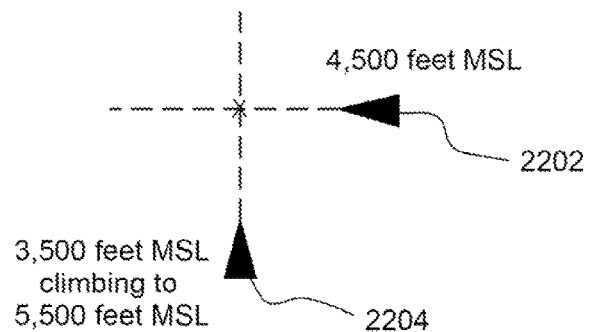
FIGS. 22A-22C illustrate another right-of-way scenario in a UTM system between a piloted aircraft and a UAS.
Figures 22B, 22C:
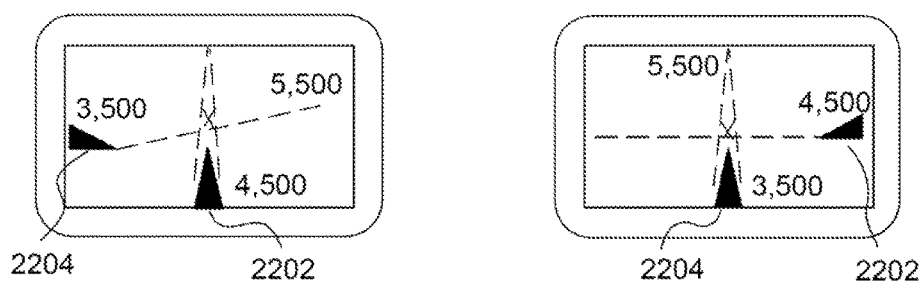

In FIG. 22A, piloted aircraft 2202 is westbound at 4,500 feet MSL, while UAS 2204 is northbound climbing from 3,500 feet MSL to 5,500 feet MSL. Both aircraft are above 2,500 feet AGL. UAS 2204 is the give-way aircraft and is responsible for avoiding piloted aircraft 2202. FIG. 22B shows the chart plotter or MFD of the piloted aircraft 2202. The pilot of aircraft 2202 applies applicable navigation regulations and makes no course corrections. FIG. 22C shows a virtual navigation image from UAS 2204. The ASAP-U module of UAS 2204 feeds ASAP data from aircraft 2202 to the flight management system of UAS 2204. Based on V2FR right-of-way rules, the flight computer of UAS 2204 generates a new course that gives safe separation from aircraft 2202. Such new course may include a modification to altitude, heading, and/or airspeed. The UAS flight control system implements the new course to safely avoid aircraft 2202.

FIG. 23A illustrates a piloted aircraft 2302 eastbound and flying under I2FR rules at 5,000 feet MSL, while UAS 2304 is westbound and flying at 4,500 feet MSL. Both aircraft are above 2,500 feet AGL. FIG. 23B shows the chart plotter or MFD of aircraft 2302 with UAS 2304 heading directly for aircraft 2302. FIG. 23C shows a virtual navigation image as "seen" from UAS 2304. Since both aircraft are cruising on proper, different altitudes, neither aircraft is required to give way.

Figure 24A:
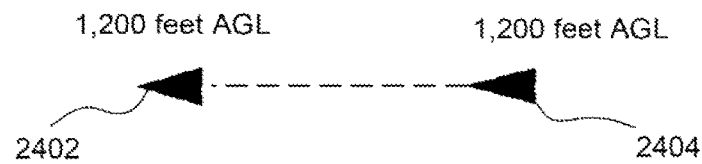
FIGS. 24A-24C illustrate an over-take scenario in a UTM system between two UASs.
Figure 24B:
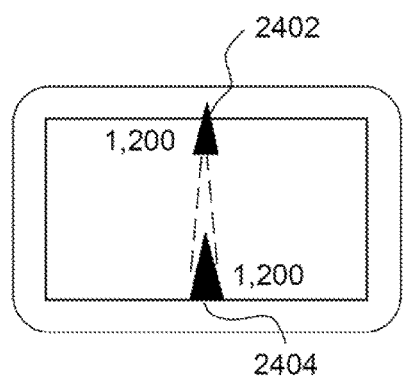
Figure 24C:
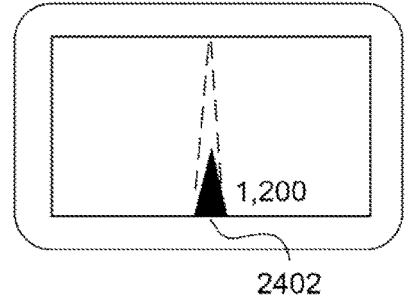

In FIG. 24, UAS 2402 is westbound at 1,000 feet AGL, while UAS 2404 is also westbound at 1,000 feet AGL. However, based on ASAP data, each UAS has information that UAS 2404 is traveling faster than UAS 2402, and based on NU-STAR numbers of the UASs, each UAS has information that UAS 2404 has a greater cruising speed than UAS 2402. Therefore, the flight management system of UAS 2404 calculates a new course to over-take UAS 2402. Such new course includes an increase in SOG, as well as a change of altitude and/or heading. The flight control system of UAS 2404 implements the new course to safely over-take UAS 2402. FIG. 24B shows a virtual navigation image as seen from UAS 2404, and FIG. 24C shows a virtual image navigation image from UAS 2402. Since both aircraft are unmanned, a visual chart plotter or MFD is not needed. However, the virtual navigation images would be computed and "seen" by the flight management systems of the UASs.

Figure 25A:
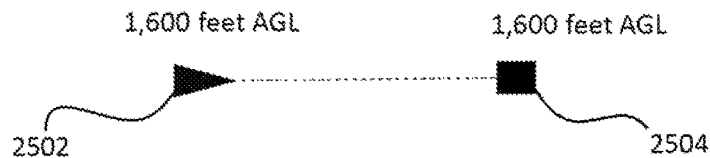
FIGS. 25A-25C show a right-of-way scenario in a UTM system between a UAS and a limited maneuverability aircraft.
Figure 25B:
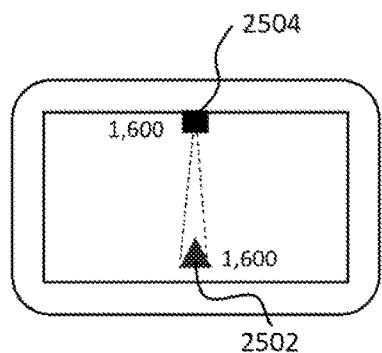
Figure 25C:
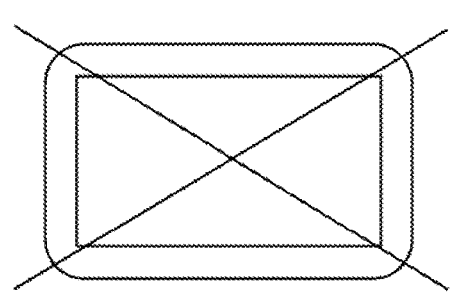

FIG. 25A shows a limited maneuverability aircraft 2504 (for example, a manned hot air balloon) drifting in the wind at an altitude of 1,200 feet AGL. UAS 2502 is flying eastbound at 1,200 feet AGL and heading directly toward LM aircraft 2504. LM aircraft is equipped with an ASAP-LM module, while UAS 2502 is equipped with an ASAP-U module. Based on the exchange of ASAP data between the aircraft, UAS 2502 has determined it must give way to LM aircraft 2504. The flight management system of UAS 2502 compares its NU-STAR number, for example, 40173, to the LM aircraft's NU-STAR number which is, for example, 10111. Based on this information, UAS 2502 determines LM aircraft 2504 has right of way. The flight management system of UAS 2502 calculates a new course to safely avoid LM aircraft 2504. The flight control system of UAS 2502 implements the new course and navigates around LM aircraft 2504. It should be noted that in this scenario, it may be safer for UAS 2502 to maintain 1,200 feet AGL and change its heading to avoid LM aircraft 2504 instead of UAS 2502 changing altitude and having to give way to aircraft traveling at normally prescribed altitudes. FIG. 25B shows a virtual navigation image as seen from UAS 2502, and FIG. 25C shows no chart plotter/MFD or virtual image navigation image because UAS 2504 is LM and is not equipped with a chart plotter/MFD or a flight management system but may be equipped with a warning feature for potential conflicts.

Figure 26A:
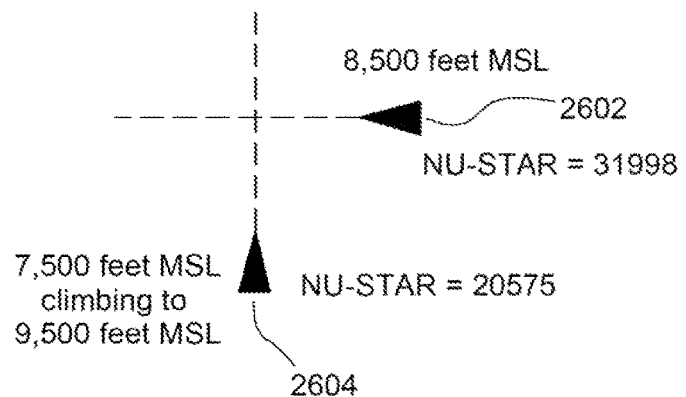
FIGS. 26A-26C illustrate another right-of-way scenario in a UTM system between a UAS and an emergency-responding UAS.
Figures 26B, 26C:
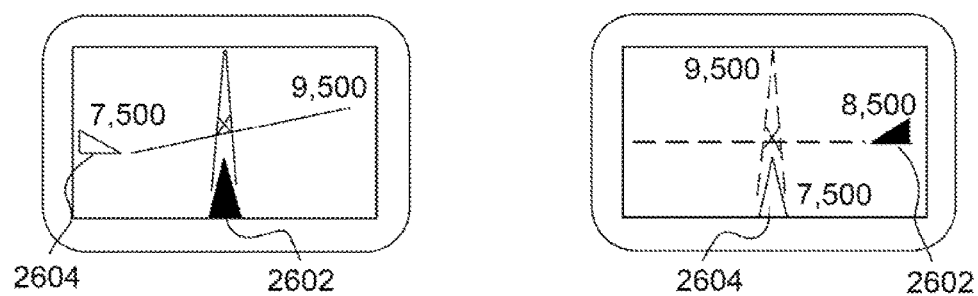

In FIG. 26A, UAS 2602 is flying V2FR westbound at 8,500 feet MSL, while UAS 2604 is flying V2FR northbound and climbing from 7,500 feet MSL to 9,500 feet MSL. Normally, under VFR flight rules, UAS 2604 heading northbound would give way to UAS 2602. However, the NU-STAR number of UAS 2602 is 31998, and the NU-STAR number of UAS 2604 is 20575. UAS 2604 is a vehicle responding to an emergency, for example, a UAS ambulance. Therefore, as UAS 2602 and UAS 2604 exchange ASAP data and NU-STAR numbers, UAS 2602 will determine that it must give way to UAS 2604. The flight management system of UAS 2602 calculates a new course to avoid UAS 2604 by changing altitude, airspeed, and/or heading, which ever variables or combination of variables produce the most efficient and safe avoidance route. The flight control system of UAS 2602 implements the new course to safely avoid UAS 2604. FIG. 26B shows a virtual navigation image as seen from UAS 2602, and FIG. 26C shows a virtual image navigation image from UAS 2604. Since both aircraft are unmanned, a visual chart plotter or MFD is not needed. However, the virtual navigation images would be computed and "seen" by the flight management systems of the UASs.

Figure 27A:
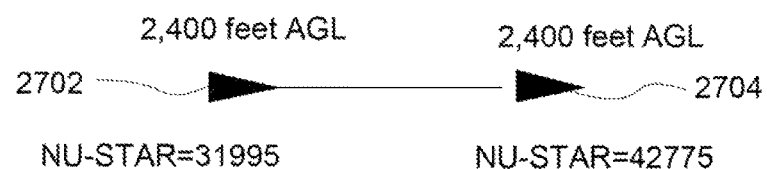
FIGS. 27A-27C show an over-take scenario in a UTM system between a UAS and a human passenger carrying UAS.
Figures 27B, 27C:
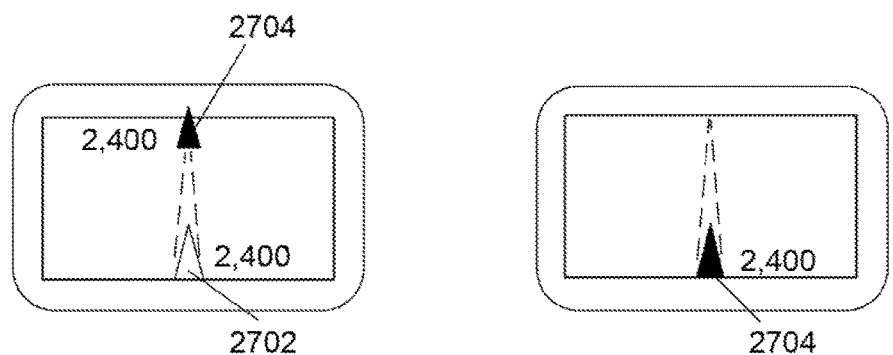

FIG. 27A illustrates UAS 2702 traveling V2FR eastbound at 2,400 feet AGL, while UAS 2704 is traveling V2FR eastbound at 2,400 feet AGL on a similar heading and is ahead of UAS 2702. Based on the exchange of ASAP data including NU-STAR numbers, UAS 2702 determines the NU-STAR number of UAS 2704 is 42775, and UAS 2704 determines the NU-STAR number of UAS 2702 is 31995. UAS 2704 determines that UAS 2702 is traveling at a higher SOG and is capable of higher cruising speeds than itself. Therefore, UAS 2704 will give way to UAS 2702 because UAS 2702 is carrying human passengers (as determined by the NU-STAR number), and UAS 2702 desires to pass UAS 2704. The flight management system of UAS 2704 calculates a new course giving UAS 2702 safe clearance to pass. The flight control system of UAS 2704 executes the new course. Now, having exchanged ASAP data again (a continuously), UAS 2702 determines it is safe to proceed on its current heading and speed. FIG. 27B shows a virtual navigation image as seen from UAS 2702, and FIG. 27C shows a virtual image navigation image from UAS 2704. Since both aircraft are unmanned, a visual chart plotter or MFD is not needed. However, the virtual navigation images would be computed and "seen" by the flight management systems of the UASs.

Terrain Obstacles, Geo-Fencing, and Spatial-Fencing

As described in the section entitled "Autonomous Situational Awareness Platform" of the Detailed Description of the Invention, the ASAP system provides UAS flight management systems and pilots with data relating to, among other information, terrain obstacles, geo-fencing, and spatial-fencing. Additionally, the ASAP system provides real-time, en-route updates to such data. For UASs, for remotely piloted vehicles having an autonomous mode, and for certain piloted aircraft system, databases containing information about terrain obstacles, geo-fencing, and spatial-fencing are included in the flight management system. For such equipped aircraft, the databases may be updated prior to flight. During flight, new or modified terrain data, geo-fencing data, and spatial-fending data may be transmitted to aircraft via RF antenna and/or satellite receiver then to ASAP modules for updating the flight management system databases.

Figure 28A:
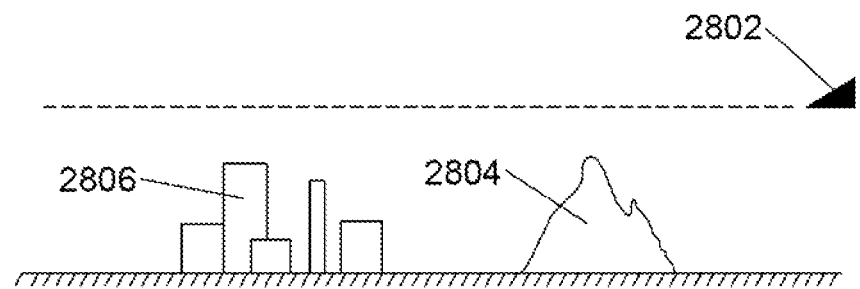
FIGS. 28A-28B illustrates terrain obstacle database updating for a UTM system.
Figure 28B:
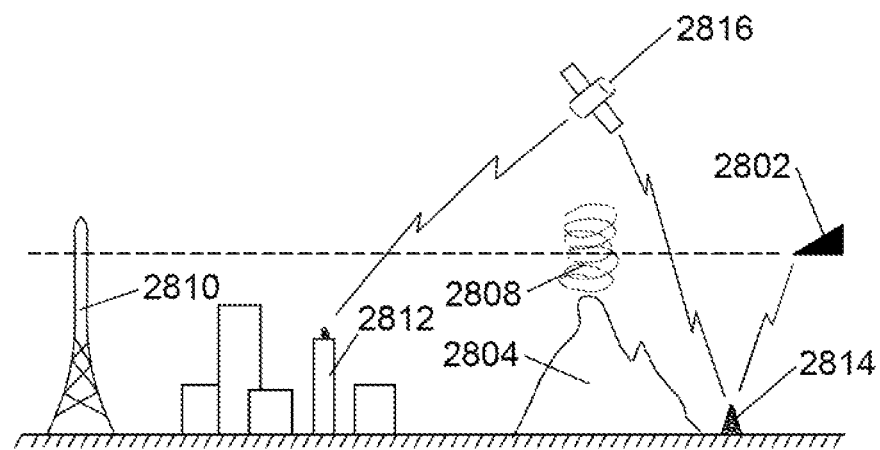

Referring now to FIG. 28A, there is shown UAS 2802 (or other aircraft type) equipped with ASAP. The initial flight plan loaded into the UAS's flight management system includes a westbound cruising altitude safe from any terrain obstacles, like mountains 2804 and buildings 2806. However, during flight, certain terrain obstacles appear that are unknown by the UAS flight management system, and without radar, a camera, or other sensing means, the UAS would not detect the new terrain obstacles. FIG. 28B shows UAS 2802 starting its pre-programmed flight route. During flight, a mountain 2804 within the flight route erupts or produces severe weather/turbulence 2808. Also, a new radio tower 2810 is recently erected. Without a change of course, the UAS would fly directly into these terrain obstacles. A service provider 2812, such as the FAA, a FAA-contracted entity, a business entity, and/or a non-profit entity, transmits updated terrain obstacle data to aircraft flying in the vicinity. In the scenario of FIG. 28B, the UAS is out of RF range of the service provider. However, using repeater or relay stations, like a cell towers 2814 and a satellite 2816, the UAS 2802 receives the updated terrain obstacle data. The flight management system of the UAS calculates a corrected flight path to avoid the new obstacles. The flight control system of the UAS executes the modified flight path to safely avoid the terrain obstacles and other aircraft traffic in the area. It should be noted that if the aircraft of FIGS. 28A and 28B was a piloted aircraft equipped with ASAP but with no flight management system, the terrain obstacle database updates would be received by the ASAP-P module, and the new obstacles would appear on a chart plotter or MFD. The pilot would then take corrective actions to safely avoid the new terrain obstacles.

Figure 29:
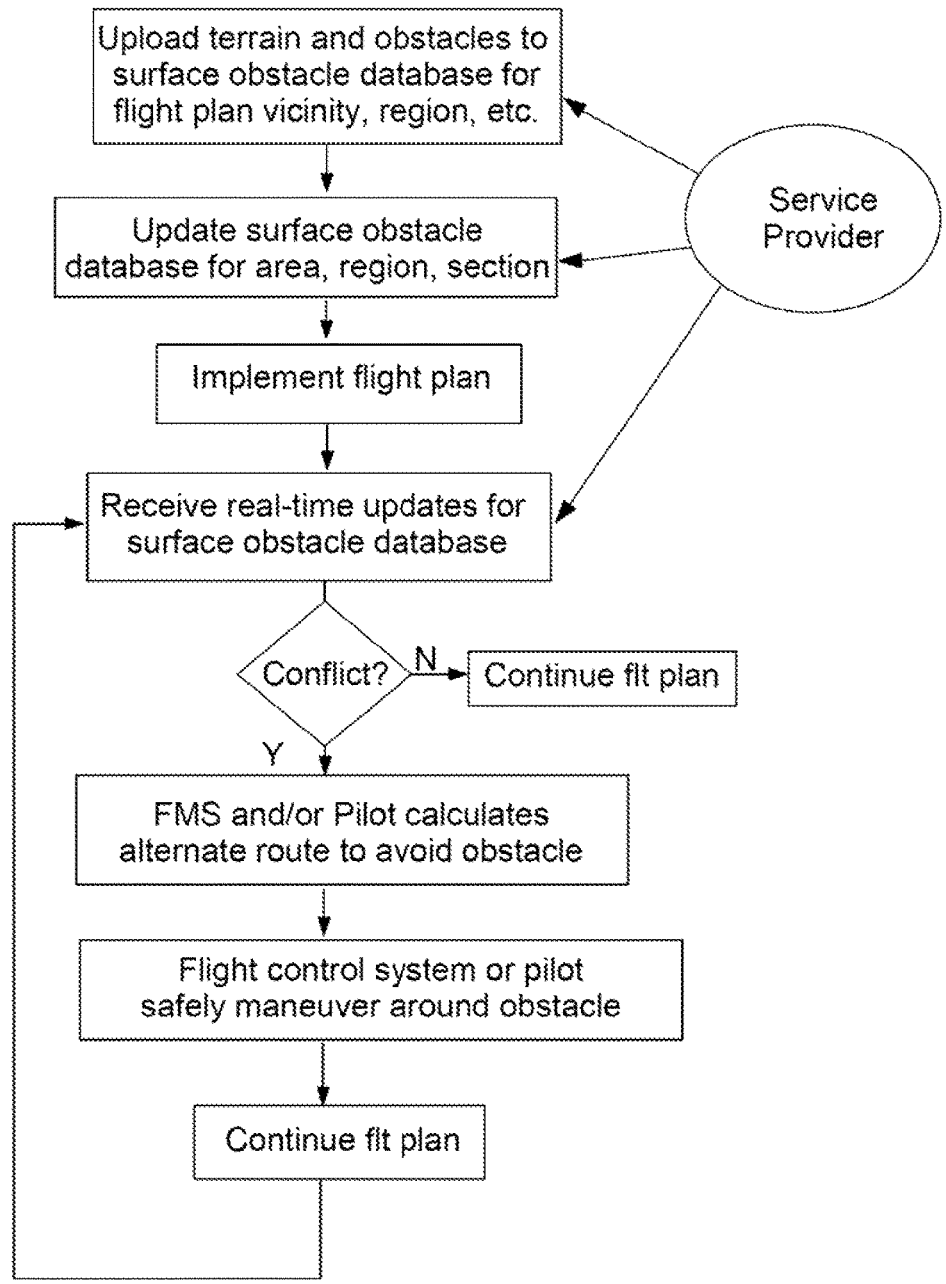
FIG. 29 is a flow chart of a terrain obstacle database update for a UTM system.

Illustrated in FIG. 29 is a flow diagram of terrain obstacle database utilization. Initially, a terrain database is uploaded to a UAS's flight management system. This may be accomplished by the UAS owner/operator and/or a data service provider as previously described. When a UAS flight management system already includes a terrain obstacle database, for example from a previous flight, the database may require updating before takeoff. Once the UAS is airborne and executing its intended flight plan, real-time updates to the terrain database may be received. Again, the UAS owner/operator and/or a data service provider may provide in-flight terrain obstacle updates. Depending upon the capacity of the UAS's terrain obstacle database, updates may include only those along the intended flight plan, may include regional updates relative to the intended flight plan, and/or may include larger sectional updates. The flight management system of the UAS compares the terrain obstacle updates with its intended flight plan to determine if one or more course corrections are needed. If so, the flight management system calculates a modified route, then the flight control system executes the modified route to safely avoid the new terrain obstacles and safely navigate clear of other aircraft in the area.

Figure 30A:
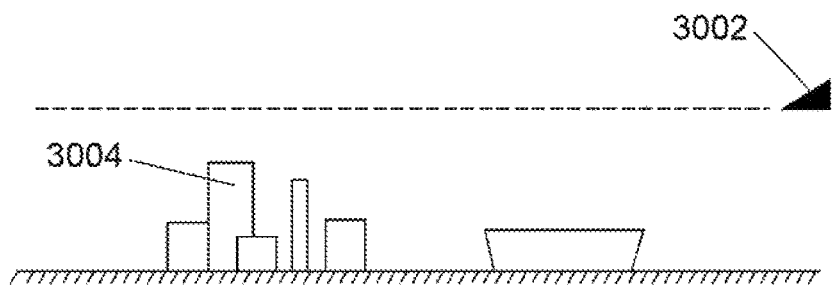
FIGS. 30A-30B show geo-fencing database updating for a UTM system.
Figure 30B:
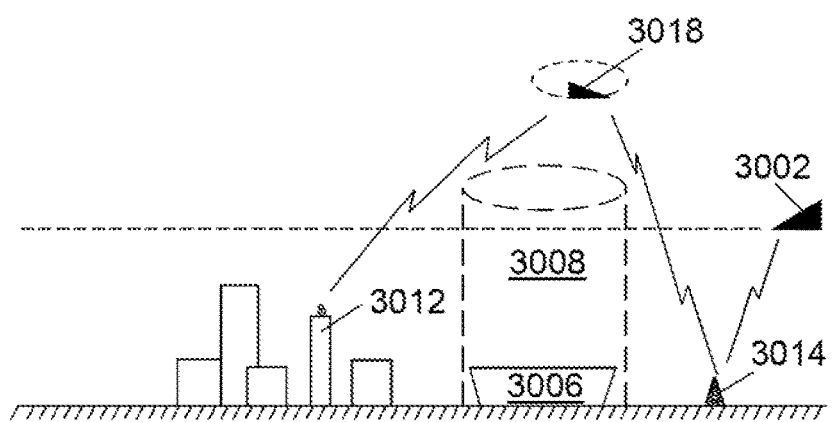

Referring now to FIG. 30A, there is shown UAS 3002 (or other aircraft type) equipped with ASAP. The initial flight plan loaded into the UAS's flight management system includes a westbound cruising altitude safe from any terrain obstacles, like buildings 3004. However, during flight, a new geo-fencing region may appear that was unknown by the UAS flight management system prior to take-off. FIG. 30B shows UAS 3002 starting its pre-programmed flight route. During flight, a sporting event (or other event heavily attended by people) starts at a sports stadium 3006 which lies in the intended flight route. Without a change of course, the UAS would fly directly into the geo-fenced region 3008, violating FAA safety regulations and putting peoples' safety unnecessarily at risk. A service provider 3012, such as the FAA, a FAA-contracted entity, a business entity, and/or a non-profit entity, transmits updated geo-fencing data to aircraft flying in the vicinity. In the scenario of FIG. 30B, the UAS is out of RF range of the service provider. However, using other aircrafts' ASAP modules, geo-stationary orbiting aircraft 3018, and ground-based relay stations 3014, the UAS 3002 receives the updated geo-fencing data. The flight management system of the UAS calculates a corrected flight path to avoid the new geo-fenced region. The flight control system of the UAS executes the modified flight path to safely avoid the geo-fenced region and other aircraft traffic in the area. It should be noted that if the aircraft of FIGS. 30A and 30B was a piloted aircraft equipped with ASAP but with no flight management system, the geo-fencing database updates would be received by the ASAP-P module, and the new geo-fenced region would appear on a chart plotter or MFD. The pilot would then take corrective actions to safely avoid the new geo-fenced area.

Figure 31:
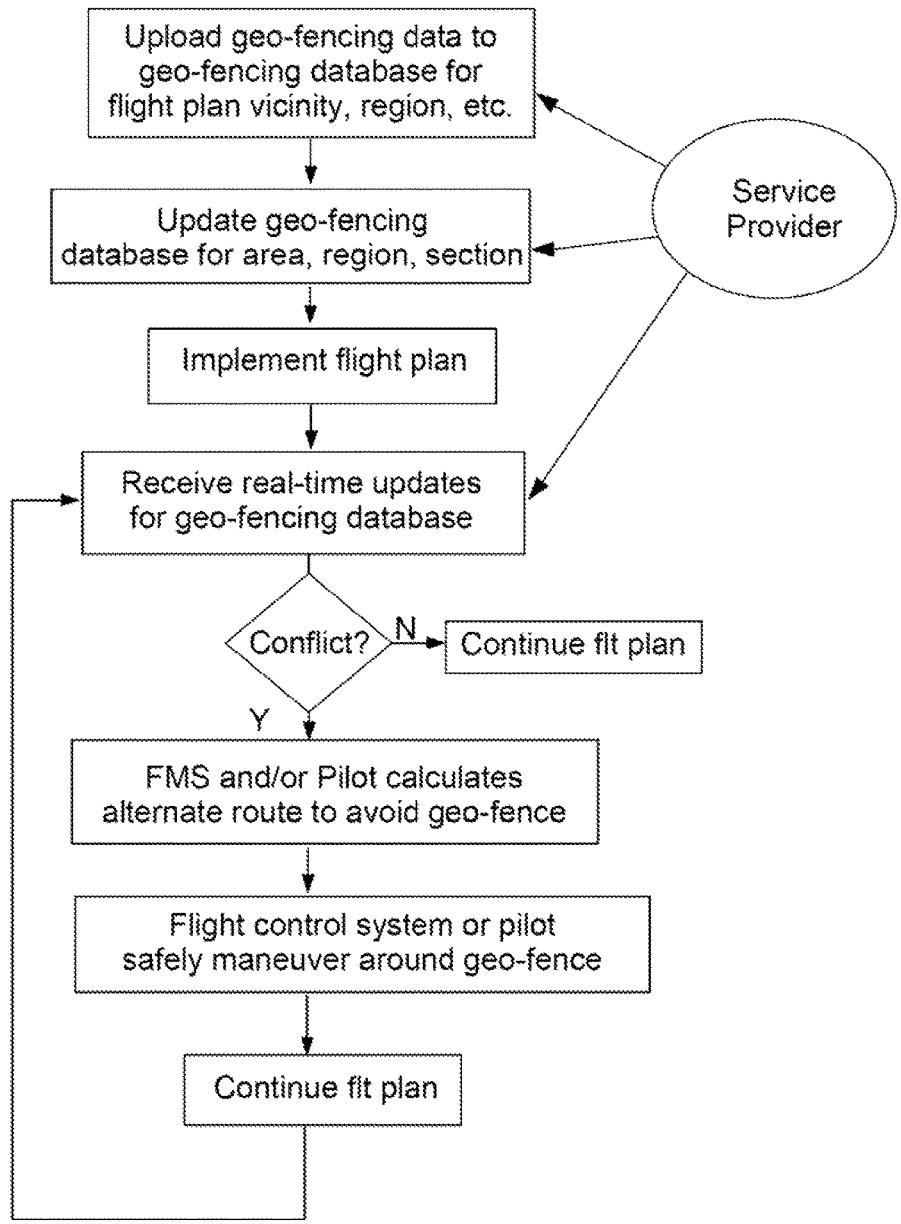
FIG. 31 is a flow chart of a geo-fencing database update for a UTM system.

Illustrated in FIG. 31 is a flow diagram of geo-fencing database utilization. Initially, a geo-fencing database is uploaded to a UAS's flight management system. This may be accomplished by the UAS owner/operator and/or a data service provider as previously described. When a UAS flight management system already includes a geo-fencing database, for example from a previous flight, the database may only require updating before takeoff. Once the UAS is airborne and executing its intended flight plan, real-time updates to the geo-fencing database may be received. Again, the UAS owner/operator and/or a data service provider may provide in-flight geo-fencing updates. Depending upon the capacity of the UAS's geo-fencing database, updates may include only those along the intended flight plan, may include regional updates relative to the intended flight plan, and/or may include larger sectional updates. The flight management system of the UAS compares the geo-fencing updates with its intended flight plan to determine if one or more course corrections are needed. If so, the flight management system calculates a modified route, then the flight control system executes the modified route to safely avoid the new geo-fenced area and safely navigate clear of other aircraft in the area.

Figure 32A:
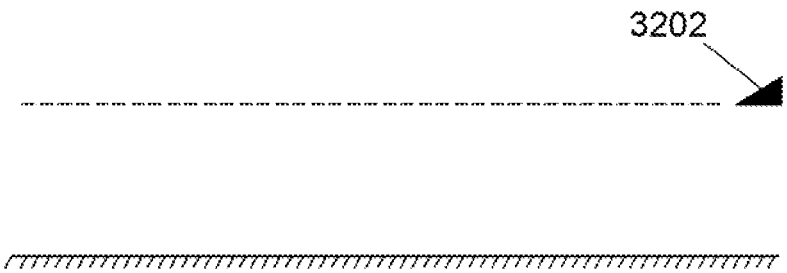
FIGS. 32A-32B illustrate spatial-fencing database updating for a UTM system.
Figure 32B:
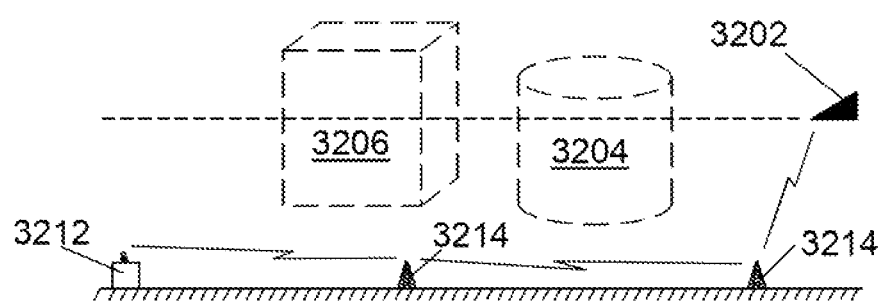

Referring now to FIG. 32A, there is shown UAS 3202 (or other aircraft type) equipped with ASAP. The initial flight plan loaded into the UAS's flight management system includes a westbound cruising altitude safe from any terrain obstacles or geo-fenced regions. However, during flight, a new spatial-fenced region may appear that was unknown by the UAS flight management system prior to take-off. FIG. 32B shows UAS 3202 starting its pre-programmed flight route. During flight, a weather cell, for example convective weather, forms which lies in the intended flight route. Also, an aerobatic aircraft is practicing maneuvers in an area that would conflict with the UAS's pre-programmed flight path. Without a change of course, the UAS would fly directly into the spatial-fenced weather region 3204 and the spatial-fenced aerobatic region 3206. A service provider 3212, such as the FAA, a FAA-contracted entity, a business entity, and/or a non-profit entity, transmits updated geo- and spatial-fencing data to aircraft flying in the vicinity. In the scenario of FIG. 32B, the UAS is out of RF range of the service provider. However, using satellite repeaters and ground-based relay stations 3214, the UAS 3202 receives the updated spatial-fencing data. The flight management system of the UAS calculates a corrected flight path to avoid the spatial-fenced regions 3204 and 3206. The flight control system of the UAS executes the modified flight path to safely avoid the geo-fenced weather region 3204 and the spatial-fenced aerobatic region 3206. It should be noted that if the aircraft of FIGS. 32A and 32B was a piloted aircraft equipped with ASAP with no flight management system, the spatial-fencing updates would be received by the ASAP-P module, and the new spatial-fenced regions would appear on a chart plotter or MFD. The pilot would then take corrective actions to safely avoid the spatial-fencing weather region and aerobatic region.

Figure 33:
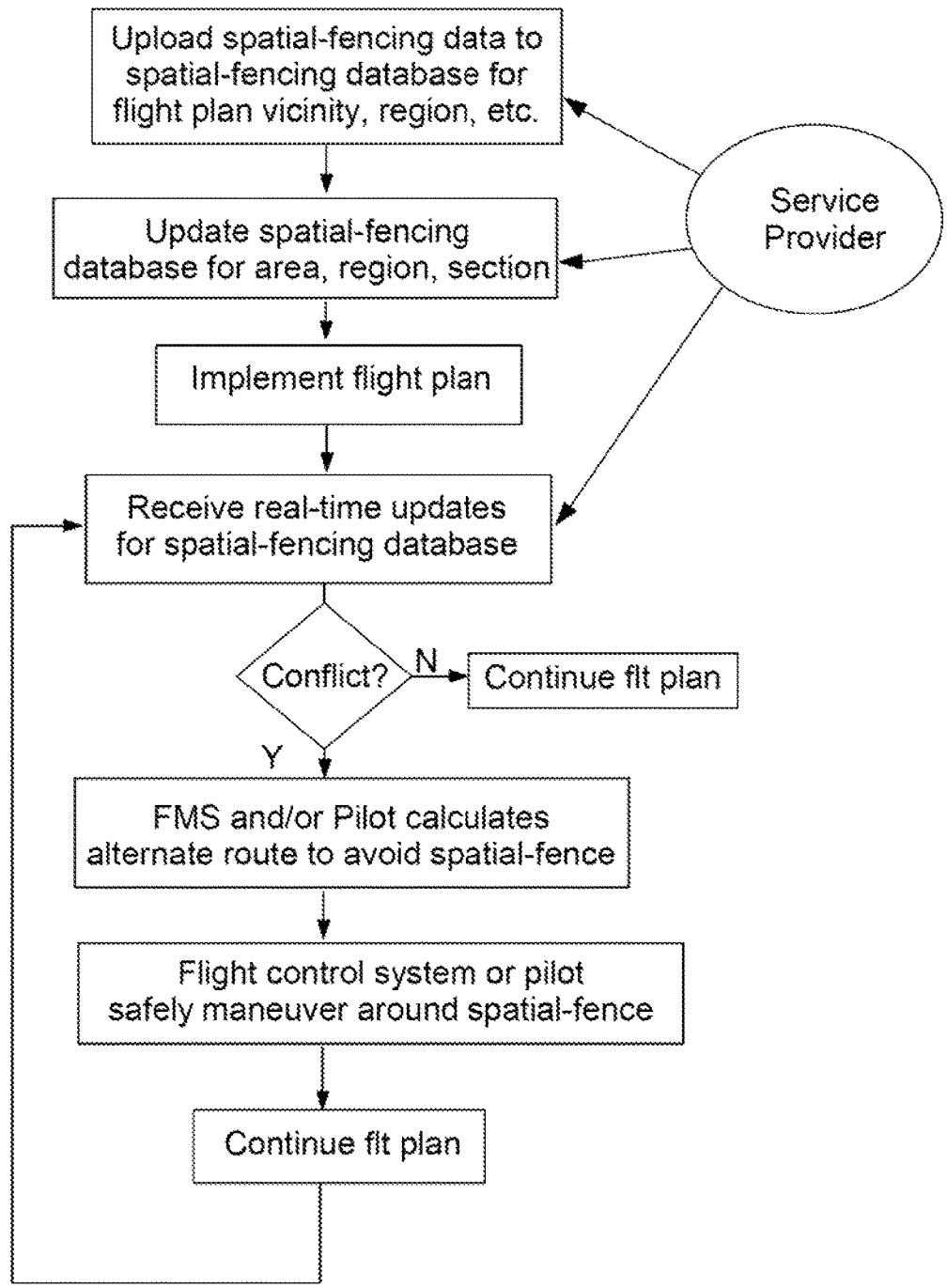
FIG. 33 is a flow chart of a spatial-fencing database update for a UTM system.

Illustrated in FIG. 33 is a flow diagram of spatial-fencing database utilization. Initially, a spatial-fencing database is uploaded to a UAS's flight management system. This may be accomplished by the UAS owner/operator and/or a data service provider as previously described. When a UAS flight management system already includes a spatial-fencing database, for example from a previous flight, the database may only require updating before takeoff. Once the UAS is airborne and is executing its intended flight plan, real-time updates to the spatial-fencing database may be received. Again, the UAS owner/operator and/or a data service provider may provide in-flight spatial-fencing updates. Depending upon the capacity of the UAS's spatial-fencing database, updates may include only those along the intended flight plan, may include regional updates relative to the intended flight plan, and/or may include larger sectional updates. The flight management system of the UAS compares the spatial-fencing updates with its intended flight plan to determine if one or more course corrections are needed. If so, the flight management system calculates a modified route, then the flight control system flies the modified route to safely avoid the spatial-fenced weather and aerobatic regions while safely navigating clear of other aircraft in the area.

As shown in FIGS. 30B and 32B, geo-fencing areas and spatial-fencing areas are used to prevent unauthorized aircraft from entering designated airspace, for example, airspace above a sporting or political event, airspace containing inclement weather, and airspace reserved for special purposes like aerobatics, military operations, etc. In addition, geo-fencing and spatial-fencing may utilized to create route corridors for UASs and other aircraft operating under UTM. Route corridors are three-dimensional "highways in the sky" (or tunnels with a square or rectangular shaped cross section, for example) designated for UTM. Generally, route corridors may extend from the surface up to a certain altitude, or may start at a designated altitude and extend to a higher altitude. A network of route corridors linked together provides a "highway" system for UTM aircraft.

National, Regional, and Local Flight Plan Sharing and Updating

Figure 34A:
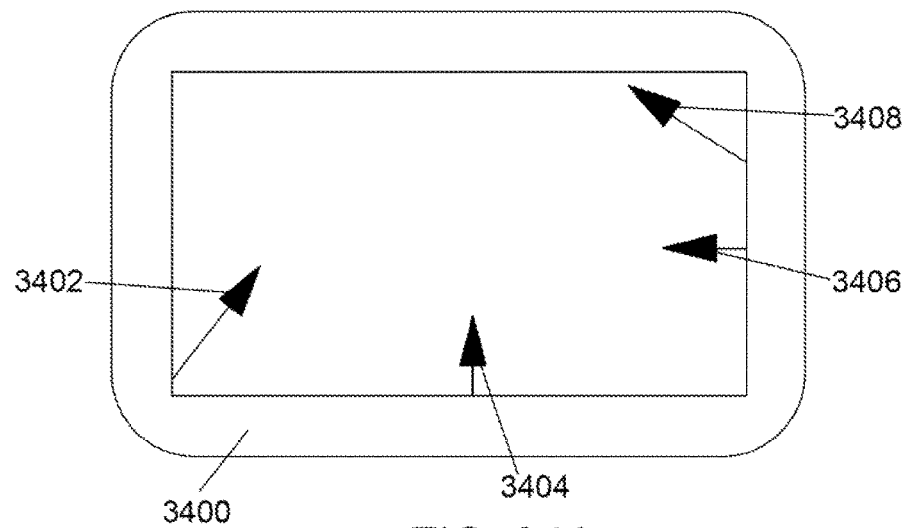
FIGS. 34A-34B show visual/virtual chart plotters with and without ASAP future flight path information.
Figure 34B:
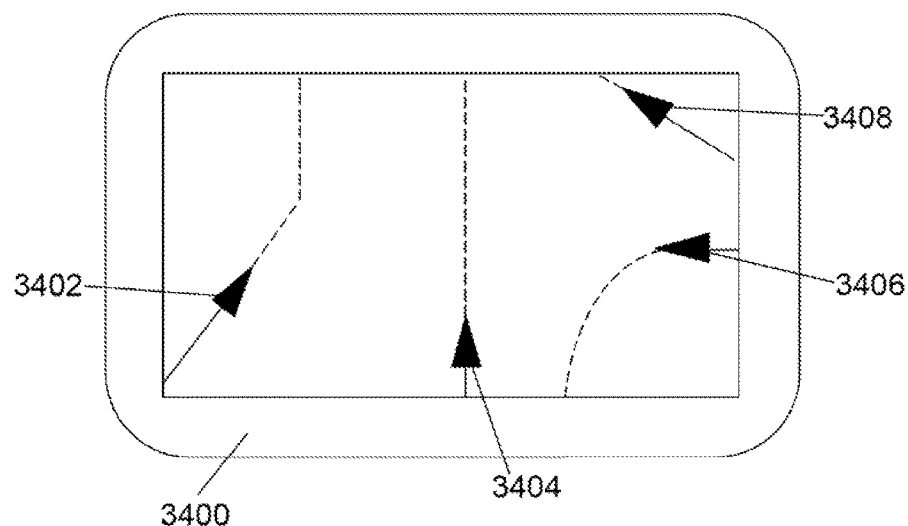

With ASAP data shared real-time between all equipped aircraft via ASAP modules, UAS flight computers and pilots are actively aware of air traffic in the area. When ASAP data being transmitted and received includes past track data, for example, recent past GPS coordinates, then ASAP equipped aircraft can "see" current air traffic and their recent tracks. FIG. 34A shows a chart plotter/MFD 3400 onboard a piloted aircraft 3404 (or a virtual image within the flight computer of a UAS). Using GPS and/or WAAS coordinates shared via ASAP, the chart plotter shows the current position of aircraft 3404 as well as three other aircraft 3402, 3406, and 3408 along with their current positions and recent tracks. To assist pilots and flight management systems of UASs predict possible future conflicts, each aircrafts' intended flight route may also be transmitted and received via ASAP modules. In FIG. 34B, intended flight routes of aircraft 3402, 3404, 3406, and 3408 are shown. For piloted aircraft, these intended flight routes would display on a chart plotter or MFD. For UASs, the intended flight routes would appear virtually within the UASs' flight computer. Now, each aircraft in FIG. 34B is aware of the other aircrafts' current position, past track, intended flight path, as well as other ASAP data, for example, altitude, SOG, COG, NU-STAR number, etc. Based on all the ASAP data, pilots and flight computers of UASs can determine the need for any course modifications to avoid conflicts with aircraft in the area.

Figure 35:
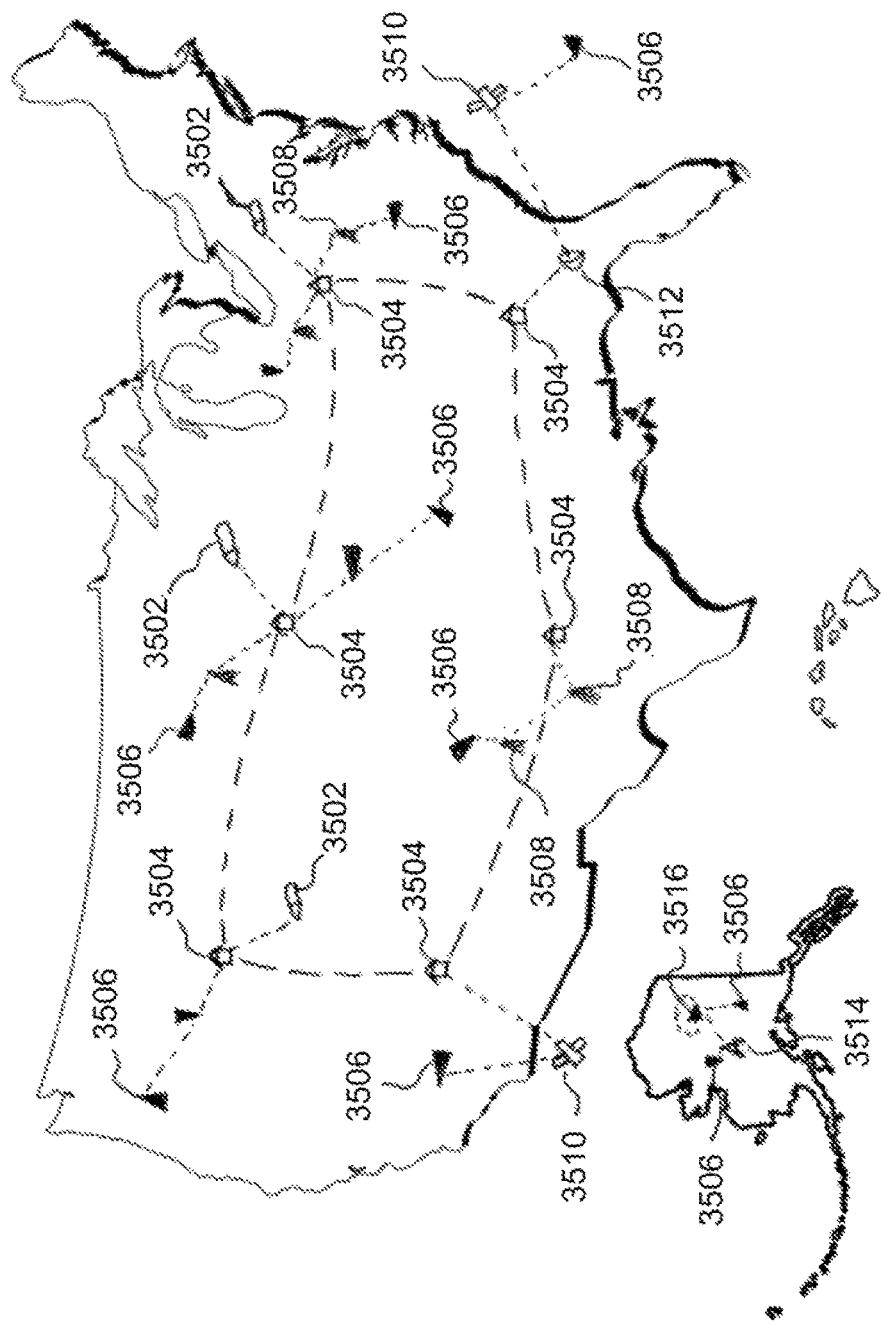
FIG. 35 illustrates ASAP data sharing, pre-planned route sharing, and portable and persistent UTM systems.

While intended or pre-programmed flight routes of ASAP equipped aircraft are shared real-time using ASAP modules, it is also beneficial for pilots and software programmers of UASs to share intended flight routes prior to flight. For example, FIG. 35 illustrates a national real-time ASAP data sharing and pre-route sharing system. Pilots at locations 3502 compile flight plans for upcoming flights. Before the flights begin, the flight plans are shared with a service provider 3504, for example the FAA, an FAA contracted entity, a commercial entity, and/or a non-profit business entity. Meanwhile certified UAS software programmers at locations 3502 build and share future flight plans with the service provider 3504. As pilots and UAS software programmers share intended flight plans with the service provider, a model can be built of all intended flight plans for a certain geographical area during a certain period of time. This information is accessible by pilots, UAS software programmers, controllers, etc. to determine whether conflicts will occur based on all the planned flight routes. If so, a modification to the intended flight route can be made and resubmitted to the service provider. Service providers 3504 are located around the country or world. Geographically separated service providers share real-time ASAP data, intended flight plans, and flight routes of en-route aircraft 3506 with each other to create an entire system of current and future flights in a particular region during a particular time period. As previously described, real-time ASAP data and information about intended flight routes may be transmitted to other aircraft (and other interested ground stations) via repeaters and relays using repeaters on towers 3508, satellites 3510, other aircrafts' ASAP modules, RF dishes 3512, etc.

The previously described national real-time ASAP system is an example of a persistent UTM. An example of a portable UTM is shown in FIG. 35 in the State of Alaska. A portable repeater 3514 and station orbiting aircraft 3516 provide the data links between aircraft 3506. A portable UTM may also co-exist within a persistent UTM. For example, in the western U.S. a portable UTM may be established for agricultural aircraft operations during a particular agricultural phase, like planting, dusting, or harvesting. In wildfire prone areas, like the Rocky Mountains or mountain ranges of California, a portable UTM may be established for firefighting aircraft operations. Over a disaster area, like a coastal region hit by a hurricane, a portable UTM may be established for communications, surveillance, etc.

UAS Operations in Controlled Airspace

Figure 36:
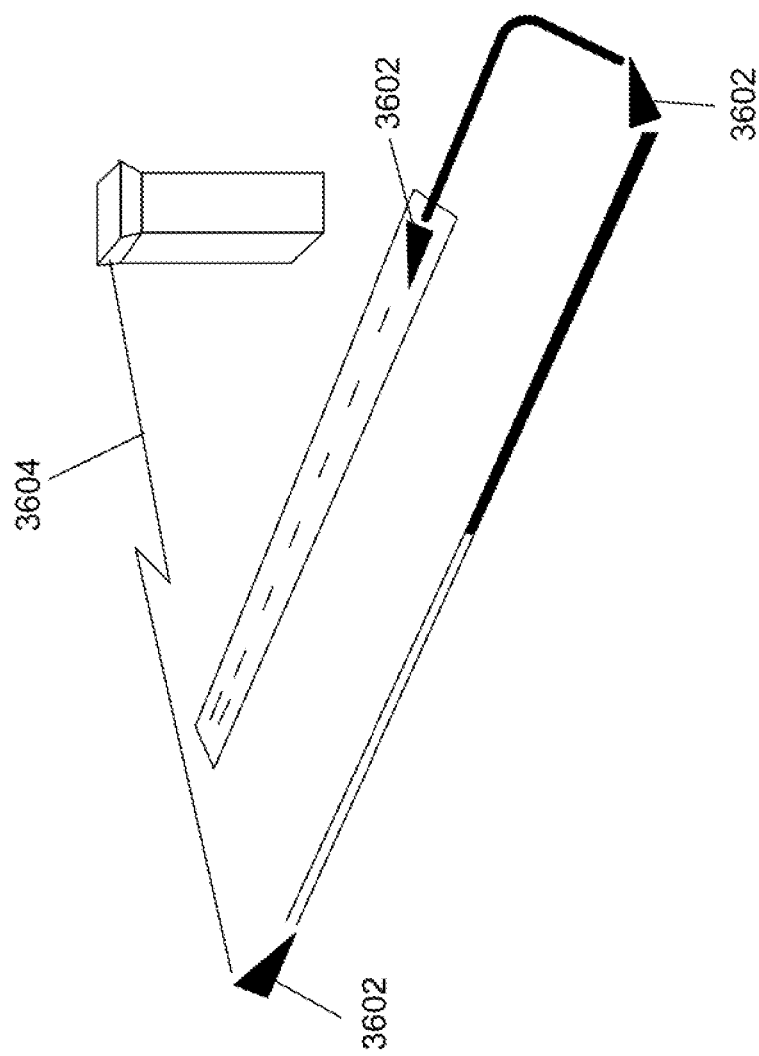
FIG. 36 shows a UAS landing on a runway in controlled airspace.
Figure 37:
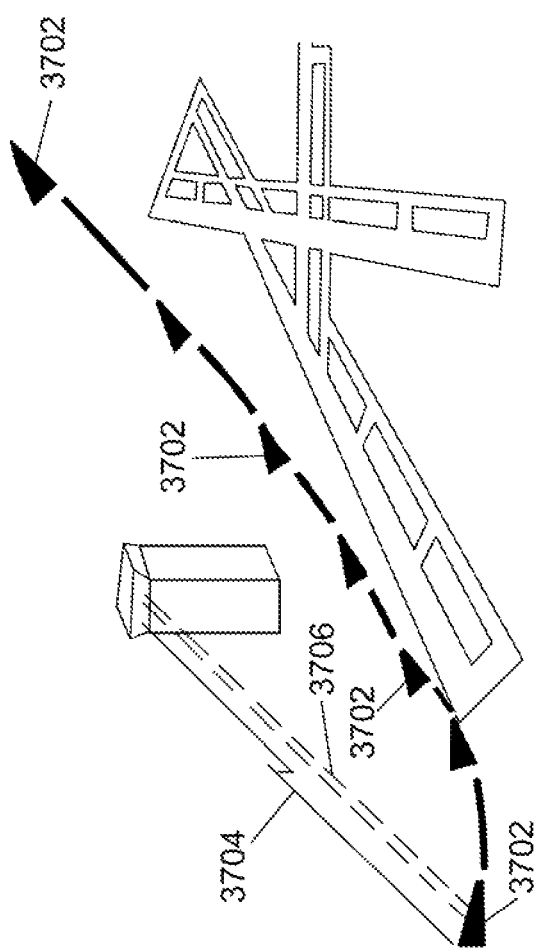
FIG. 37 illustrates a UAS aborting a landing approach to a runway in controlled airspace.

The UAS Traffic Management system and Autonomous Situational Awareness Platform has thus far been described primarily in uncontrolled airspace. It is likely and expected, however, that ASAP equipped aircraft (not equipped with ADS-B) such as UASs and general aviation aircraft will require access to controlled airspace. To meet the FAA requirement for aircraft operating in controlled airspace to have an ADS-B function, the ASAP module provides FAA air traffic controllers with necessary ASAP data (similar to ADS-B data) for safe operation in controlled airspace. For piloted aircraft and remotely piloted aircraft, two-way communication with air traffic controllers and the pilot is available for safe routing of aircraft within and through controlled airspace. For UASs, communication with air traffic controllers would be necessary. To achieve this, communication between controllers and flight management systems of UASs may be via data messages or text messages. That is, instead of controllers verbally providing flight path instructions, controllers would send a data message to the UAS. Like a piloted aircraft, the UAS could confirm receipt of the data message by repeating back the message to the controller. In FIG. 36, a UAS 3602 desires to land at a controlled airfield. Air traffic controllers send a data message 3604 to the UAS 3602 giving the UAS clearance to land on a designated runway. The UAS executes the instructions provided by the controller by entering the pattern on the downwind leg, makes the crosswind turn, executes a turn to put the UAS on final approach, and using instrumentation the UAS lands safely on the designated runway. Ground control then communicates with the UAS via messaging to direct the UAS to a parking position. FIG. 37 shows a UAS 3702 on final approach; however, before landing, a controller aborts the landing by sending a data message 3704 to the UAS. The UAS goes around and follows the controller's data instructions for a second landing attempt.

In the examples of FIGS. 36 and 37, the data messages are sent to the UAS via RF frequency. Alternatively, or as a secondary system, the UAS can receive standard ATC light signals 3706 from controllers. Equipped with a light sensor, the controller can communicate with the UAS using the light signals of 14 CFR 91.125: steady green, flashing green, steady red, flashing red, flashing white, alternating red and green, and other newly developed light colors and light patterns to effectively communicate with a UAS.

UTM Variations and Mission Examples

Figure 38:
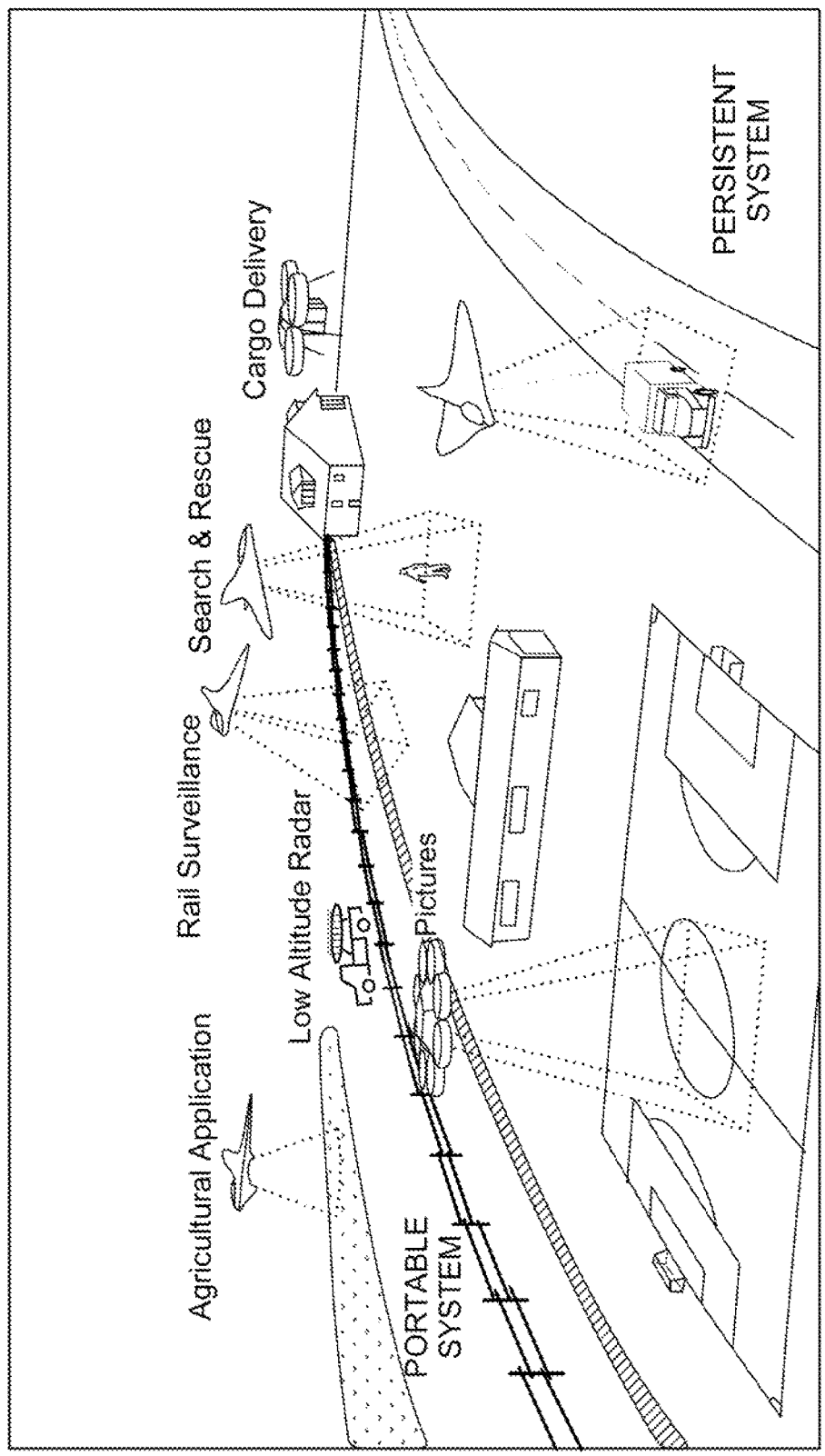
FIG. 38 shows various UTM applications for portable and persistent systems.

The following are sample missions using the UTM system described herein. As shown in FIG. 38, UTM enables and supports low-altitude applications of UASs with real-time integration into the National Airspace System.

As briefly mentioned, one type of UTM is a portable UTM system which can be transported to support UAS operations from one geographical region to another (e.g., agricultural operations). The portable UTM is where a limited range of low-altitude airspace will be served by the UTM. Examples of a portable UTM may include coverage as-needed; small or tight geo-fenced area at very low-altitudes; restricted airspace and homogeneous UASs—crop dusting/agricultural applications; city outskirts—pre-defined low-altitude bi-directional routes; and inside mega-city/urban applications. Such portable system may include portable relays and repeaters for sharing flight data, a portable service provider, etc.

Another type of UTM is a persistent UTM system which can provide real-time, continuous coverage to support UASs operations to/from designated areas. The persistent UTM covers wider airspace and longer range (e.g., cargo delivery operations). Examples of a persistent UTM system may include larger geo-fenced areas; mega-city connections (e.g., Los Angeles and San Francisco); goods and service deliveries by heterogeneous UASs by many vendors; and hub-and-spoke system as well as point-to-point. A third type of UTM system is a customizable system where geo-fencing, separation criteria, and airspace restrictions are externally specified. UTM adapts to any region, which has accurate 3D map availability.

Whether portable, persistent, or customizable, UTM, in its full implementation, operates on "autonomicity" characteristics: self-configuration, self-optimization, self-protection, and self-healing. Self-configuration includes adapting UTM based on external conditions, i.e., more buffer may be required based on the accuracy of position information. Such accuracy could change based on the external effects such as solar storms impacting satellite navigation. In such cases, the redundant systems will kick in, but they may or may not have the same accuracy profile so UTM may reconfigure to keep vehicles separated with different buffers. The main purpose of self-configuration is to adjust to off-nominal and changing conditions that may impact operations. In an extreme case, such as a very severe and hazardous weather condition, the operations may have to be shut down. Self-optimization relates to changing routes based on the demand and weather conditions to ensure that the system as a whole runs efficiently. Self-protection addresses prognostics, detection, and prediction of anomalies that may impact UTM based on changes to input data related accuracies, lags, and precision. Self-healing includes readjusting to normalcy once an abnormal event is over.

Certain autonomous functions of UTM include, but are not limited to: depending on the mission profile, preference, vehicle characteristics, weather, and demand, developing an airspace design that will allow the optimal use of altitudes, trajectories, crossing locations, and arrival/departure corridors; trajectory development for all UASs and rerouting once airborne if needed; separation monitoring for the vehicles that can manage their own separation and collisions; separation monitoring and management for the vehicles that cannot manage their own separation and collisions; geo-fence conformance monitoring and management if a vehicle persistently does not conform geo-fence; and off-nominal and emergency situation identification and responses which will include return to origin, safe emergency site selection and landing, emergency landing and self-destruct in safe location without damage to other property.

The following described missions are designed to demonstrate the new UTM system, including ASAP and NU-STAR, and to build confidence with the FAA, lawmakers, and the aviation community for implementation of the present invention.

Mission 1—Demonstrate feasibility of UTM in reserved/protected/restricted airspace. The first mission is to demonstrate various functions of UTM in a reserved airspace without any general aviation or glider traffic being present. The main goal is to show UTM and its sub-systems would support UASs operations for trajectory planning, rerouting, separation management, collision avoidance, and demand/ capacity imbalance. Off-nominal scenarios such as (simulated) severe wind/weather will be created to demonstrate the resiliency and response of UTM to manage the UAS by changing trajectories. In the second step, virtual general aviation and gliders can be added to demonstrate how UTM will adjust the trajectories of UASs to avoid them. Heterogeneous UASs will be incorporated in this step as well, where in-range vehicles of UASs will be considered which will include disposable UASs to highly capable UASs who can detect and resolve their own conflicts and collisions.

Mission 2—Agricultural remote area mission. In this mission, a small section of geo-fenced (about 3 mile radius) area will be selected. The main application is the monitoring, treating, and removing undesirable plants and/or leaves. About 15 small UASs (less than 100 lb. total weight) will be provided pre-planned routes to monitor grape vines in a winery, for example. These UASs will conduct surveillance of plants, detect any affected plants, and apply spray as needed, and return when they are accomplished their mission to the same location where they started. The UAS will continuously, real-time take and downlink imagery of the area surveillance. The operator managing all UASs may send a command to change the duration of the hovering, change altitude, or may reroute for another look. The UASs trajectories will be created such that it will take them a minimum amount of time to conduct surveillance by all UASs over the winery. UTM will provide the following services: communication, navigation, and surveillance of all UASs; airspace design in terms of altitude assignment for direction of traffic and management; geo-fencing plan and monitoring; initial conflict-free trajectory planning and rerouting; weather and wind prediction and integration with trajectory planning; separation management; collision avoidance will be conducted on-board UASs. A human operator will monitor UTM, and as needed any UASs operation can be terminated and brought to the original starting point or the mission will be abandoned to a safe emergency landing location. UTM will plan all initial trajectories based on departure and arrival addresses, including their initial altitude stratification. With due consideration to the user preferences about route, speed, and altitude and other traffic, UTM checks for separation assurance when the trajectories are changed to enable closer hovering or repeated path following. Based on predicted wind and weather, UTM determines safe duration and locations to operate within and provides surveillance and communications (either by cell coverage or by satellite coverage) to UASs; separation management can be provided by UTM unless vehicles are capable of providing their own based on the intent of the other vehicles. The first phase will likely include vehicles that will need trajectory, rerouting, and separate assurance services provided by UTM. In the second phase, a mix of vehicles will be used where some can provide their own separation assurance services and others will rely on UTM to provide a standard. In the third phase, all vehicles will provide their own separation assurance services unless such functionality fails to operate (i.e., off-nominal situation) in which case UTM will provide such services until the mission is terminated. It is contemplated that not all UASs will have the same capabilities and minimum requirements to operate equally.

Mission 3—Natural Calamities Search, Rescue, and Support Operations. A simulated earthquake occurs and massive destruction is expected due to its strength during the day. The condition of roads, houses, schools, office complexes is unclear requiring prompt response to survey large areas to decide the conditions and dispatch the needed help. UASs are commissioned to survey surrounding cities, gather the conditions of roads, buildings, and other assets and conduct a real-time update of the Google® and other maps to depict affected areas. Further, algorithmically the prioritization of dispatch of medical, food, and other logistics is decided and UASs are launched to deliver the time critical goods and services due to bad conditions of roads and traffic jams. At the same time, helicopters are operating. Also, there are severe winds, and bad weather is predicted. Using an ad-hoc internet network (by UASs themselves perhaps) communication/data link coverage is created. UTM will provide the following services: communication, navigation, and surveillance of all UASs; airspace design in terms of altitude assignment for direction of traffic and management; geo-fencing plan and monitoring; initial conflict-free trajectory planning and rerouting; weather and wind prediction and integration with trajectory planning; separation management; collision avoidance will be conducted by on-board UASs. A human operator will monitor UTM, and as needed any UASs operation can be terminated and brought to the original starting point or the mission will be directed to an emergency landing at a safe location. UTM will plan all initial trajectories including their initial altitude stratification and check for separation assurance when the trajectories are changed to enable closer hovering or repeated path following. Based on predicted wind and weather, UTM determines safe duration and locations to operate within and provides surveillance and communications (either by cell coverage or by satellite coverage) to UASs. Separation management can be provided by UTM unless vehicles are capable of providing their own based on the intent of the other vehicles. The first phase will likely include vehicles that will need separate assurance services provided by UTM. In the second phase, a mix of vehicles will be used where some can provide their own separation assurance services and others will rely on UTM to provide a standard. In the third phase, all vehicles will provide their own separation assurance services unless such functionality fails to operate (i.e., off-nominal situation) in which case UTM will provide such services until the mission is terminated. Another variation of this mission is a missing person scenario. In this mission, a lost person is being searched for by UASs surveillance in the area of interest. In the last two months, at least two incidences have occurred where a person with Alzheimer's condition gets disoriented and becomes lost. In such cases, UASs can conduct surveillance with night vision cameras around public places. The imagery can be streamed live. Although UASs will not completely replace the human search and rescue, it will provide augmentation.

Mission 4—Goods Delivery and Service Operations in Remote Areas. During the winter months, the only means of goods and services delivery inside Denali National Park, for example, is the dog sled. This is time tested and works; however, it is very slow and requires a human operator to manage the transport creating a single point failure in the system. Denali National Park is roughly the size as the State of Massachusetts, and it could take up to 5 days to travel from one end of the park to the other. This is a perfect setting where UTM could support the delivery of goods and services (e.g., wildlife monitoring) at various outposts inside Denali. UTM will provide the following services: communication, navigation, and surveillance of all UASs; airspace design in terms of altitude assignment for direction of traffic and management; geo-fencing plan and monitoring; initial conflict-free trajectory planning and rerouting; weather and wind prediction and integration with trajectory planning; separation management (a standard will need to be established and may vary from application to application); collision avoidance will be conducted by on-board UASs. A human operator may monitor UTM, and as needed, any UASs operation can be terminated and brought to the original starting point or the mission can be abandoned to a safe emergency landing location. UTM will plan all initial trajectories including their initial altitude stratification and check for separation assurance when the trajectories are changed to enable closer hovering or repeated path following. Based on predicted wind and weather, UTM determines safe duration and locations to operate within and provide surveillance and communications (either by cell coverage or by satellite coverage) to UASs. Separation management can be provided by UTM unless vehicles are capable of providing their own separation based on the intent of the other vehicles. The first phase will likely include vehicles that will need separate assurance services provided by UTM. In the second phase, a mix of vehicles will be used where some can provide their own separation assurance services, and others will rely on UTM to provide a standard. In the third phase, all vehicles will provide their own separation assurance services unless such functionality fails to operate (i.e., off-nominal situation) in which case UTM will provide such services until the mission is terminated.

Mission 5—Transporting Goods between Mega-cities. It is contemplated that densely populated urban areas will be locations where low-altitude UASs transportation of goods and services will be authorized with the successful full implementation of UTM. However, the transport between mega-cities and from distribution centers to the outskirts of mega-cities can easily be served by UTM. Examples of such connections include San Francisco and Los Angeles, and Boston and New York. Transporting mail and packages between major cities is quite common. UASs can serve a crucial role to deliver such packages. Interestingly, UASs can also serve communities along the way. UTM will provide the following services: communication, navigation, and surveillance of all UASs; airspace design in terms of altitude assignment for direction of traffic and management; geo-fencing plan and monitoring; initial conflict-free trajectory planning and rerouting; weather and wind prediction and integration with trajectory planning; separation management; collision avoidance will be conducted by on-board UASs. A human operator may monitor UTM, and as needed any UASs operation can be terminated and brought to the original starting point or the mission will be abandoned to a safe emergency landing location. UTM will plan all initial trajectories including their initial altitude stratification and check for separation assurance when the trajectories are changed to enable closer hovering or repeated path following. Based on predicted wind and weather, UTM will determine safe duration and locations to operate within and provide surveillance and communications (either by cell coverage or by satellite coverage) to UASs. Separation management can be provided by UTM unless vehicles are capable of providing their own based on the intent of the other vehicles. The first phase will likely include vehicles that will need separate assurance services provided by UTM. In the second phase a mix of vehicles will be used where some can provide their own separation assurance services, and others will rely on UTM to provide a standard. In the third phase, all vehicles will provide their own separation assurance services unless such functionality fails to operate (i.e., off-nominal situation) in which case UTM will provide such services until the mission is terminated.

Mission 6—Goods and Service Deliveries in Urban Areas. Urban road congestion delays good and service deliveries in many instances making road transportation an inefficient means. UTM could assist in increasing the mobility of goods/services and could contribute to the reduction of road traffic. Examples include books/items/provisions/grocery deliveries, pharmacy and medicine deliveries, etc. These could involve heterogeneous UASs with varying performance characteristics and size/weight from disposable UASs to highly equipped UASs. UTM will provide the following services: communication, navigation, and surveillance of all UASs; airspace design in terms of altitude assignment for direction of traffic and management; geo-fencing plan and monitoring; initial conflict-free trajectory planning and rerouting; weather and wind prediction and integration with trajectory planning; separation management; collision avoidance will be conducted by on-board UASs. A human operator may monitor UTM, and as needed any UASs operation can be terminated and brought to the original starting point or the mission will be abandoned to a safe emergency landing location. In the context of urban areas, additional information such as noise sensitive areas (e.g., school), tall structures (e.g., building, cell towers, etc.), and high value assets (e.g., bridges, national monuments) need to be avoided. Further, all areas may include general aviation traffic operating under visual flight rules (VFR) which will need to be considered as part of heterogeneous operations which UTM will enable. UTM will plan all initial trajectories including their initial altitude stratification and check for separation assurance when the trajectories are changed to enable closer hovering or repeated path following. Based on predicted wind and weather, UTM will determine safe duration and locations to operate within and provide surveillance and communications (either by cell coverage or by satellite coverage) to UASs. Separation management can be provided by UTM unless vehicles are capable of providing their own based on the intent of the other vehicles. The first phase will include vehicles that will need separate assurance services provided by UTM. In the second phase, a mix of vehicles will be used. Some can provide their own separation assurance services while others will rely on UTM to provide a standard. In the third phase, all vehicles will provide their own separation assurance services unless such functionality fails to operate (i.e., off-nominal situation) in which case UTM will provide such services until the mission is terminated.

The level of autonomy in all of the exemplary missions will increase as UTM matures. It is contemplated that a human operator may have involvement in setting up and verifying the constraints on the ground and in air; providing inputs related to mission profiles (how many UASs, departure/arrival points); setting up geo-fencing; understanding weather and wind predictions and identifying areas that need to be avoided; setting up requirements on UASs operations; and monitoring UTM functions and its overall status. Given that UASs with different performance characteristics and avionics capabilities will need to be supported by UTM, UTM will be capable of supporting separation management between UASs that lack such capability. At least in the beginning stages of UTM development and demonstration, the operator will make final decisions related to managing off-nominal situations (e.g., bad weather prediction) and emergencies related to UASs (e.g., persistent crossing of geo-fence). However, UTM will offer the recommended options. Once fully mature, UTM will become a plug and play system where entries associated with geo-fencing; weather and wind status and predictions; constraints based on expected traffic, terrain, and tall structures would be automatically updated on a daily basis. Also, emergency and off-nominal management will be done collaboratively between UASs and UTM with little or no human involvement. In this case, the human role will be largely for goal setting of UTM such as operating at the maximum throughput or adding extra layers of safety based on availability of sensor data. When fully automated, UTM will include sensors (and fusion), processor, communication system with redundancies, navigation system, algorithms to generate trajectories and reroute them, weather/wind state and predictions, separation monitoring and management, and collision avoidance.

Mission 7—Goods and Services Deliveries with Multiple Networks (HaS and PtP). In its mature state, UTM will support a number of networked operators who may wish to manage their own fleet (e.g., Whole Foods®, Amazon®, Fed Ex®, UPS®), similar to the airline operations centers. They will simply enter their ideal trajectory as the starting point into UTM using an internet based system. The trajectory will include arrival, departure, climb, descent, cruise, speed, and other relevant information. UTM will negotiate the trajectories automatically in case there are conflicting situations. Some UASs will operate point-to-point (PtP) while others may serve as hub-and-spoke (HaS) where larger UASs will bring a payload to a common location, and smaller UASs will distribute that payload to multiple locations much like the ground distribution centers of today. Although such logistical decisions will depend on specific business cases, UTM in its mature state would support both types of operations. These networks may be managed by a third party UTM service provider (e.g., government or commercial) by providing services related to airspace design for altitude for directions, arrival/departure corridors in congested airspace, weather integration related rerouting, demand/capacity imbalance management, separation assurance (depending on UASs capability), and collision avoidance (depending on UASs capability), and UASs emergency management. In this matured state, UTM will be operated completely autonomously, and aspects related to self-configuration, self-optimization, self-protection, and self-healing will be designed to ensure UTM health and status is continuously monitored. In terms of self-protection, UTM will track the integrity of the inputs (e.g., communications, radar/cell/satellite/internet inputs). If issues are detected, self-configuration must be changed to either increase buffer among UASs to offer additional safety, or in an extreme condition immediately halt the operations by finding the safest possible places for all UASs to make an emergency landing (e.g., 9/11 scenario). The self-configuration could also change due to tolerable but higher winds in which case depending on the weight class of UASs, some UASs will need to cease their operations or need to be rerouted while others may continue. Self-optimization will include efficient trajectory and airspace management to reduce demand/capacity imbalance and to provide most efficient possible trajectories to UASs. UTM's self-healing will consist of resuming normal operations from a degraded condition.

Additional missions—A variety of other missions using UTM of the present invention are contemplated, such as those reported in the article entitled "What is the Importance of Unmanned Vehicles to our Economy" by the Association for Unmanned Vehicle Systems International: wildfire mapping; agricultural monitoring; disaster management; thermal infrared power line surveys; law enforcement; telecommunications; weather monitoring; aerial imaging and mapping; television news coverage, sporting events, movie making; environmental monitoring; oil and gas exploration; freight transport; and medical services delivery. Additionally, and more specifically, other missions include UTM feasibility demonstrations in restricted airspace; agricultural crop spraying/surveillance mission (e.g., via portable UTM); search, rescue, and support missions for natural calamities; goods and services delivery in remote areas (e.g., Denali National Park); delivery of relief supplies for humanitarian missions; goods transportation between mega-cities; goods and service deliveries in urban areas; goods and service deliveries with multiple networks (e.g., HaS, PtP).

While these exemplary missions emphasis UASs in UTM airspace, it is also contemplated that UTM will enable personal air vehicle operations as that industry begins to mature in the future.

All references cited herein are expressly incorporated by reference in their entirety. It will be appreciated by persons skilled in the art that the present invention is not limited to what has been particularly shown and described herein above. A variety of modifications and variations are possible in light of the above teachings without departing from the scope and spirit of the invention, which is limited only by the following claims.

What is claimed is:

1. A system for improving aviation navigation of unmanned aircraft systems (UASs) operating at low-altitude to integrate the UASs into the National Airspace System, the system comprising:
  a flight management module configured to run on an on-board computer that is installed on a first UAS, the flight management module further configured to:
    receive a flight route;
    receive at least terrain data, surface-obstacle data, geo-fencing data, and spatial-fencing data from one or more databases;
    evaluate the flight route based on at least the terrain data, the surface obstacle data, the geo-fencing data, and the spatial-fencing data, wherein to evaluate includes determining flight route conflicts; and
    upon determining an absence of flight route conflicts, implement the flight route; and
  an autonomous situational awareness platform (ASAP) module configured to run on the on-board UAS computer, the ASAP module configured to:
    transmit ASAP information of the first UAS, the ASAP information including at least an aircraft ID number, a NU-STAR number, GPS coordinates at a particular time, speed over ground at the time, course over ground at the time, heading at the time, track data, and route data;
    receive ASAP information from at least a second UAS having a ASAP module configured to run on an on-board UAS computer installed on the second UAS;
    search continuously and automatically for flight route conflicts based on the received ASAP information from the least second UAS and at least the terrain data, the surface-obstacle data, the geo-fencing data, and the spatial-fencing data; and
    upon detecting a conflict, causing the flight management module to determine one or more adjustments of the flight route based on at least the NU-STAR number of the first UAS, flight rules, and right-of-way rules,
    wherein upon determining said one or more adjustments of the flight route, the flight management system is configured to implement the one or more adjustments of the flight route.

2. The system of claim 1, wherein the ASAP module is communicatively coupled to the ASAP module of a plurality of UASs, including at least the second UAS.

3. The system of claim 1, wherein the flight route conflicts include restricted airspace due to current events.

4. The system of claim 1, wherein the flight rules include one or more vehicle buffers configured based on determining an accuracy of the GPS coordinates based on current solar storm conditions.

5. The system of claim 1, wherein the ASAP module is communicatively coupled to at least a transmitter; a receiver; a satellite antenna configured to receive GPS coordinates and the time; and the flight management module.

6. The system of claim 1, wherein the flight management module is further configured to implement a calamity flight route, the calamity flight route configured to avoid a changed airspace environment resulting from a calamity condition.

7. The system of claim 1, wherein the system includes avionics equipment communicatively coupled to at least one of: aircraft radios, ATC radios, and ADS-B equipment.

8. The system of claim 1, wherein the system includes avionics equipment communicatively coupled to at least one of: radio frequency transmitters and receivers, cellular towers, internet, satellite, and station-orbiting aircraft.

9. A method for improving aviation navigation of unmanned aircraft systems (UASs) operating at low-altitude to integrate the UASs into the National Airspace System, comprising:
 performing, by a flight management module configured to run on an on-board computer that is installed on a first UAS, the steps of:
  receiving a flight route;
  receiving at least terrain data, surface-obstacle data, geo-fencing data, and spatial-fencing data from one or more databases;
  evaluating the flight route based on at least the terrain data, the surface obstacle data, the geo-fencing data, and the spatial-fencing data, wherein to evaluate includes determining flight route conflicts; and
  upon determining an absence of flight route conflicts, implementing the flight route;
 performing, by an autonomous situational awareness platform (ASAP) module configured to run on the on-board UAS computer, the steps of:
  transmitting ASAP information of the first UAS, the ASAP information including at least an aircraft ID number, a NU-STAR number, GPS coordinates at a particular time, speed over ground at the time, course over ground at the time, heading at the time, track data, and route data;
  receiving ASAP information from at least a second UAS having a ASAP module configured to run on an on-board UAS computer installed on the second UAS;
  searching continuously and automatically for flight route conflicts based on the received ASAP information from the at least second UAS and at least the terrain data, the surface-obstacle data, the geo-fencing data, and the spatial-fencing data; and
  upon detecting a conflict, causing the flight management module to determine one or more adjustments of the flight route based on at least the NU-STAR number of the first UAS, flight rules, and right-of-way rules,
 wherein upon determining said one or more adjustments of the flight route, the flight management system is configured to implement the one or more adjustments of the flight route.

10. The method of claim 9, wherein the ASAP module is communicatively coupled to the ASAP module of a plurality of UASs, including at least the second UAS.

11. The method of claim 9, wherein the flight route conflicts include restricted airspace due to current events.

12. The method of claim 9, wherein the flight rules include one or more vehicle buffers configured based on determining an accuracy of the GPS coordinates based on current solar storm conditions.

13. The method of claim 9, wherein the ASAP module is communicatively coupled to at least a transmitter; a receiver; a satellite antenna configured to receive GPS coordinates and the time; and the flight management module.

14. The method of claim 9, wherein the flight management module is further configured to implement a calamity flight route, the calamity flight route configured to avoid a changed airspace environment resulting from a calamity condition.

15. The method of claim 9, wherein the flight management module and the ASAP module are part of a plurality of avionics equipment aboard the UAS, the avionics equipment communicatively coupled to at least one of: aircraft radios, ATC radios, and ADS-B equipment.

16. The method of claim 15, wherein the avionics equipment is communicatively coupled to at least one of: radio frequency transmitters and receivers, cellular towers, internet, satellite, and station-orbiting aircraft.

* * * * *